(12) United States Patent
Lucas et al.

(10) Patent No.: US 8,060,834 B2
(45) Date of Patent: *Nov. 15, 2011

(54) GRAPHICS INTEGRATION INTO A PROCESS CONFIGURATION AND CONTROL ENVIRONMENT

(75) Inventors: John Michael Lucas, Leicester (GB); Mark J. Nixon, Round Rock, TX (US); Ling Zhou, Austin, TX (US); Alper T. Enver, Austin, TX (US); Arthur Webb, Manila (PH)

(73) Assignee: Fisher-Rosemount Systems, Inc., Austin, TX (US)

( * ) Notice: Subject to any disclaimer, the term of this patent is extended or adjusted under 35 U.S.C. 154(b) by 0 days.
This patent is subject to a terminal disclaimer.

(21) Appl. No.: 12/721,322

(22) Filed: Mar. 10, 2010

(65) Prior Publication Data
US 2010/0168874 A1    Jul. 1, 2010

Related U.S. Application Data

(63) Continuation of application No. 10/591,804, filed as application No. PCT/US2005/015588 on May 4, 2005, now Pat. No. 7,702,409.

(60) Provisional application No. 60/567,980, filed on May 4, 2004.

(51) Int. Cl.
G06F 3/048 (2006.01)
G06F 15/177 (2006.01)
G06F 9/44 (2006.01)
G05B 15/00 (2006.01)

(52) U.S. Cl. .......... 715/771; 715/736; 715/763; 700/83; 717/109

(58) Field of Classification Search .......... 700/17, 700/18, 26, 83; 713/100; 715/234, 762, 715/764, 771, 736, 738, 763; 717/109; 719/328; 345/619; 709/220, 221, 223
See application file for complete search history.

(56) References Cited

U.S. PATENT DOCUMENTS 30,280 A    10/1860    Watson
(Continued)

FOREIGN PATENT DOCUMENTS

CN    1130430    9/1996
(Continued)

OTHER PUBLICATIONS

"Powerful Solutions for Digital Plants", Mimic Simulation v2.6, Mynah Technologies 2003, pp. 1-15.
(Continued)

*Primary Examiner* — Crystal J Barnes-Bullock
(74) *Attorney, Agent, or Firm* — Marshall, Gerstein & Borun LLP

(57) ABSTRACT

Graphic elements and graphic displays are provided for use in a process environment to display information to one or more users about the process environment, such as the current state of devices within a process plant. The graphic elements and displays may be associated with various logical and physical elements within the process plant during configuration of the process plant, and may be configured and downloaded to the hardware within the process plant along with other configuration items, such as control routines. In particular, the graphic elements and graphic displays may be created and stored in a library, and may then be configured by being associated with various logical or physical entities within the plant. During the configuration process, the graphic elements and graphic displays may be associated with areas, equipment, process modules, control routines or control strategies of the plant as defined elsewhere in the plant configuration, or may be associated with interfaces or display devices, to define the hardware on which the graphic displays will execute during runtime, as well at to define the process entities to which these displays will be bound for display purposes. Still further, each of the graphic displays may be defined with a role or a functional use, such as an operator view, a maintenance view, etc., and these roles may be used to define the proper access and use of the graphic displays within the runtime environment.

15 Claims, 27 Drawing Sheets

U.S. PATENT DOCUMENTS

| | | | |
|---|---|---|---|
| 4,244,385 A | 1/1981 | Hotine | |
| 4,506,324 A | 3/1985 | Healy | |
| 4,512,747 A | 4/1985 | Hitchens et al. | |
| 4,628,435 A | 12/1986 | Tashiro et al. | |
| 4,663,704 A | 5/1987 | Jones et al. | |
| 4,736,320 A | 4/1988 | Bristol | |
| 4,843,538 A | 6/1989 | Lane et al. | |
| 4,885,717 A | 12/1989 | Beck et al. | |
| 4,972,328 A | 11/1990 | Wu et al. | |
| 4,977,529 A | 12/1990 | Gregg et al. | |
| 4,985,857 A | 1/1991 | Bajpai et al. | |
| 5,014,208 A | 5/1991 | Wolfson | |
| 5,021,947 A | 6/1991 | Campbell et al. | |
| 5,041,964 A | 8/1991 | Cole et al. | |
| 5,051,898 A | 9/1991 | Wright et al. | |
| 5,079,731 A | 1/1992 | Miller et al. | |
| 5,092,449 A | 3/1992 | Bolin et al. | |
| 5,097,412 A | 3/1992 | Orimo et al. | |
| 5,119,468 A | 6/1992 | Owens | |
| 5,168,441 A | 12/1992 | Onarheim et al. | |
| 5,218,709 A | 6/1993 | Fijany et al. | |
| 5,268,834 A | 12/1993 | Sanner et al. | |
| 5,321,829 A | 6/1994 | Zifferer | |
| 5,347,446 A | 9/1994 | Iino et al. | |
| 5,347,466 A | 9/1994 | Nichols et al. | |
| 5,361,198 A | 11/1994 | Harmon et al. | |
| 5,408,412 A | 4/1995 | Hogg et al. | |
| 5,408,603 A | 4/1995 | Van de Lavoir et al. | |
| 5,421,017 A | 5/1995 | Scholz et al. | |
| 5,428,555 A | 6/1995 | Starkey et al. | |
| 5,485,600 A | 1/1996 | Joseph et al. | |
| 5,485,620 A | 1/1996 | Sadre et al. | |
| 5,499,333 A | 3/1996 | Doudnikoff et al. | |
| 5,509,116 A | 4/1996 | Hiraga et al. | |
| 5,530,643 A | 6/1996 | Hodorowski | |
| 5,546,301 A | 8/1996 | Agrawal et al. | |
| 5,555,385 A | 9/1996 | Osisek | |
| 5,564,007 A * | 10/1996 | Kazen-Goudarzi et al. | 715/763 |
| 5,576,946 A | 11/1996 | Bender et al. | |
| 5,594,858 A | 1/1997 | Blevins | |
| 5,603,018 A | 2/1997 | Terada et al. | |
| 5,611,059 A | 3/1997 | Benton et al. | |
| 5,631,825 A | 5/1997 | van Weele et al. | |
| 5,680,409 A | 10/1997 | Qin et al. | |
| 5,706,455 A | 1/1998 | Benton et al. | |
| 5,752,008 A | 5/1998 | Bowling | |
| 5,768,119 A | 6/1998 | Havekost et al. | |
| 5,782,330 A | 7/1998 | Mehlert et al. | |
| 5,796,602 A | 8/1998 | Wellan et al. | |
| 5,801,942 A | 9/1998 | Nixon et al. | |
| 5,806,053 A | 9/1998 | Tresp et al. | |
| 5,812,394 A | 9/1998 | Lewis et al. | |
| 5,818,736 A | 10/1998 | Leibold | |
| 5,821,934 A | 10/1998 | Kodosky et al. | |
| 5,826,060 A | 10/1998 | Santoline et al. | |
| 5,828,851 A | 10/1998 | Nicon et al. | |
| 5,838,563 A | 11/1998 | Dove et al. | |
| 5,841,654 A | 11/1998 | Verissimo et al. | |
| 5,857,102 A * | 1/1999 | McChesney et al. | 713/100 |
| 5,862,052 A | 1/1999 | Nixon et al. | |
| 5,892,939 A | 4/1999 | Call et al. | |
| 5,898,860 A | 4/1999 | Leibold | |
| 5,901,313 A * | 5/1999 | Wolf et al. | 719/328 |
| 5,903,455 A | 5/1999 | Sharpe, Jr. et al. | |
| 5,909,368 A | 6/1999 | Nixon et al. | |
| 5,909,916 A | 6/1999 | Foster et al. | |
| 5,926,177 A | 7/1999 | Hatanaka et al. | |
| 5,929,855 A | 7/1999 | Benton et al. | |
| 5,940,294 A | 8/1999 | Dove | |
| 5,950,006 A | 9/1999 | Crater et al. | |
| 5,960,214 A | 9/1999 | Sharpe, Jr. et al. | |
| 5,970,430 A | 10/1999 | Burns et al. | |
| 5,980,078 A | 11/1999 | Krivoshein et al. | |
| 5,995,753 A | 11/1999 | Walker | |
| 5,995,916 A | 11/1999 | Nixon et al. | |
| 6,003,037 A | 12/1999 | Kassabgi et al. | |
| 6,023,644 A | 2/2000 | Kinsman | |
| 6,028,998 A | 2/2000 | Gloudeman et al. | |
| 6,032,208 A | 2/2000 | Nixon et al. | |
| 6,041,171 A | 3/2000 | Blaisdell et al. | |
| 6,076,106 A * | 6/2000 | Hamner et al. | 709/223 |
| 6,078,320 A | 6/2000 | Dove et al. | |
| 6,094,600 A | 7/2000 | Sharpe, Jr. et al. | |
| 6,098,116 A | 8/2000 | Nixon et al. | |
| 6,138,174 A | 10/2000 | Keeley | |
| 6,146,143 A | 11/2000 | Huston et al. | |
| 6,157,864 A | 12/2000 | Schwenke et al. | |
| 6,161,051 A | 12/2000 | Hafemann et al. | |
| 6,167,316 A | 12/2000 | Gloudeman et al. | |
| 6,173,208 B1 | 1/2001 | Park et al. | |
| 6,178,393 B1 | 1/2001 | Irvin | |
| 6,192,390 B1 | 2/2001 | Berger et al. | |
| 6,195,591 B1 | 2/2001 | Nixon et al. | |
| 6,201,996 B1 | 3/2001 | Crater et al. | |
| 6,212,559 B1 * | 4/2001 | Bixler et al. | 709/221 |
| 6,233,586 B1 | 5/2001 | Chang et al. | |
| 6,298,454 B1 | 10/2001 | Schleiss et al. | |
| 6,362,839 B1 | 3/2002 | Hamilton et al. | |
| 6,366,272 B1 | 4/2002 | Rosenberg et al. | |
| 6,385,496 B1 | 5/2002 | Irwin et al. | |
| 6,393,432 B1 * | 5/2002 | Flansburg et al. | 1/1 |
| 6,396,516 B1 | 5/2002 | Beatty | |
| 6,415,418 B1 | 7/2002 | McLaughlin et al. | |
| 6,421,571 B1 | 7/2002 | Spriggs et al. | |
| 6,442,515 B1 | 8/2002 | Varma et al. | |
| 6,445,963 B1 | 9/2002 | Blevins et al. | |
| 6,449,624 B1 | 9/2002 | Hammack et al. | |
| 6,477,435 B1 | 11/2002 | Ryan et al. | |
| 6,477,527 B2 | 11/2002 | Carey et al. | |
| 6,480,860 B1 | 11/2002 | Monday | |
| 6,510,351 B1 | 1/2003 | Blevins et al. | |
| 6,515,683 B1 | 2/2003 | Wright | |
| 6,522,934 B1 | 2/2003 | Irwin et al. | |
| 6,546,297 B1 | 4/2003 | Gaston et al. | |
| 6,571,133 B1 | 5/2003 | Mandl et al. | |
| 6,577,908 B1 | 6/2003 | Wojsznis et al. | |
| 6,587,108 B1 | 7/2003 | Guerlain et al. | |
| 6,615,090 B1 | 9/2003 | Blevins et al. | |
| 6,618,630 B1 | 9/2003 | Jundt et al. | |
| 6,618,745 B2 | 9/2003 | Christensen et al. | |
| 6,633,782 B1 | 10/2003 | Schleiss et al. | |
| 6,646,545 B2 | 11/2003 | Bligh | |
| 6,647,315 B1 | 11/2003 | Sherriff et al. | |
| 6,668,257 B1 | 12/2003 | Greef et al. | |
| 6,684,261 B1 | 1/2004 | Orton et al. | |
| 6,684,385 B1 | 1/2004 | Bailey et al. | |
| 6,687,698 B1 | 2/2004 | Nixon et al. | |
| 6,691,280 B1 | 2/2004 | Dove et al. | |
| 6,704,737 B1 | 3/2004 | Nixon et al. | |
| 6,711,629 B1 | 3/2004 | Christensen et al. | |
| 6,760,711 B1 | 7/2004 | Gillett et al. | |
| 6,788,980 B1 | 9/2004 | Johnson | |
| 6,795,798 B2 | 9/2004 | Eryurek et al. | |
| 6,826,521 B1 | 11/2004 | Hess et al. | |
| 6,832,118 B1 * | 12/2004 | Heberlein et al. | 700/18 |
| 6,904,415 B2 | 6/2005 | Krahn et al. | |
| 6,922,703 B1 * | 7/2005 | Snyder et al. | 345/633 |
| 6,948,173 B1 | 9/2005 | Isom | |
| 6,957,110 B2 | 10/2005 | Wewalaarachchi et al. | |
| 6,970,919 B1 * | 11/2005 | Doi et al. | 709/220 |
| 6,973,508 B2 | 12/2005 | Shepard et al. | |
| 6,980,869 B1 | 12/2005 | Chandhoke | |
| 7,043,311 B2 | 5/2006 | Nixon et al. | |
| 7,050,083 B2 | 5/2006 | Yoo et al. | |
| 7,050,863 B2 | 5/2006 | Mehta et al. | |
| 7,062,718 B2 * | 6/2006 | Kodosky et al. | 715/771 |
| 7,065,476 B2 | 6/2006 | Dessureault et al. | |
| 7,086,009 B2 | 8/2006 | Resnick et al. | |
| 7,110,835 B2 | 9/2006 | Blevins et al. | |
| 7,113,834 B2 | 9/2006 | Wojsznis et al. | |
| 7,117,052 B2 | 10/2006 | Lucas et al. | |
| 7,146,231 B2 | 12/2006 | Schleiss et al. | |
| 7,165,226 B2 | 1/2007 | Thurner et al. | |
| 7,210,039 B2 | 4/2007 | Rodgers et al. | |
| 7,210,095 B1 * | 4/2007 | Mor | 715/234 |
| 7,234,138 B2 | 6/2007 | Crevatin | |
| 7,308,473 B1 | 12/2007 | Thomas et al. | |

| | | |
|---|---|---|
| 7,320,005 B2 | 1/2008 | Li et al. |
| 7,330,768 B2 | 2/2008 | Scott et al. |
| 7,376,661 B2 | 5/2008 | Larson |
| 7,404,476 B2 | 7/2008 | Yoshida |
| 7,437,676 B1 * | 10/2008 | Magdum et al. ............. 715/738 |
| 7,526,347 B2 | 4/2009 | Lucas et al. |
| 7,647,126 B2 | 1/2010 | Blevins et al. |
| 7,647,558 B2 | 1/2010 | Ucar et al. |
| 7,680,546 B2 | 3/2010 | Gilbert et al. |
| 7,702,409 B2 | 4/2010 | Lucas et al. |
| 7,703,032 B2 * | 4/2010 | Wells ........................... 715/771 |
| 2001/0007984 A1 | 7/2001 | Fattah et al. |
| 2001/0010053 A1 | 7/2001 | Ben-Shachar et al. |
| 2001/0051949 A1 | 12/2001 | Carey et al. |
| 2002/0004796 A1 | 1/2002 | Vange et al. |
| 2002/0010571 A1 | 1/2002 | Daniel et al. |
| 2002/0019672 A1 | 2/2002 | Paunonen |
| 2002/0022894 A1 | 2/2002 | Eryurek et al. |
| 2002/0022895 A1 | 2/2002 | Genise et al. |
| 2002/0046290 A1 | 4/2002 | Andersson et al. |
| 2002/0055790 A1 | 5/2002 | Havekost |
| 2002/0059282 A1 | 5/2002 | Andersson et al. |
| 2002/0077711 A1 | 6/2002 | Nixon et al. |
| 2002/0123864 A1 | 9/2002 | Eryurek et al. |
| 2002/0156872 A1 | 10/2002 | Brown |
| 2002/0184521 A1 | 12/2002 | Lucovsky et al. |
| 2002/0184610 A1 * | 12/2002 | Chong et al. ................. 717/109 |
| 2002/0193888 A1 | 12/2002 | Wewalaarachchi et al. |
| 2002/0199123 A1 | 12/2002 | McIntyre et al. |
| 2003/0005169 A1 | 1/2003 | Perks et al. |
| 2003/0009754 A1 | 1/2003 | Rowley et al. |
| 2003/0014500 A1 | 1/2003 | Schleiss et al. |
| 2003/0028269 A1 | 2/2003 | Spriggs et al. |
| 2003/0028683 A1 | 2/2003 | Yorke et al. |
| 2003/0033037 A1 | 2/2003 | Yuen et al. |
| 2003/0041130 A1 | 2/2003 | Harrisville-Wolff et al. |
| 2003/0084201 A1 | 5/2003 | Edwards et al. |
| 2003/0126136 A1 | 7/2003 | Omoigui |
| 2003/0153988 A1 | 8/2003 | Shepard et al. |
| 2003/0191803 A1 | 10/2003 | Chinnici et al. |
| 2003/0200062 A1 | 10/2003 | Dessureault et al. |
| 2003/0226009 A1 | 12/2003 | Maeda et al. |
| 2003/0236576 A1 | 12/2003 | Resnick et al. |
| 2003/0236577 A1 | 12/2003 | Clinton |
| 2004/0021679 A1 | 2/2004 | Chapman et al. |
| 2004/0036698 A1 | 2/2004 | Thurner et al. |
| 2004/0059929 A1 | 3/2004 | Rodgers et al. |
| 2004/0075689 A1 | 4/2004 | Schleiss et al. |
| 2004/0075857 A1 | 4/2004 | Akiyoshi et al. |
| 2004/0078182 A1 | 4/2004 | Nixon et al. |
| 2004/0133487 A1 | 7/2004 | Hanagan et al. |
| 2004/0153804 A1 | 8/2004 | Blevins et al. |
| 2004/0162792 A1 | 8/2004 | Satou et al. |
| 2004/0181746 A1 | 9/2004 | McLure et al. |
| 2004/0186927 A1 | 9/2004 | Eryurek et al. |
| 2004/0199925 A1 | 10/2004 | Nixon et al. |
| 2004/0205656 A1 | 10/2004 | Reulein et al. |
| 2004/0249483 A1 | 12/2004 | Wojsznis et al. |
| 2004/0267515 A1 | 12/2004 | McDaniel et al. |
| 2005/0005079 A1 | 1/2005 | Boudou et al. |
| 2005/0015439 A1 | 1/2005 | Balaji et al. |
| 2005/0027376 A1 | 2/2005 | Lucas et al. |
| 2005/0039034 A1 | 2/2005 | Doyle et al. |
| 2005/0062677 A1 | 3/2005 | Nixon et al. |
| 2005/0096872 A1 | 5/2005 | Blevins et al. |
| 2005/0164684 A1 | 7/2005 | Chen et al. |
| 2005/0182758 A1 | 8/2005 | Seitz et al. |
| 2005/0197786 A1 | 9/2005 | Kataria et al. |
| 2005/0197803 A1 | 9/2005 | Eryurek et al. |
| 2005/0197805 A1 | 9/2005 | Eryurek et al. |
| 2005/0197806 A1 | 9/2005 | Eryurek et al. |
| 2005/0217971 A1 | 10/2005 | Kim |
| 2005/0222698 A1 | 10/2005 | Eryurek et al. |
| 2005/0277403 A1 | 12/2005 | Schmidt et al. |
| 2006/0031354 A1 | 2/2006 | Patrick et al. |
| 2006/0031481 A1 | 2/2006 | Patrick et al. |
| 2006/0136555 A1 | 6/2006 | Patrick et al. |
| 2006/0259524 A1 | 11/2006 | Horton |
| 2007/0006149 A1 | 1/2007 | Resnick et al. |
| 2007/0061786 A1 | 3/2007 | Zhou et al. |
| 2007/0078529 A1 | 4/2007 | Thiele et al. |
| 2007/0129917 A1 | 6/2007 | Blevins et al. |
| 2007/0165031 A1 * | 7/2007 | Gilbert et al. ................. 345/473 |
| 2007/0170037 A1 | 7/2007 | Kuroda |
| 2007/0211079 A1 | 9/2007 | Nixon et al. |
| 2007/0244582 A1 | 10/2007 | Wolf |
| 2007/0282480 A1 | 12/2007 | Pannese et al. |
| 2008/0034367 A1 | 2/2008 | Patrick et al. |
| 2008/0116035 A1 | 5/2008 | Ogimura |
| 2008/0140760 A1 | 6/2008 | Conner et al. |
| 2011/0087977 A1 * | 4/2011 | Campney et al. ............. 715/763 |

FOREIGN PATENT DOCUMENTS

| | | |
|---|---|---|
| EP | 0 482 523 A2 | 4/1992 |
| EP | 0 813 129 | 12/1997 |
| EP | 1 030 251 A1 | 8/2000 |
| EP | 1 122 652 | 8/2001 |
| EP | 1 204 033 | 5/2002 |
| EP | 1 284 446 | 2/2003 |
| EP | 1 538 619 A1 | 6/2005 |
| GB | 2 328 523 | 2/1999 |
| GB | 2 370 665 | 7/2000 |
| GB | 2 348 020 | 9/2000 |
| GB | 2 349 958 | 11/2000 |
| GB | 2 355 545 A | 4/2001 |
| GB | 2 371 884 | 8/2002 |
| GB | 2 372 365 | 8/2002 |
| GB | 2 377 045 | 12/2002 |
| GB | 2 395 801 | 6/2004 |
| GB | 2 398 659 | 8/2004 |
| GB | 2 415 809 | 1/2006 |
| GB | 2 417 574 | 3/2006 |
| GB | 2 417 575 | 3/2006 |
| GB | 2 418 030 | 3/2006 |
| GB | 2 418 031 | 3/2006 |
| JP | 1-298389 | 12/1979 |
| JP | 1-120593 | 5/1989 |
| JP | 2-310602 | 12/1990 |
| JP | 3-257509 | 11/1991 |
| JP | 5-54277 | 3/1993 |
| JP | 6-26093 | 2/1994 |
| JP | 7-036538 | 2/1995 |
| JP | 7-248941 | 9/1995 |
| JP | 8-314760 | 11/1996 |
| JP | 9-134213 | 5/1997 |
| JP | 9-330013 | 12/1997 |
| JP | 11-007315 | 1/1999 |
| JP | 2000-050531 | 2/2000 |
| JP | 2000-311004 | 11/2000 |
| JP | 2000-346299 A | 12/2000 |
| JP | 2002-140114 | 5/2002 |
| JP | 2002-215221 | 7/2002 |
| JP | 2002-258936 | 9/2002 |
| JP | 2002-303564 | 10/2002 |
| JP | 9-288512 | 11/2007 |
| WO | WO-91/19237 A1 | 12/1991 |
| WO | WO-95/04314 | 2/1995 |
| WO | WO-97/38362 | 10/1997 |
| WO | WO-97/45778 | 12/1997 |
| WO | WO-98/53398 | 11/1998 |
| WO | WO-00/23798 | 4/2000 |
| WO | WO-00/70417 | 11/2000 |
| WO | WO-01/09690 | 2/2001 |
| WO | WO-01/65322 A1 | 9/2001 |
| WO | WO-02/071169 | 9/2002 |
| WO | WO-03/003198 | 1/2003 |
| WO | WO-03/038584 | 5/2003 |
| WO | WO-03/048922 A1 | 6/2003 |
| WO | WO-03/075206 | 9/2003 |
| WO | WO-2004/025437 A2 | 3/2004 |
| WO | WO-2004/086160 A1 | 10/2004 |
| WO | WO-2005/107409 | 11/2005 |
| WO | WO-2005/107410 | 11/2005 |
| WO | WO-2005/107416 | 11/2005 |
| WO | WO-2005/109122 | 11/2005 |
| WO | WO-2005/109123 | 11/2005 |
| WO | WO-2005/109124 | 11/2005 |
| WO | WO-2005/109125 | 11/2005 |

| | | |
|---|---|---|
| WO | WO-2005/109126 | 11/2005 |
| WO | WO-2005/109127 | 11/2005 |
| WO | WO-2005/109128 | 11/2005 |
| WO | WO-2005/109129 | 11/2005 |
| WO | WO-2005/109130 | 11/2005 |
| WO | WO-2005/109131 | 11/2005 |
| WO | WO-2005/109250 | 11/2005 |
| WO | WO-2005/119381 | 12/2005 |

OTHER PUBLICATIONS

Arzen, "Using Real-Time Expert Systems for Control System Prototyping," *Proceedings of the International Conference on Systems, Man and Cybernetics*, 3:25-30 (1993).
Bailey, "Elsag Bailey automation", approximately 1993.
Bailey, "Introducing Bailey Evolution 90TM . . . The Sound Investment Strategy for Process Automation", 1993.
Bailey, "Wide-Range, Fully Compatible Family of Process Automation and Management Systems", 1993.
CAMO product datasheet, "The Unscrambler 9.6," www.camo.com.
Chen, "Real-Time Management in the Distributed Environment," Ph.D. Thesis (1999).
Combined Search and Examination Report for Application No. GB0514158.5, dated Dec. 21, 2005.
Combined Search and Examination Report for Application No. GB0514161.9, dated Jan. 6, 2006.
Combined Search and Examination Report for Application No. GB0514164.3, dated Dec. 20, 2005.
Combined Search and Examination Report for Application No. GB0514167.6, dated Jan. 4, 2006.
Combined Search and Examination Report for Application No. GB0814627.6, dated Aug. 29, 2008.
Combined Search and Examination Report for Application No. GB0814629.2, dated Aug. 26, 2008.
Combined Search and Examination Report for Application No. GB1006123.2, dated Sep. 15, 2010.
Computer Products, "Unbundling the DCS", approximately 1992.
Developers.sun.com, "Core J2EE Patterns—Data Access Object," Core J2EE Pattern Catalog (2004). Retrieved from the Internet on Feb. 1, 2006: <URL: http://web.archive.org/web/20040414043406/java.sun.com/blueprints/corej2eepatterns/Patterns/C5DataAccessObjects.html>.
English-language translation of Chinese Office Action for Application No. 200580014271.1, dated Oct. 31, 2008.
English-language translation of Chinese Office Action for Application No. 200580014271.1, dated Jun. 26, 2009.
English-language translation of Chinese Office Action for Application No. 200580014272.6, dated Sep. 5, 2008.
English-language translation of Chinese Office Action for Application No. 200580014273.0, dated Nov. 7, 2008.
English-language translation of Chinese Office Action for Application No. 200580014274.5, dated Aug. 1, 2008.
English-language translation of Chinese Office Action for Application No. 200580014283.4, dated Mar. 28, 2008.
English-language translation of Chinese Office Action for Application No. 200580014283.4, dated Nov. 14, 2008.
English-language translation of Chinese Office Action for Application No. 200580014283.4, dated Jun. 26, 2009.
English-language translation of Chinese Office Action for Application No. 200580014496.7, dated Mar. 13, 2009.
English-language translation of Chinese Office Action for Application No. 200580014496.7, dated Mar. 7, 2008.
English-language translation of Chinese Office Action for Application No. 200580014496.7, dated Apr. 13, 2010.
English-language translation of Chinese Office Action for Application No. 200580014497.1, dated May 9, 2008.
English-language translation of Chinese Office Action for Application No. 200580014498.6, dated Jan. 8, 2010.
English-language translation of Chinese Office Action for Application No. 200580014498.6, dated Jul. 29, 2010.
English-language translation of Chinese Office Action for Application No. 200580014526.4, dated Aug. 28, 2009.
English-language translation of Chinese Office Action for Application No. 200580014526.4, dated Jul. 4, 2008.
English-language translation of Chinese Office Action for Application No. 200580014527.9, dated May 21, 2010.
English-language translation of Chinese Office Action for Application No. 200580014528.3, dated Jun. 26, 2009.
English-language translation of Chinese Office Action for Application No. 200580014528.3, dated Sep. 2, 2010.
English-language translation of Chinese Office Action for Application No. 200580014529.8, dated Aug. 15, 2008.
English-language translation of Chinese Office Action for Application No. 200580014529.8, dated Nov. 20, 2009.
English-language translation of Chinese Office Action for Application No. 200580014530.0, dated Jun. 27, 2008.
English-language translation of Chinese Office Action for Application No. 200580014538.7, dated Apr. 25, 2008.
English-language translation of Chinese Office Action for Application No. 200580014538.7, dated Jun. 19, 2009.
English-language translation of Chinese Office Action for Application No. 200710148008.2, dated Sep. 8, 2010.
Examination Report for Application No. GB0324470.4, dated Sep. 30, 2004.
Examination Report for Application No. GB0324633.7, dated Sep. 13, 2005.
Examination Report for Application No. GB0620322.8, dated Aug. 21, 2007.
Examination Report for Application No. GB0620323.6, dated May 12, 2009.
Examination Report for Application No. GB0620325.1, dated Feb. 17, 2010.
Examination Report for Application No. GB0620325.1, dated Jul. 13, 2009.
Examination Report for Application No. GB0620325.1, dated Jul. 2, 2010.
Examination Report for Application No. GB0620326.9, dated Dec. 11, 2009.
Examination Report for Application No. GB0620326.9, dated May 1, 2009.
Examination Report for Application No. GB0621078.5, dated Aug. 24, 2007.
Examination Report for Application No. GB0621081.9, dated Apr. 30, 2009.
Examination Report for Application No. GB0621081.9, dated Dec. 3, 2009.
Examination Report for Application No. GB0621081.9, dated Mar. 11, 2010.
Examination Report for Application No. GB0621082.7, dated Jan. 17, 2008.
Examination Report for Application No. GB0621082.7, dated May 4, 2007.
Examination Report for Application No. GB0621083.5, dated Aug. 24, 2007.
Examination Report for Application No. GB0621084.3, dated Jul. 13, 2009.
Examination Report for Application No. GB0621084.3, dated Feb. 3, 2010.
Examination Report for Application No. GB0621084.3, dated Jun. 9, 2010.
Examination Report for Application No. GB0621193.2, dated Dec. 22, 2009.
Examination Report for Application No. GB0621193.2, dated Jun. 1, 2009.
Examination Report for Application No. GB0621390.4, dated Jan. 29, 2010.
Examination Report for Application No. GB0621390.4, dated Jul. 10, 2009.
Fisher-Rosemount Systems, Inc., DeltaV Bulk Edit, pp. 1-12 (2002).
Fisher-Rosemount, "Managing the Process Better", Dec. 1993.
Fisher-Rosemount, "Managing the Process Better", Sep. 1993.
FOLDOC, "Declarative Language," Retrieved from the Internet on Jul. 30, 2007: URLhttp://ftp.sunet.se/foldoc/foldoc.cqi?declarative+language.
Han et al., "Web Based rSPC (realtime Statistical Process Control) System Supporting XML Protocol," ISIE, vol. 1, pp. 399-403 (2001).
Honeywell "UDC 6000 Process Controller", Aug. 1992.

Honeywell, "Process Manager Specifiction and Technical Data", Sep. 1991.
Honeywell, "TDC 3000 Overview", approximately 1992.
Honeywell, "TDC 3000 Process Manager", approximately 1992.
International Preliminary Report on Patentability for Application No. PCT/US2005/015390, dated Nov. 7, 2006.
International Preliminary Report on Patentability for Application No. PCT/US2005/015391, dated Nov. 7, 2006.
International Preliminary Report on Patentability for Application No. PCT/US2005/015439, dated Nov. 7, 2006.
International Preliminary Report on Patentability for Application No. PCT/US2005/015556, dated Nov. 7, 2006.
International Preliminary Report on Patentability for Application No. PCT/US2005/015585, dated Nov. 7, 2006.
International Preliminary Report on Patentability for Application No. PCT/US2005/015588, dated Nov. 7, 2006.
International Preliminary Report on Patentability for Application No. PCT/US2005/015596, dated Nov. 7, 2006.
International Preliminary Report on Patentability for Application No. PCT/US2005/015941, dated Nov. 7, 2006.
International Search Report and Written Opinion for Application No. PCT/US2005/015394, dated Mar. 20, 2006.
International Search Report and Written Opinion for Application No. PCT/US2005/015439, dated Aug. 10, 2005.
International Search Report and Written Opinion for Application No. PCT/US2005/015585, dated May 9, 2006.
International Search Report and Written Opinion for Application No. PCT/US2005/015596, dated Apr. 5, 2006.
International Search Report for Application No. PCT/US2005/015390, dated Sep. 16, 2005.
International Search Report for Application No. PCT/US2005/015392, dated Sep. 16, 2005.
International Search Report for Application No. PCT/US2005/015393, dated Sep. 12, 2005.
International Search Report for Application No. PCT/US2005/015943, dated Aug. 26, 2005.
International Search Report for Application No. PCT/US2005/015537, dated Aug. 28, 2005.
International Search Report for Application No. PCT/US2005/015556, dated Aug. 26, 2005.
International Search Report for Application No. PCT/US2005/015588, dated Aug. 26, 2005.
International Search Report for Application No. PCT/US2005/015941, dated Aug. 29, 2005.
International Search Report for Application No. PCT/US2005/015942, dated Sep. 5, 2005.
Kopp, About.com, C++ Tutorial—Lesson 17: Classes, Members and Methods, Retrieved from the Internet on Apr. 27, 2005: URL:http://www.cplus.about.com/od/beginnerctutorial/l/aa070602a.htm.
Kopp, About.com, C++ Tutorial—Lesson 17: Classes, Members and Methods, Defining Classes, Retrieved from the Internet on Apr. 27, 2005: URL:http://www.cplus.about.com/od/beginnerctutorial/l/aa070602b.htm.
Kopp, About.com, C++ Tutorial—Lesson 17: Classes, Members and Methods, Defining Methods, Retrieved from the Internet on Apr. 27, 2005: URL.http://www.cplus.about.com/od/beginnerctutorial/l/aa070602c.htm.
Kopp, About.com, C++ Tutorial—Lesson 29: Inheritance Introduction, Retrieved from the Internet on Apr. 27, 2005: URL:http://www.cplus.about.com/od/beginnerctutorial/l/aa120502a.htm.
Kopp, About.com, C++ Tutorial—Lesson 29: Inheritance, Retrieved from the Internet on Apr. 27, 2005: URL:http://www.cplus.about.com/od/beginnerctutorial/l/aa120502b.htm.
Kopp, About.com, C++ Tutorial—Lesson 29: Inheritance, Continued, Retrieved from the Internet on Apr. 27, 2005: URL:http://www.cplus.about.com/od/beginnerctutorial/l/aa12050c.htm.
Kopp, About.com, C++ Tutorial∫Lesson 9: Introduction to Classes, Defining Classes, Retrieved from the Internet on Apr. 27, 2005: URL:http://www.cplus.about.com/od/beginnerctutorial/l/aa041002b.htm.
Kopp, About.com, C++ Tutorial—Lesson 9: Introduction to Classes, Object Terminology, Retrieved from the Internet on Apr. 27, 2005: URL:http://www.cplus.about.com/od/beginnerctutorial/l/aa041002e.htm.
Kopp, About.com, C++ Tutorial—Lesson 9: Introduction to Classes, Using Objects, Retrieved from the Internet on Apr. 27, 2005: URL:http://www.cplus.about.com/od/beginnerctutorial/l/aa041002d.htm.
Kurpis, "The New IEEE Standard Dictionary of Electrical and Electronics Terms (Including Abstracts of All Current IEEE Standards)," Fifth Ed., Christopher J. Booth, Editor, pp. 317 (1993).
Leeds et al., "Make Your Automation Plan a Reality: MAX 1000", approximately 1990.
Mehta et al., "Feedfoward Neural Networks for Process Identification and Prediction," Neural Network and Experty Systems Presentation (2001).
Mohr et al., "BizTalk and Application Integration—Translating Between Message Specification: BizTalk Mapper," Professional BizTalk, pp. 1-3 (2001).
MSDN Magazine, "A First Look at Writing and Deploying Apps in the Next Generation of Windows," Retrieved from the Internet on Aug. 21, 2007: URL http://msdn.microsoft.com/msdnmag/issues/04/01/DevelopingAppsforLonghorn/?print=true.
MSDN Magazine, "Create Real Apps Using New Code and Markup Model," Retreived from the Interent on Aug. 21, 2007: URL <http://msdn.microsoft.com/msdnmag/issues/04/01/avalon/?print=true>.
Nahavandi et al., "A Virtual Manufacturing Environment with an Element of Reality," *Advanced Factory Automation*, Conf. Pub. 398: 624-629 (1994).
Notice of Rejection for corresponding Japanese Application No. 2000-134873, dated Feb. 3, 2004.
Notice of Rejection for corresponding Japanese Application No. 2003-358631, dated Jan. 16, 2007.
Notice of Rejection for corresponding Japanese Application No. 2003-358631, dated Sep. 4, 2007.
Notice of Rejection for corresponding Japanese Application No. 2003-362187, dated Nov. 2, 2009.
Office Action for European Application No. 05747006.4-2206, dated Dec. 18, 2008.
Office Action for European Application No. 05747006.4-2206, dated Jul. 31, 2007.
Office Action for European Application No. 05747006.4-2206, dated Jun. 22, 2010.
Office Action for European Application No. 05745149.4-2206, dated Apr. 6, 2009.
Office Action for European Application No. 05745149.4-2206, dated Jan. 21, 2008.
Office Action for European Application No. 05745149.9-2206, dated Mar. 16, 2007.
Office Action for European Application No. 09155953.4-2206, dated Jan. 4, 2010.
Office Action for European Application No. 09155953.4-2206, dated Aug. 9, 2010.
Office Action for U.S. Appl. No. 11/537,975, dated Jul. 8, 2009.
OPC Foundation, "What is OPC?" Retrieved from the Internet on Aug. 21, 2007: URL http://www.opcfoundation.org/Default.aspx/01_about/01_whatis.asp?MID=AboutOPC.
Reliance Electric Company, "Multitasking Capability Simplifies Process Control Design", approximately late 1980s, by Angelo J. Notte.
Search Report for Application No. GB0719214.9, dated Feb. 12, 2008.
Search Report for Application No. GB0010850.6, dated Sep. 5, 2000.
Search Report for Application No. GB0324470.4, dated Mar. 25, 2004.
Search Report for Application No. GB0324633.7, dated Mar. 30, 2004.
Search Report for Application No. GB0403575.4, dated Jun. 21, 2004.
Search Report for Application No. GB0418079.0, dated Nov. 15, 2004.
Search Report for Application No. GB0418080.8, dated Nov. 16, 2004.

Search Report for Application No. GB0620414.3, dated Dec. 5, 2007.
Search Report for Application No. GB0904425.6, dated Jun. 16, 2009.
Search Report for Application No. GB1004051.7, dated Jul. 16, 2010.
StatSoft product datasheet, "Statistica, Multivariate Statistical Process Control," www.statsoft.com.
Sztipanovits et al. "Modeling, Model, Interpretation and Intelligent Control" Proc. of the Third IEEE International Symposium on Intelligent Control, pp. 46-50 (1989).
Toshiba, "Toshiba Integrated Control Systems", Nov. 1990.
Tzovla et al., "Abnormal Condition Management Using Expert Systems," Neural Network and Expert Systems Presentation (2001).
Umetrics product datasheet, "SIMCA-P 11" and "SIMCA-P+ 11," www.umetrics.com.
W3C, "XSL Transformations (XSLT)," W3C Recommendation, pp. 3 (1999).
Wikipedia, "Application Programming Interface," Retreived from the Interent on Aug. 21, 2007: URL http://en.wikipedia.org/wiki/Application_programming_interface.
Wikipedia, "Extensible Application Markup Language," Retreived from the Internet on Jul. 30, 2007: URL http://en.wikipedia.org/wiki/Extensible_Application_Markup_Language.
Wikipedia, "Vector Graphics," Retreived from the Interent on Aug. 21, 2007: URL http://en.wikipedia.org/wiki/Vector_graphics.
Yang, "Design Issues and Implementation of Internet-Based Process Control System," *Control Engineering Practice*, pp. 709-720 (2001).

\* cited by examiner

GRAPHICS INTEGRATION INTO A PROCESS CONFIGURATION AND CONTROL ENVIRONMENT

RELATED APPLICATIONS

This application is a continuation application of and claims the benefit of priority to U.S. patent application Ser. No. 10/591,804 entitled "Graphics Integration into a Process Configuration and Control Environment," which was filed on Sep. 6, 2006 as a U.S. National Stage of International Application Serial No. PCT/US2005/015588 entitled "Graphics Integration into a Process Configuration and Control Environment," which was filed on May 4, 2005 and which claims priority to prior U.S. Provisional Patent Application Ser. No. 60/567,980, entitled "Graphical User Interface for Representing, Monitoring, and Interacting with Process Control Systems," which was filed on May 4, 2004, the disclosures of each of which this application hereby expressly incorporates by reference herein in their entirety. This application is also related to U.S. patent application Ser. No. 10/625,481, entitled "Integration of Graphic Display Elements, Process Modules and Control Modules in Process Plants," which was filed on Jul. 21, 2003, and which published as U.S. Publication No. 2004/0153804 on Aug. 5, 2004, which, in turn, is a Continuation-in-Part of U.S. patent application Ser. No. 10/278,469, entitled "Smart Process Modules and Objects in Process Plants," which was filed on Oct. 22, 2002, and which published as U.S. Publication No. 2004/0075689 on Apr. 22, 2004, the entire disclosures of which are hereby expressly incorporated by reference herein in their entirety. This application is also related to U.S. patent application Ser. No. 10/368,151 entitled "Module Class Objects in a Process Plant Configuration System," which was filed on Feb. 18, 2003, and which published as U.S. Publication No. 2004/0199925 on Oct. 7, 2004, the entire disclosure of which is hereby expressly incorporated by reference herein in its entirety. This application is also related to the following patent applications, which are being filed as International (PCT) applications on the same date as this application and which this application hereby expressly incorporates by reference herein in their entirety: "Associated Graphic Displays in a Process Environment"; "User Configurable Alarms and Alarm Trending for Process Control Systems"; "Integration of Process Modules and Expert Systems in Process Plants"; "A Process Plant User Interface System Having Customized Process Graphic Display Layers in an Integrated Environment"; "Scripted Graphics in a Process Environment"; "Graphic Element with Multiple Visualizations in a Process Environment"; "System for Configuring Graphic Display Elements and Process Modules in Process Plants; "Graphic Display Configuration Framework for Unified Process Control System Interface"; "Markup Language-Based, Dynamic Process Graphics in a Process Plant User Interface"; "Methods and Apparatus for Modifying Process Control Data"; "Methods and Apparatus for Accessing Process Control Data"; "Integrated Graphical Runtime Interface for Process Control Systems"; "Service-Oriented Architecture for Process Control Systems".

TECHNICAL FIELD

The present invention relates generally to process plants and, more particularly, to the integration and use of a graphic display editor and graphic display objects at a system level of a process control and simulation system to enable the creation and use of common graphic display elements in various activities associated with plant configuration, control, maintenance, and simulation.

DESCRIPTION OF THE RELATED ART

Distributed process control systems, like those used in chemical, petroleum or other processes, typically include one or more process controllers communicatively coupled to one or more field devices via analog, digital or combined analog and digital buses. The field devices, which may be, for example, valves, valve positioners, switches and transmitters (e.g., temperature, pressure, level and flow rate sensors), are located within the process environment and perform process functions such as opening or closing valves, measuring process parameters, etc. Smart field devices, such as the field devices conforming to the well-known Fieldbus protocols, like the FOUNDATION™ Fieldbus protocol, may also perform control calculations, alarming functions, and other control functions commonly implemented within the controller. The process controllers, which are also typically located within the plant environment, receive signals indicative of process measurements made by the field devices and/or other information pertaining to the field devices and execute a controller application that runs, for example, different control modules which make process control decisions, generate control signals based on the received information and coordinate with the control modules or blocks being executed in the field devices, such as HART and Fieldbus field devices. The control modules in the controller send the control signals over the communication lines to the field devices to thereby control the operation of the process.

Information from the field devices and the controller is usually made available over a data highway to one or more other hardware devices, such as operator workstations, personal computers, data historians, report generators, centralized databases, etc., typically placed in control rooms or other locations away from the harsher plant environment. These hardware devices run applications that may, for example, enable an operator to perform functions with respect to the process, such as changing settings of the process control routine, modifying the operation of the control modules within the controller or the field devices, viewing the current state of the process, viewing alarms generated by field devices and controllers, simulating the operation of the process for the purpose of training personnel or testing the process control software, keeping and updating a configuration database, etc.

As an example, the DeltaV™ control system, sold by Emerson Process Management includes multiple applications stored within and executed by different devices located at diverse places within a process plant. A configuration application, which resides in one or more operator workstations, enables users to create or change process control modules and download these process control modules via a data highway to dedicated distributed controllers. Typically, these control modules are made up of communicatively interconnected function blocks, which are objects in an object oriented programming protocol that perform functions within the control scheme based on inputs thereto and provide outputs to other function blocks within the control scheme. The configuration application may also allow a designer to create or change operator interfaces which are used by a viewing application to display data to an operator and to enable the operator to change settings, such as set points, within the process control routine. Each dedicated controller and, in some cases, field devices, stores and executes a controller application that runs the control modules assigned and downloaded thereto to implement actual process control functionality. The viewing applications, which may be run on one or more operator workstations, receive data from the controller application via the data highway and display this data to process control system designers, operators, or users using the user interfaces, and may provide any of a number of different views, such as an operator's view, an engineer's view, a technician's view, etc. A data historian application is typically stored in and executed by a data historian device that collects and stores some or all of the data provided across the data highway while a configuration database application may run in a still further computer attached to the data highway to store the current process control routine configuration and data associated therewith. Alternatively, the configuration database may be located in the same workstation as the configuration application.

As the number and type of control and support applications used in a process control environment have increased, different graphical display applications have been provided to enable users to effectively configure and use these applications. For example, graphical display applications have been used to support control configuration applications to enable a configuration engineer to graphically create control programs to be downloaded to the control devices within a process plant. Additionally, graphical display applications have been used to enable control operators to view the current functioning of the process plant, or areas of the process plant, to enable maintenance personnel to view the state of hardware devices within the process plant, to enable simulation of the process plant, etc. However, these graphical display applications have, in the past, been created as part of or to support the specific applications with which they are associated, and thus are generally limited in usefulness to the specific process function for which they were created. For example, it is difficult, if not impossible, to use a graphical program created to support a control or other operator in a maintenance, a configuration or a simulation function.

As a particular example, some process control configuration applications presently include a library of template objects, such as function block template objects and, in some cases, control module template objects, which are used to create a control strategy for a process plant. The template objects have default properties, settings and methods associated therewith and the engineer using a graphical configuration application can select these template objects and essentially place copies of the selected template objects into a configuration screen to develop a control module. During the process of selecting and placing the template objects into the configuration screen, the engineer interconnects the inputs and outputs of these objects and changes their parameters, names, tags and other properties to create a specific control module for a specific use in the process plant. After creating one or more such control modules, the engineer can then instantiate the control module and download it to the appropriate controller or controllers and field devices for execution during operation of the process plant.

Thereafter, the engineer may use a different graphical display creation application to create one or more displays for operators, maintenance personnel, etc. within the process plant by selecting and building display objects in the display creation application. These displays are typically implemented on a system wide basis in one or more of the workstations and provide preconfigured displays to the operator or maintenance persons regarding the operating state of the control system or the devices within the plant. These displays generally take the form of alarming displays that receive and display alarms generated by controllers or devices within the process plant, control displays indicating the operating state of the controllers and other devices within the process plant, maintenance displays indicating the functioning state of the devices within the process plant, etc. However, these displays are generally preconfigured to display, in known manners, information or data received from the process control modules or the devices within the process plant. In some systems, displays are created by a graphic depiction that represents a physical or a logical element and that is communicatively tied to the physical or logical element to receive data about the physical or logical element. The graphic on the display screen may change in response to certain events, such as received data to illustrate, for example, that a tank is half full, to illustrate the flow measured by a flow sensor, etc. However, the graphical displays used for configuration, operator control, maintenance and simulation activities are generally created separately from one another using different graphical editors. Still further, the limited graphical capabilities of these displays are hard to implement and are not done so as part of any graphical object.

Thus, similar to the control configuration application, the display creation application may have template graphical display items, such as tanks, valves, sensors, operator control buttons like slide bars, on/off switches, etc. which may be placed on a screen in any desired configuration to create an operator display, maintenance display and the like. When placed onto the screen, individual graphic items may be interconnected on the screen in a manner that provides some information or display of the inner-workings of the process plant to users. However, to animate the graphic display, the display creator must manually tie each of the graphical items to data generated within the process plant, such as data measured by sensors or indicative of valve positions, etc. by specifying a communication link between the graphic item and the relevant data source within the process plant. This process is tedious, time consuming and may be fraught with error.

While the control template objects within the control configuration application and the display items within the display creation application are convenient because they can be copied and used to create many different control modules and graphical displays, there is often a need to create numerous of the same control module and graphical display for different equipment within the process plant. For example, many medium to large sized process plants have numerous instances of the same or similar equipment that can be controlled and viewed using the same basic general control module and display. To create these numerous control modules and displays, however, a general control module or display module is created and this general control or display module is then copied for each of the different pieces of equipment for which it is applicable. Of course, after being copied, each of the new control or display modules must be manually altered in the configuration application to specify the particular equipment to which it is attached and all of these control and display modules must then be instantiated and downloaded to the process control system.

Unfortunately, the control modules and displays items discussed above are not modular in any manner. Thus, after being copied, each of the control modules and displays must be manually and individually altered using the appropriate configuration application to specify the equipment within the plant to which they are to be associated. In a plant having many copies of the same type of equipment (i.e., replicated equipment), this process is tedious, time consuming and fraught with operator introduced errors. Still further, once programmed, these different control modules and displays are not aware of each other. Therefore, to make a change to the control modules once created, the engineer or operator must manually make the same change to each of the different control modules for the different replicated equipment which, again, is time consuming and tedious. The same problem applies for the graphical views created for the different sets of replicated equipment within the plant. In other words, once a specific control module or a specific graphical view is created (individually or by being copied from a template object) and is then tied to a particular set of equipment within the plant, this control module or graphical view exists as a separate entity or object within the system without any automatic awareness of the other control modules or graphical displays that are the same or similar to it. As a result, changes applicable to every one of the control modules and graphical displays of a particular type must be made individually on those modules and displays. This problem is even more evident when graphical views are created for the same equipment but in different functional contexts within the plant, such as for control viewing, maintenance viewing and simulation functions. In this case, the graphical views are created separately without any knowledge or awareness of one another.

Thus, while graphic displays have been provided in and associated with different applications used for different general activities performed within a process plant, these graphic displays and associated graphic display editors were generally added on at the functional level of the application for which they were created to support. As a result, the graphical editors, to the extent they existed, have only enabled the user to create graphics that support specific functionality needed by a specific application. Previous process plants did not provide a graphical display editor that could be used by or that could support the graphical needs of various or multiple activities being performed in the context of plant configuration and support. Thus, for example, a graphical display editor used to support or enable control configuration activities only enabled the user to create control programs and did not support the needs or functionality of operator or maintenance displays. Similarly, graphic display editors used for creating operator views, maintenance views, etc. to be provided to a control operator or maintenance technician during operation of a plant, did not support functionality associated with configuration activities, simulation activities, etc. As a result of the graphic display needs being supported at the individual functional levels of the process plant, such as at the control configuration, maintenance support, control operator support and simulation support functional levels, different ones of the displays created by these various editors end up modeling and depicting the same components within the plant, which results in the duplication of graphical display efforts by various different personnel with the process plant. This duplication of effort is manifested not only in the effort needed to create the different graphical displays depicting the same process element for different uses, but also in the effort needed to tie the graphic elements used in different display applications to the actual hardware or software elements within the process plant to which they are associated.

Because graphical support for various process plant activities has been provided after the fact, and as part of the actual activity being performed, graphical support is not integrated in the plant environment in a manner that enables common graphics to be created and used within the plant at the various different functional levels of the plant. This non-integration of graphics leads to the graphics actually created for the different functions being different from function to function or from application to application, which can lead to confusion on the part of users who, while familiar with one specific type of graphical display, might occasionally need to view different displays associated with different operations or functions within the plant. Likewise, as noted above, the provision of graphical display support at the various different functional levels of the plant leads to the duplication of graphic support, both in creating displays and properly connecting the elements within the displays to actual hardware or software elements within the plant.

Additionally, error detection and other programming is useful for detecting conditions, errors, alarms, etc. associated with control loops running on the different controllers and problems within the individual devices. Such error detection has traditionally been performed at the different functional levels of the process plant and has been displayed on graphic displays created for those different functional activities. It has been difficult, therefore, to program the process control system to recognize system-level conditions or errors that must be detected by analyzing data from different, possible diversely located devices within the process plant and even more difficult to show these types of errors on operator displays that have not been created to indicate or present such system-level condition information to operators or maintenance personnel. Also, it is difficult to animate objects within operator displays with these alternate sources of information or data for the different elements within the display.

SUMMARY OF DISCLOSURE

Graphic elements and graphic displays are provided for use in a process environment to display information to one or more users about the process environment, such as the current state of devices within a process plant. The graphic elements and displays may be associated with various logical and physical elements within the process plant during configuration of the process plant, and may be configured and downloaded to the hardware within the process plant along with other configuration items, such as control routines. In particular, the graphic elements and graphic displays may be created and stored in a library, and may then be configured by being associated with various logical or physical entities within the plant. During the configuration process, the graphic elements and graphic displays may be associated with areas, equipment, process modules, control routines or control strategies of the plant as defined elsewhere in the plant configuration, or may be associated with interfaces or display devices, to define the hardware on which the graphic displays will execute during runtime, as well at to define the process entities to which these displays will be bound for display purposes. Still further, each of the graphic displays may be defined with a role or a functional use, such as an operator view, a maintenance view, etc., and these roles may be used to define the proper access and use of the graphic displays within the runtime environment.

DETAILED DESCRIPTION

Figure 1:
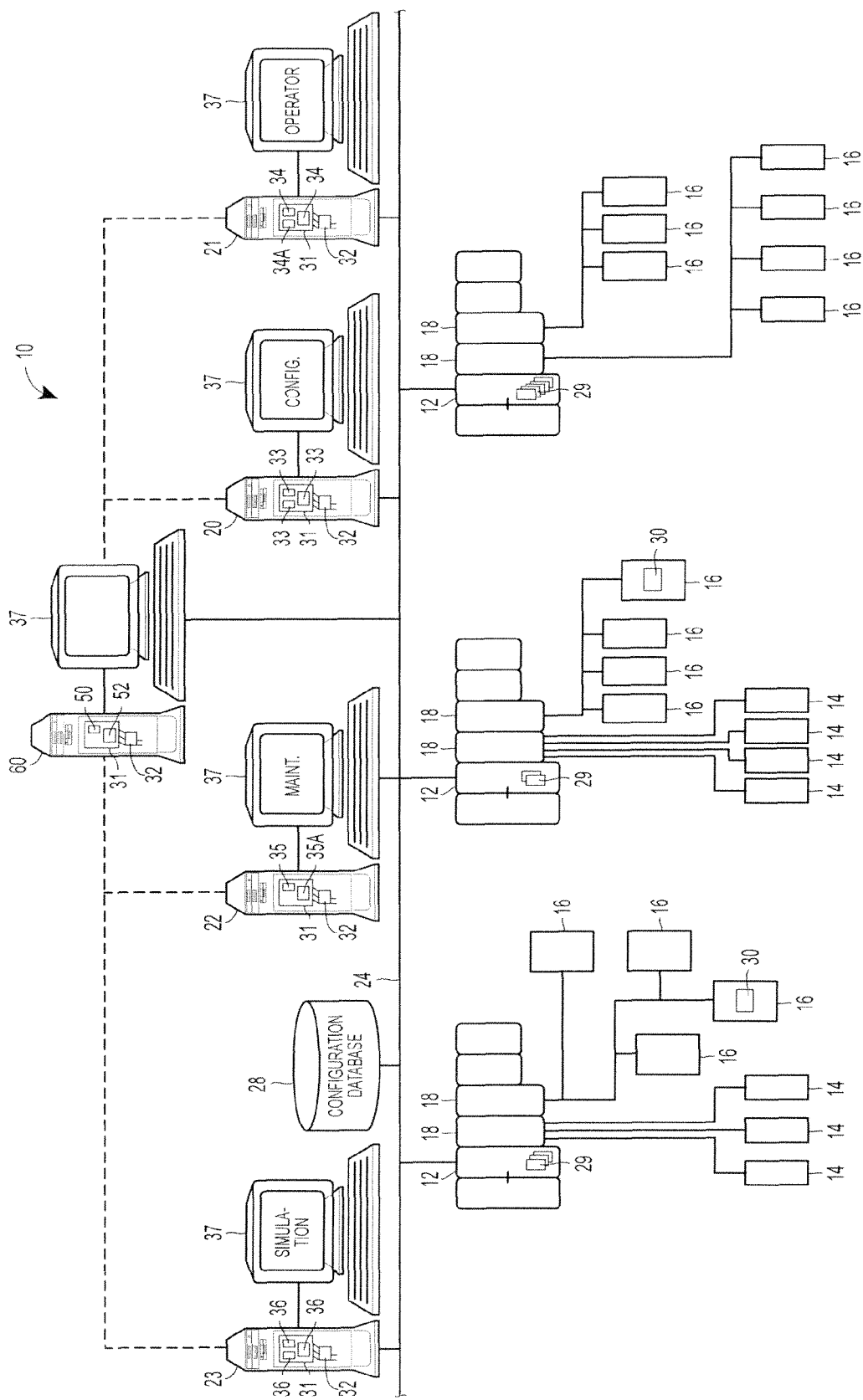
FIG. 1 is a block diagram of a distributed process control network located within a process plant including operator workstations that implement display routines and other applications associated with various functions within the process plant, as well as a workstation that provides system level graphical support that may be used to create graphic display elements and graphic displays for each of the various functional areas of the plant.

FIG. 1 illustrates an example process plant 10 in which system level graphical support is provided to various functional areas of the plant 10. As is typical, the process plant 10 includes a distributed process control system having one or more controllers 12, each connected to one or more field devices 14 and 16 via input/output (I/O) devices or cards 18 which may be, for example, Fieldbus interfaces, Profibus interfaces, HART interfaces, standard 4-20 ma interfaces, etc. The controllers 12 are also coupled to one or more host or operator workstations 20-23 via a data highway 24 which may be, for example, an Ethernet link. A database 28 may be connected to the data highway 24 and operates as a data historian to collect and store parameter, status and other data associated with the controllers and field devices within the plant 10 and/or as a configuration database that stores the current configuration of the process control system within the plant 10 as downloaded to and stored within the controllers 12 and field devices 14 and 16. The database 28 may additionally store graphical objects created in the manner described herein to provide graphical support within the process plant 10. While the controllers 12, I/O cards 18 and field devices 14 and 16 are typically located down within and distributed throughout the sometimes harsh plant environment, the operator workstations 20-23 and the database 28 are usually located in control rooms or other less harsh environments easily assessable by controller or maintenance personnel. However, in some cases, handheld devices may be used to implement these functions and these handheld devices are typically carried to various places in the plant.

As is known, each of the controllers 12, which may be by way of example, the DeltaV™ controller sold by Emerson Process Management, stores and executes a controller application that implements a control strategy using any number of different, independently executed, control modules or blocks 29. Each of the control modules 29 can be made up of what are commonly referred to as function blocks wherein each function block is apart or a subroutine of an overall control routine and operates in conjunction with other function blocks (via communications called links) to implement process control loops within the process plant 10. As is well known, function blocks, which may be objects in an object oriented programming protocol, typically perform one of an input function, such as that associated with a transmitter, a sensor or other process parameter measurement device, a control function, such as that associated with a control routine that performs PID, fuzzy logic, etc. control, or an output function that controls the operation of some device, such as a valve, to perform some physical function within the process plant 10. Of course hybrid and other types of complex function blocks exist such as model predictive controllers (MPCs), optimizers, etc. While the Fieldbus protocol and the DeltaV system protocol use control modules and function blocks designed and implemented in an object oriented programming protocol, the control modules could be designed using any desired control programming scheme including, for example, sequential function block, ladder logic, etc. and are not limited to being designed and implemented using the function block or any other particular programming technique.

In the plant 10 illustrated in FIG. 1, the field devices 14 and 16 connected to the controllers 12 may be standard 4-20 ma devices, may be smart field devices, such as HART, Profibus, or FOUNDATION™ Fieldbus field devices, which include a processor and a memory, or may be any other desired type of devices. Some of these devices, such as Fieldbus field devices (labeled with reference number 16 in FIG. 1), may store and execute modules, or sub-modules, such as function blocks, associated with the control strategy implemented in the controllers 12. Function blocks 30, which are illustrated in FIG. 1 as being disposed in two different ones of the Fieldbus field devices 16, may be executed in conjunction with the execution of the control modules 29 within the controllers 12 to implement process control, as is well known. Of course, the field devices 14 and 16 may be any types of devices, such as sensors, valves, transmitters, positioners, etc. and the I/O devices 18 may be any types of I/O devices conforming to any desired communication or controller protocol such as HART, Fieldbus, Profibus, etc.

In the process plant 10 of FIG. 1, the workstations 20-23 may include various applications that are used for various different functions performed by the same or different personnel within the plant 10. Each of the workstations 20-23 includes a memory 31 that stores various applications, programs, data structures, etc. and a processor 32 which may be used to execute any of the applications stored in the memory 31. In the example illustrated in FIG. 1, the workstation 20 is designated as a configuration workstation and includes one or more configuration applications 33 which may include, for example, control module creation applications, operator interface applications and other data structures which can be accessed by any authorized configuration engineer to create and download control routines or modules, such as the control modules 29 and 30, to the various controllers 12 and devices 16 of the plant 10. The workstation 21 is generally illustrated in FIG. 1 as a control operator viewing workstation and includes a number of display applications 34 which may provide a control operator with various displays during operation of the process plant 10 to enable the operator to view and control what is happening within the process plant 10 or in various sections of the plant. The applications 34 may include support applications 34a such as control diagnostic applications, tuning applications, report generation applications or any other control support applications that may be used to assist a control operator in performing control functions. Similarly, the workstation 22 is illustrated as a maintenance viewing workstation and includes a number of maintenance applications 35 that may be used by various maintenance personnel to view the maintenance needs of the plant 10, to view the operating or working condition of various devices 12, 14, 16, etc. Of course, the applications 35 may include support applications 35a such as maintenance diagnostic applications, calibration applications, vibration analysis applications, report generation applications or any other maintenance support applications that may be used to assist a maintenance person in performing maintenance functions within the plant 10. Additionally, the workstation 23 is indicated as a simulation workstation which includes a number of simulation applications 36 that may be used to simulate operation of the plant 10 or various sections of the plant 10 for any number of purposes, including for training purposes, for plant modeling purposes to assist in plant maintenance and control, etc. As is typical, each of the workstations 20-23 includes a display screen 37 along with other standard peripheral devices, like a keyboard, a mouse, etc.

Of course, while the various configuration, control, maintenance and simulation applications 33-36 are illustrated in FIG. 1 as being located in different workstations dedicated to one of those functions, it will be understood that the various applications 33-36 associated with these or other plant functions may be located in and executed in the same or different workstations or computers within the plant 10, depending on the needs and set up of the plant 10. Thus, for example, one or more simulation applications 36 and control applications 33 may be executed in the same workstation 20-23, while different individual simulation applications 36 or different individual control applications 33 may be executed in different ones of the workstations 20-23.

In the past, the development of the different applications used in the different functional areas of the plant 10 was performed fairly independently. Thus, the development of the configuration applications 33 was not integrated with the simulation applications 36, the maintenance applications 35 or the operator control applications 34. In fact, in many instances, a plant may have included applications for the different functional areas that were developed by different companies or software suppliers, and which were in fact developed to run independently of the other software within the plant 10. As a result of this independent development and operation of the different applications associated with the various functional areas of the plant 10, plant personnel were generally required to configure or set up a plant separately at each of the configuration, operator control, maintenance and simulation functional levels. In particular, the same or different plant personnel generally had to use different programs to establish new data structures and graphic displays at each of the functional levels. Thus, with respect to FIG. 1, each of the various applications 33-36 the performed configuration, control, maintenance and simulation functions generally included or used different graphic display editors and database structures to assist the plant personnel in performing these configuration, operator control, maintenance and simulation functions. In many instances, these different graphic display editors and databases were used to create different graphic displays to depict or model the same sections or areas of the plant 10 or the same hardware within the plant 10, and to assist different plant personnel to visualize and understand what is happening within the process plant in the context of configuration, operator control, maintenance or simulation activities.

Because the applications 33-36 and the associated displays for each of the various functions within the plant 10 were generally developed and implemented independently of one another, sometimes by different people and even different companies, the graphic displays created or used in the different functional areas of the process plant were not integrated in any consistent or easily understood manner from the standpoint of providing graphical visualization. As a result, the independent creation and execution of graphic displays at the various different functional levels of the plant led to the graphic displays looking different from function to function, so that there was not consistent look and feel to the graphic displays across the functional areas. Additionally, this independent creation led to the duplication of effort in creating graphic displays for the same sections or areas of the plant but for different functional uses, and required that the graphic displays so created be tied into and receive data from the various devices within plant 10, such as the controllers 12 and the field devices 14, 16, separately at the functional levels of the plant 10. This fact, in turn, required the duplication of database structures to track the same hardware elements for the different displays. Thus, for example, in the past, a first application (e.g., one of the applications 35) was used to create a maintenance display that illustrates a section of the plant 10 for maintenance purposes while a second application (e.g., one of the applications 34) was used to create a control operator display that illustrates the same section of the plant 10 for control purposes. The displays created separately by these different display editors could be quite different in look and feel, making it difficult for a user to switch back and forth between the maintenance display and the operator display without becoming easily confused or without requiring training on each type of display. Likewise, effort was duplicated in creating both displays independently in the different applications 34 and 35, and additional effort was expanded to create database structures to separately tie or connect the maintenance display and the control operator display to the same hardware elements within the plant 10 to receive sometimes the same or similar data from those hardware elements.

To alleviate these inefficiencies and to provide for more widely usable and understandable graphics within the plant 10, a graphical support layer is provided at a system level of the process plant 10 to support the graphic display and data structure needs of each of the various functional areas of the plant 10, including the configuration, operator viewing, maintenance viewing, simulation and other functional areas of the plant 10. This system level of support is depicted diagrammatically in FIG. 2, which illustrates a plant operational level 40, a plant functional level 42 and a system level 44. As will be understood from FIG. 2, the plant operational level 40 includes the controllers 12, field devices 14, 16, etc. which execute the control routines or modules 29 and 30, as well as other software run within the plant 10 to implement plant operations during runtime of the plant. The plant functional level 42 is depicted as including a configuration function block 46, a control function block 47, a maintenance function block 48 and a simulation block 49, although other or different functions, such as an engineering and a business function, could be provided as well. The configuration function block 46 implements the configuration routines 33 which interface or communicate with components within the plant operational level 40 to provide control strategies or control modules thereto. The control function block 47 includes the control viewing and other applications 34 and 34a which also interface or communicate typically directly with the various physical and logical components within the plant operational level 40 to implement operator initiated changes within the plant 10, to provide information to the operator via control displays 34, to acquire data for the control applications 34a, etc. The maintenance function block 48 includes the maintenance routines and applications 35 and 35a which interface or communicate with various physical and logical components within the plant operational level 40 to implement maintenance procedures, to collect maintenance data, to provide maintenance data or information to a maintenance person via maintenance displays 35, to run diagnostic applications 35a, etc. Likewise, the simulation function block 49 includes simulation routines 36 which implement simulations of the plant 10 and which may be communicatively coupled to components within the plant operational level 40 to obtain data regarding the plant 10.

Figure 2:
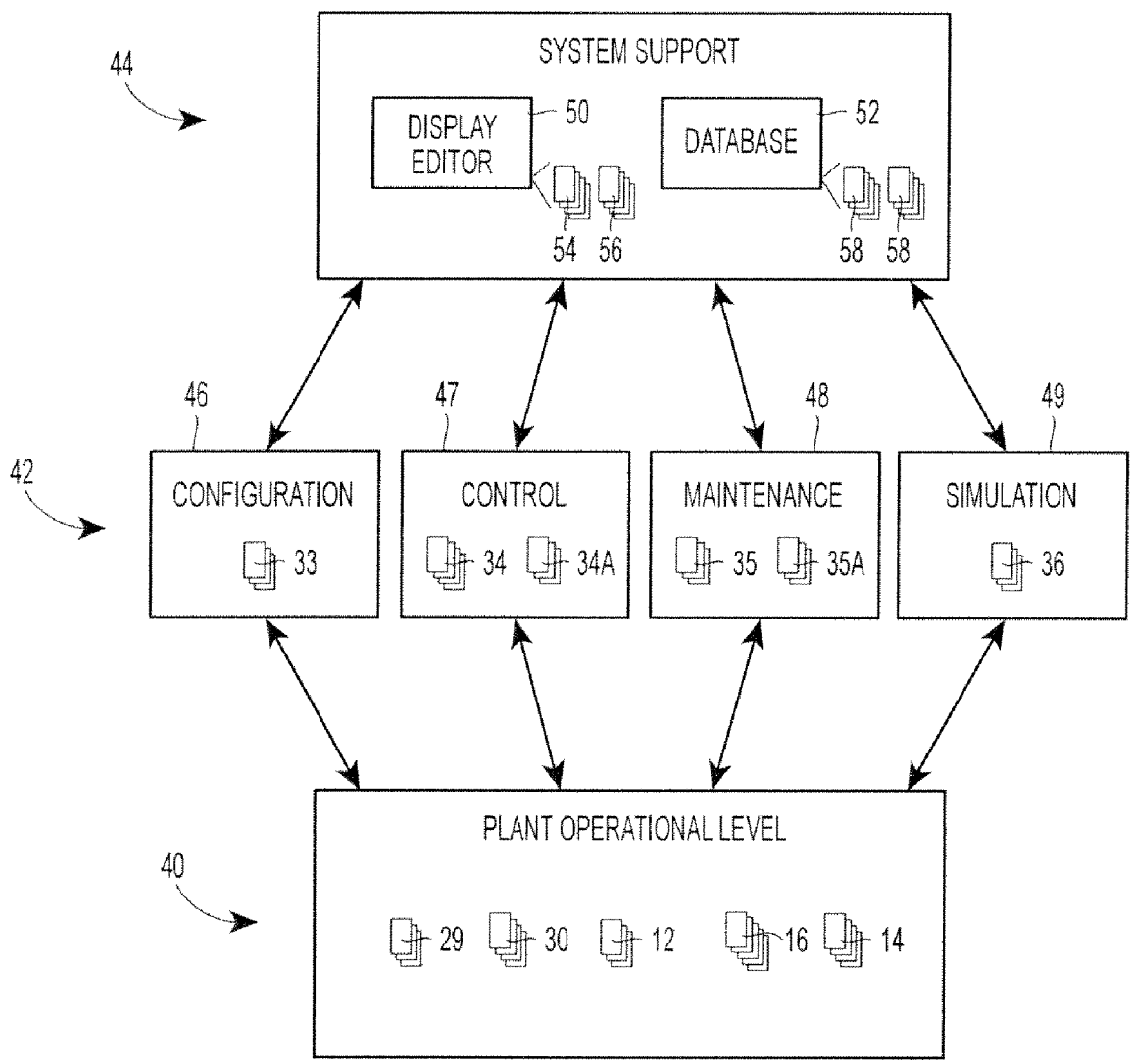
FIG. 2 is a logical block diagram illustrating the integration of system level graphical support within a process plant control, viewing and simulation system.

As illustrated in FIG. 2, the system level support layer 44 ties into and supports each of the function blocks 46-49 within the plant functional layer 42 to enable, for example, the creation and maintaining of common database and display structures, such as software objects, graphic elements and graphic displays for use in the various functional areas 46-49. More particularly, the system level support layer 44 includes application, database and graphical support elements that enable the graphical activities performed in each of the function blocks 46-49 to be integrated together, or to be developed using common database structures and graphic elements created at the system support layer 44. To provide this system level support, the system support layer 44 may include a graphical editor 50 and a graphical object database 52. The graphical editor 50 may be used to create graphic elements 54 and graphic displays 56, while the graphic object database 52 stores the elements 54 and displays 56 in a memory accessible by the editor 52 and by the various applications in the blocks 46-49. The database 52 may also store other objects 58 and data structures that connect the graphic elements 54 to individual hardware and software elements within the plant operational level 40. Additionally, the database 52 may store graphic element or display templates or primitives that may be used to create further graphic elements or displays. As will be understood from FIG. 2, the graphic display elements 54, displays 56 and other database structures 58 may be used by in any and all of the functional blocks 46-49 to create and use graphics associated with those functional blocks.

Generally speaking, the system level support block 44 provides a manner of integrating the graphics used in the process plant 10 of FIG. 1 in all of the functional areas 46-49, to thereby reduce or eliminate the necessity of repeatedly creating different graphic elements for the same plant equipment in different functional contexts, and to make it easy for a user in each of the functional areas 46-49 to tie into data associated with the equipment being displayed in graphical views associated with those functional areas. As will be understood, the system level support layer 44 may be used to provide graphics and database support for multiple applications in each of the functional areas 46-49, for different applications in different ones of the functional areas 46-49, etc.

Referring again to FIG. 1, the system level support block 44 may be implemented using an additional workstation or user interface 60 which may be connected to each of the other workstations 20-23. The workstation 60 may generally store the graphics editor 50 and database 52 and may store the other elements 54, 56 and 58 if so desired. Additionally, the workstation 60 may be communicatively connected to the workstations 20-23 via the databus 24, via separate wired or wireless communication connections (illustrated by dotted lines in FIG. 1) or in any other desired manner. In the configuration illustrated in FIG. 1, the workstation 60 stores and executes the display editor 50 to enable a user to create graphic elements and to group such elements into one or more graphic displays, both of which are referred to herein as display modules. These display modules may be then stored in the database 52 to be accessed and used by various ones of the functional blocks 46-49 illustrated in FIG. 2 and implemented on the various workstations 20-23. While, for the sake of illustration, the functionality of the system level block 44 and the function level blocks 46-49 is illustrated as being implemented on different or separate workstations 20-23 and 60 in FIG. 1, it will be understood that any or all of the applications associated with any of these various blocks could be implemented on the same or different workstations or other computers within or associated with the process plant 10. Thus, the graphics editor 50 may be stored in and executed on any of the other workstations 20-23 or on any other computer associated with the plant 10 and need not be in a stand-alone or separate computer.

As discussed above, the system level layer 44 of FIG. 2 implements system level display and database objects, which can be used in a variety of the functional environments as well as to provide higher level display capabilities. Generally speaking, the display objects created at the system level 44 of FIG. 2 can be categorized as graphic elements and graphic displays. Graphic elements are generally primitive or low level display objects that are associated with a particular physical entity within the plant, such as a hardware device like a valve, a sensor, a pump, a controller, etc. Graphic displays are generally made up of a set of interconnected graphic elements and are used to represent and model more complicated sets of hardware within a plant, such as a unit, an area, etc. and includes interconnections between different hardware units. Additionally, graphic displays may include graphs, charts and other data provided from the plant, from other applications, such as diagnostic and business applications running in the workstations 20-23 and 60, etc.

Figure 3:
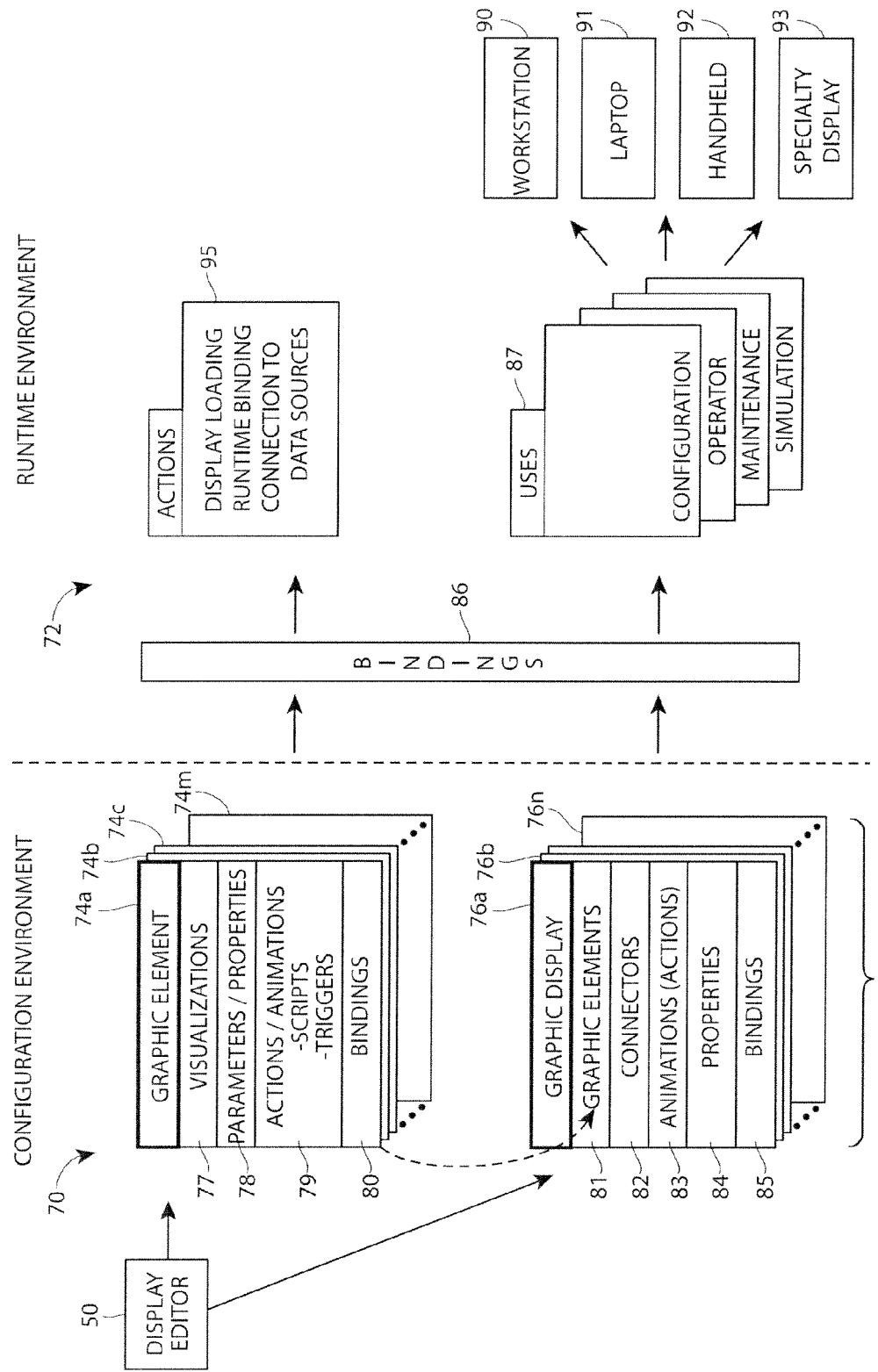
FIG. 3 is a logical diagram illustrating a configuration environment in which graphic elements and displays are created and a runtime environment in which graphic elements and displays may be executed.

FIG. 3 generally illustrates the development and use of graphic elements and graphic displays in two environments in which these elements and displays may exist, in particular, a configuration environment 70 and a runtime environment 72. Generally speaking, display objects in the form of graphic elements 74 (depicted as separate element objects 74a, 74b, etc.) and graphic displays 76 (depicted as separate display objects 76a, 76b, etc.) are created in the configuration environment 70 using, for example, the display editor 50. After being created, the objects 74 and 76 may be stored in the database 52. The objects 74 and 76 may be created as class objects, referred to herein as display module class objects, which define a generic object not bound or tied to specific hardware or logical elements within the process plant 10. However, class objects can be used to create runtime graphical objects having the same basic properties as the class objects, but which are tied or bound to specific hardware within the process plant 10. Generally speaking, however, class objects remain tied to the children objects instantiated therefrom, so that changes to the class objects can be automatically propagated to the children objects, even when these children objects are instantiated within a runtime environment.

As illustrated in FIG. 3, each of the graphic element objects 74 includes a number of components that make the graphic element useful in many different contexts. In particular, each graphic element 74 includes one or more visualizations 77, any number of parameters or properties 78, any number of actions or animations 79 which may be implemented using scripts or triggers, and bindings 80. Generally speaking, each visualization 77 defines the visual properties or elements to be actually displayed on a display screen when the graphic element 74 is implemented in the runtime environment 72. Typically, visualizations define a representation of a physical or logical device or group of devices, although a visualization could represent other entities. Visualizations 77 may be implemented in the runtime environment 72 using any desired description or programming paradigm that defines the specifics of the graphical depiction of an entity. In one embodiment, the visualizations 77 may be implemented using PGXML or Avalon controls, which are well known controls provided by Microsoft® and which, because they are object based, provide a manner of making the visualizations easily implementable in standard Windows® type displays and portable between display environments. This feature will be discussed in greater detail below and is explained in co-pending application entitled "Markup Language-Based, Dynamic Process Graphics in a Process Plant User Interface", which is incorporated by reference herein.

Generally speaking, the parameters and properties 78 define variables or other properties such as static or changeable intrinsic properties, associated with the entity being depicted by the visualization and these properties are definable by the creator of the element 74. Likewise, the actions and animations 79 define routines or programs (which may be implemented as scripts which perform transforms on properties, which detect conditions of a process entity based on property values, etc.), animation routines which may include any routines that change the graphic visualization or behaviors to be performed on or using the visualization 77 when the visualization 77 is depicted on a display screen, or routines which enable a user to use or interact with the visualization 77 to cause a change in the process, such as a change to an input to the process. These actions and animations provide the visualization 77 with more interesting, understandable or helpful graphical properties and to allow the user to interact with the visualization 77. In one case, these actions or animations may take the form of changes in color, size (e.g., height and width, line size, fonts, etc.) of various components of the visualization, color fills, and animations such as changes in color, rotations, changes in size and scaling, skewing, etc. These actions and animations provide graphical properties as well as user interaction properties to the graphic element 74. The bindings 80, which may be static or fixed bindings or bindings which use aliases, define the manner in which the parameters or properties 78 are to be bound to data, tags or other entities within the runtime environment 72 when the graphic element 74 is implemented as part of a display in the runtime environment 72. Basically, the bindings 80 for each graphic element 74 establish the manner in which the graphic element 74 is tied to one or more entities or data elements defined elsewhere in the plant environment, and thus define an interface between the actual runtime environment 72 and the graphic element 74.

As illustrated in FIG. 3, each of the graphic display objects 76 includes numerous components, such as a reference to or a copy of one or more graphic elements 81, connector elements 82, actions and animations 83, properties 84 and bindings 85. Generally speaking, a graphic display 76 may be a display that depicts the interaction of various graphic elements 81 which may be visually connected together with connector elements 82 representing pipes, lines, conveyor belts, etc. Such connector objects are described in U.S. Publication No. 2004/0153804. A dotted line in FIG. 3 illustrates a reference to one of the graphic elements 74 by the graphic display object 76a. It will be understood that the graphic display 76 that references a graphic element 74 includes all of the properties, parameters, actions and animations, etc. of that graphic element 74. Similar to the graphic elements 74, each graphic display 76 may include one or more additional actions or animations associated therewith that perform, for example, animations on the display, user interface interactions, data manipulations, etc. Likewise, each graphic display 76 may include any number of properties associated with the display, and typically these properties define properties of units, areas, or other groups of elements depicted within the display. Of course, the bindings 85 define the manner in which the graphic display 76 is tied to one or more entities or data elements defined elsewhere in the plant environment and thus define an interface between the actual runtime environment 72 and the graphic display 76.

Once created, the graphic elements 74 and the graphic displays 76 may be bound to and executed in the runtime environment 72 on, for example, any of the workstations 20-23 of FIG. 1. In particular, after a graphic element 74 or a graphic display 76 is created as a class object and is stored in the database 52, that element or display may be instantiated as an actual runtime object and may be executed in the runtime environment 72. As illustrated by the block 86, the instantiation process fills in the bindings defined in the objects 74 and 76, which may be accomplished using one or more resolution tables that may be loaded with proper variable names, tags, aliases etc. within the process plant or process control system to provide a specific connection between actual entities within the process plant and the graphic objects running on a display device within the plant 10. As part of the binding process, the objects 74 and 76 connect to data sources within the process plant as defined by the resolution table, and thereby gain access to the plant so as to be logically and communicatively connected to the process plant 10.

As illustrated by the blocks 87, a display element 74 or a graphic display 76 can be executed in or as part of a number of different functions within the runtime environment 72, including a configuration display, a control operator display, a maintenance display and a simulation display, to name but a few. Additionally, the display objects 74 and 76 may be used in performing system level functions, e.g., ones that use data from various ones of the functional levels depicted in FIG. 2, including for example, predictive control or predictive maintenance functions, system level error detection, diagnostics, etc. In fact, the displays 76, once created in the configuration environment 70 and stored in the database 52 may be used for a number of different activities. Still further, the display objects 74 and 76 may be executed on any desired display or computer hardware, such as a workstation 90, a laptop computer 91, a handheld device 92, like a personal data assistant (PDA), a telephone device, etc., or any other specialty display 93, such as a large screen display having multiple monitors, etc. If desired, a single graphic display 76 may be layered to include one or more views, such as configuration view, an operator view, a maintenance view and a simulation view. Alternatively, separate graphic displays 76 may be configured to provide these separate views using the same or similar graphic elements 81, to provide a consistent look and feel across displays created for these various functions.

As illustrated by the block 95, to be ported to the runtime environment 72, a graphic element 74 or a graphic display 76 may be copied or instantiated, and loaded onto the runtime machine. Generally speaking, it is desirable that the display object 74 or 76 be bound to the runtime environment 72 only when called up or actually executed on a runtime machine, which is referred to herein as runtime binding. That is, the resolution table for each of the instantiated objects is only filled in or bound to the runtime environment when the display object is actually running or being executed in a runtime computer. This procedure assures that the display object including its visualizations, controls, scripts, etc. only executes and thereby uses processing power when the visualization(s) of the object are actually being rendered on a display screen. Thus, the display object is preferably only bound to the runtime environment 72 when that object is actually running on a runtime computer, which means that the display objects 74 and 76 may be intermittently connected to the runtime environment 72 in a manner defined by the activities of the users viewing the visualizations created by these objects. In particular, these objects may be bound to a runtime environment 72 at the times at which they are required to be viewed, and may be unbound or released when not being viewed by a user, such as when a user minimizes or closes a screen in which these objects are providing a visualization.

The display objects 74 and 76 are thus objects which may be created in a stand-alone environment, i.e., the configuration environment 70, but which may be tied or connected with other objects or data structures defined within the process plant environment or any application running within the process plant environment, including, for example, objects, data structures, applications, etc. defined in any control, simulation, maintenance, or configuration environment. Furthermore, once created, the display objects 74 and 76 may be bound to physical or logical process entities directly, via direct references, variables or tags defined a resolution table, or indirectly through the use of alias names, variables and parameters, which may be resolved either when the display object 74 or 76 is downloaded or instantiated within the a runtime environment 72, or in some cases, when the display object 74 or 76 is actually running within the runtime environment 72.

The display editor 50 of FIG. 3 may enable the display objects 74 and 76 to be created at various levels of detail, to enhance the ease of use and the versatility of the display objects 74 and 76. For example, graphic elements 74 may be created first to define the properties and operations of more primitive physical and logical entities, and graphic displays 76 may then be created by interconnecting one or more graphic elements 74 to create higher level or more complicated displays depicting more complicated physical or logical entities, or groups of physical or logical entities. Of course, both graphical elements 74 and graphical displays 76 may be stored and accessed in various different categories, to make the creation of higher level display objects more simple to the user.

Figure 4:
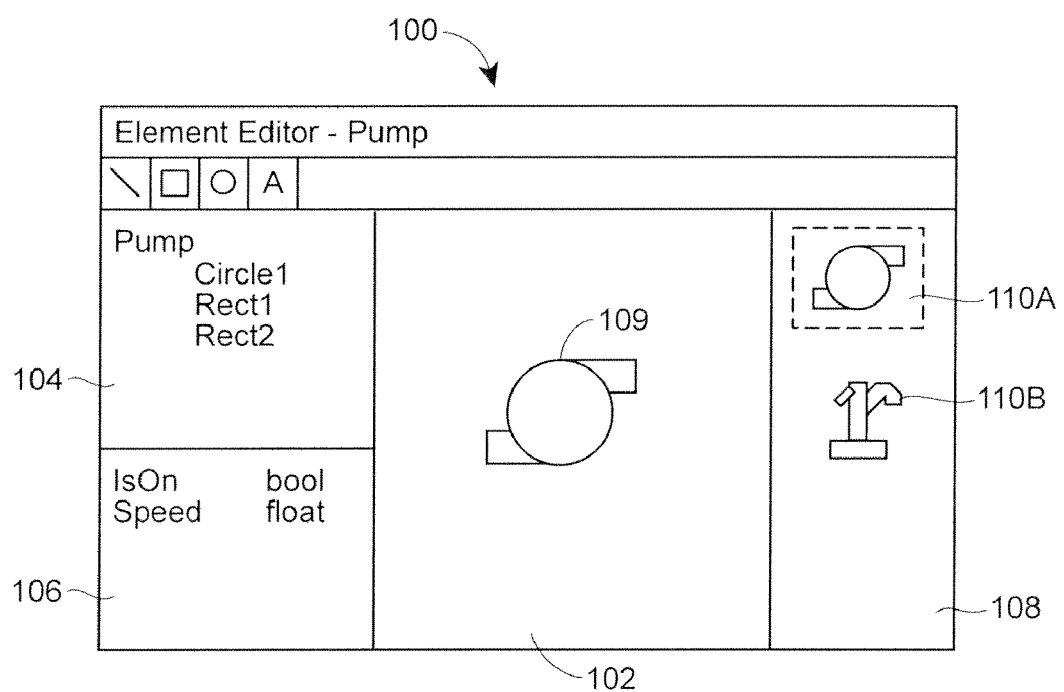
FIG. 4 is a simplified display screen produced by a graphical editor to enable a user to create or edit a graphic element in the form of a pump element.

FIG. 4 illustrates an example screen display 100 that may be created by the display editor 50. The screen 100, which is depicted in the process of creating a graphic element for a pump, includes a main edit section 102, an element hierarchy section 104, a property definition section 106 and a visualization section 108. The main edit section 102 provides a working space for the user or designer to define or create a visualization for the graphic element and thus to define the visual properties of the graphic element, in this case a pump illustrated with a visualization 109. Generally speaking, the element hierarchy section 104 provides, using a hierarchical view or a tree structure, the components associated with the visualization 109 within the main edit section 102. In the example of FIG. 4, the hierarchy section 104 shows that the visualization 109 being defined in the main edit section 102 includes primitives or sub-elements of a circle (named Circle1) and two rectangles (named Rect1 and Rect2). While not shown in FIG. 4, the hierarchy section 104 may include indications of animations, actions and other display features, such as scripts, visual triggers, etc. defined for the visualization 109.

The property definition section 106, illustrates all of the properties, including intrinsic properties, currently defined for the graphic element associated with the visualization 109 shown in the edit section 102. The example screen 100 of FIG. 4 illustrates two properties including an IsOn property, which defines whether the pump associated with the visualization 109 is on or off, and a Speed property, which defines the speed of the pump associated with the visualization 109. The user or designer could add other properties and parameters to the graphic element by defining the names, types and bindings of other variables, properties, etc. within the property definition section 106 to thereby define other aspects of the graphic element. The two properties shown in the section 106 of FIG. 4 are listed as being Boolean and floating point variables. However, other types of variables could be used instead or as well. Thus, for example, the properties defined in the section 106 could be arrays, tables, enumerated lists or any other types of variables or data structures.

If desired, the graphic element being defined within the screen 100 may have multiple visualizations associated therewith. The different ones of these visualizations may be depicted in the visualization section 108 and may be selected individually to be placed into the main edit section 102. For example, two visualizations 110A and 110B are shown in the visualization section 108 of FIG. 4, but any other number and type of visualizations could be defined for the graphic element being created. During the graphic element creation process, each visualization may be placed in the main edit section 102, such as by right clicking or double clicking on an indication of the visualization in the section 108, dragging and dropping the indication of the visualization onto the edit section 102, etc. Once placed in the main edit section 102, a visualization may be edited to define or re-define its display properties. Generally speaking, one of the visualizations will be set or defined as the default visualization for the graphic element being created. This default setting may be indicated in some manner, such as by the default visualization being highlighted, surrounded with a dotted line in the visualization section 108, as illustrated for the visualization 110A in FIG. 4, or in any other manner.

Generally speaking, the visualizations created by the element editor 50 may be made up of one or more composites of various shapes which are placed or grouped together in a defined manner. These visualizations may, therefore, be referred to as shape composites. For example, shape composites may include circles, lines, points, polygons, squares, rectangles, triangles, or other simple graphic shapes. When defined in this manner, separate actions or animations may be applied to or associated with each of the different shapes making up a shape composite. Of course, shape composites may include more elaborate artistic renditions of elements. To define or build up a shape composite, a user or designer may add any number of primitive graphic elements to the main edit section 102 and group these primitives together in any desired manner. Once created, shape composites define the visualization for an actual object, which might be implemented in the runtime as an XAML object, that will be displayed on a screen or display as a visualization when the graphic element is used in a runtime environment. The shapes or primitives making up the shape composite may illustrated in a composite hierarchy in the hierarchy section 104.

The creation of multiple visualizations for a single graphic element enables different visualizations to be used in different contexts or for different uses, so that displays created for the different purposes within the plant may be created from the same graphic element (i.e., created from the same graphical class object) while displaying different visualizations of a common element. For example, different ones of the visualizations 110A, 110B, etc. may be used in different functional contexts, so that a first visualization 110A may be used when the graphic element is used as part of a control operator's display, a second visualization 110B may be used when the graphic element is used as part of a maintenance display and a third visualization (not shown) may be used when the pump element is used in a simulation display. On the other hand, different visualizations may be used for display purposes on different types of display devices. For example, a first visualization of a graphic element may be suitable for use on a typical computer or workstation, while a different visualization may be created to be advantageously used on a handheld device, like a PDA or a telephone device, while a still further visualization may be created for large screen displays, or a multiple screen monitor. As will be understood, different visualizations for a graphic element may be tailored based on the size of the display on which the visualization is to be displayed, so that a first visualization may be created that is suitable for a larger screen, such as a typical computer screen, and second visualization may be created that is more suitable on a screen that is significantly smaller, such as a display screen of a handheld device, like a PDA or a wireless telephone device. Thus, different visualizations for the same graphic element may be used in different runtime devices.

On the other hand, different visualizations may be added to the graphic element at different times in the development cycle of the graphic element. For example, a configuration engineer, who may not be adapt at drawing or producing pleasing visualizations, may produce a first, primitive visualization that is preliminary and basic in nature (such as a stick figure type drawing) when first creating the graphic element and may store this visualization as part of the graphic element at that time. At a later date or time, a skilled draftsperson or artist may create a more elaborate and artistically pleasing visualization and can add that second visualization to the graphic element as an alternative visualization. If desired, at that time, the second visualization can be set as the default visualization, and this second visualization can be propagated throughout all of the runtime graphic elements that have been instantiated from the master or class graphic element, so that this second visualization shows up in or is available for use in the runtime displays.

In another example, different visualizations may be provided for the same graphic element to support different themes, graphical standard, norms or styles of displays. As is known, different industries typically use different graphic norms or graphical standards for depicting pumps, valves, sensors, and other process plant entities. Thus, the oil and gas industry uses different graphical standards than does the pharmaceutical industry. Using the element editor 50, it is possible to provide different visualizations for each graphic element to support multiple graphical standards or norms, such as the oil and gas norm and the pharmaceutical norm. In this manner, the same graphic element may be used in graphic displays created to support different standards or norms or themes of displays, e.g., displays acceptable or useful in different industries. Still further, different graphical styles, such as artistic styles may be used in different visualizations to enable a user to create displays of various artistic types. Of course, these are only a couple of examples of the benefits of providing multiple visualizations for the same graphic element, and other uses for these multiple visualizations exist as well.

If desired, the graphic element may have one or more graphical behaviors defined or associated with it. In particular, a designer or creator may define animations, such as rotations, linear translations, background changes, color changes, resizing, color gradient animations, opacity animations, font characteristic animations, videos and video features, such as start/stop features, two-dimensional or three-dimensional changes, etc. for each visualization of the graphic element when the visualization is displayed on a screen. To add this dynamic behavior, the user may select a graphic element and opt to add an animation (also called an animation routine) to the visualization. At this point the user may enter configuration information pertaining to the selected animation or may define the desired behavior using scripts, which may be entered using, for example, dialog boxes, expression editors, etc. When defined, these scripts may show up in the hierarchy of the hierarchy section 104. Basically, a script is a program or routine that will run or execute as part of the display element when the visualization for the display element is being viewed or presented on a screen during a runtime activity. Although it is not necessary, these behaviors or scripts may be tied to and operate on one or more of the properties or parameters defined for the graphic element. For example, a script may be associated with a graphic element to change a color within the visualization of the graphic element based on the value of one of the properties defined in the property section 106 of the graphic element. For example, the color of the pump visualization 109 may change from yellow to green when the IsOn property (which is bound to the runtime environment) is True, i.e., when the pump is turned on. As another example, a script may be defined for the pump element that compares the value of the Speed property of the pump to a set point and, if the value of the Speed property is above a certain level, causes a graphic animation of some kind within the visualization 109. This animation may include, for example, turning the pump red, rotating the pump, showing a motor within the pump rotating, causing the pump visualization to pulsate or vibrate, etc.

The scripts defined for a visualization to, for example, provide animation or other behaviors for the visualization, may be designed to operate on individual ones of the shapes or primitives within a shape composite making up the visualization, or on multiple ones of the shapes within the shape composites. Because the scripts operate on or use the intrinsic properties, which are bound to actual physical elements in the runtime environment, these scripts enable the visualization to change based on actual plant operations, or based on data from other areas of the process plant that reflect the properties of an actual entity associated with the graphic element.

It will be understood that different types of graphic elements may have different graphics that may be appropriate for use therewith. Thus the behaviors that may be provided for a graphic element are not limited by the examples provided herein. For example, graphic elements for rotating equipment might include scripts that provide vibrational graphics, movement, color changes, etc., while graphic elements for equipment such as sensors may include scripts that depict an over or under limit condition, a need for calibration condition, etc. Of course, any properties may be used or defined for graphic elements and these properties will generally be based on the type of entity being represented. It will also be understood that various scripts may be provided for each of the different visualizations, to provide different behaviors for the different visualizations. On the other hand, some scripts may be used to provide behavior for each of the visualizations associated with a graphic element.

Additionally, scripts or other routines may be associated with a graphic element to detect certain conditions about the associated physical entity based one or more of the parameters for the graphic element. These conditions may include detecting states of the entity, including a physical state, a status like a communication status, a device status, a value status, etc. associated with the entity. All these detected conditions or states may be reflected on the graphic using an animation or other action or behavior tied into the state or value produced by the script. For example, a script may be provided for a pump graphic element that detects an overheating condition of the associated pump based on one or more parameters for that element, that is, one or more of the parameters defined or exposed in the property section 106 of FIG. 4. As another example, a script may be provided for a graphic element to detect excessive vibration, or any other condition of the pump. If a condition, such as overheating or excessive vibration, is detected, an animation or other action associated with the graphic element may operate on the condition to provide a graphical indication of the condition within or on the visualization of the graphic element.

Figure 5:
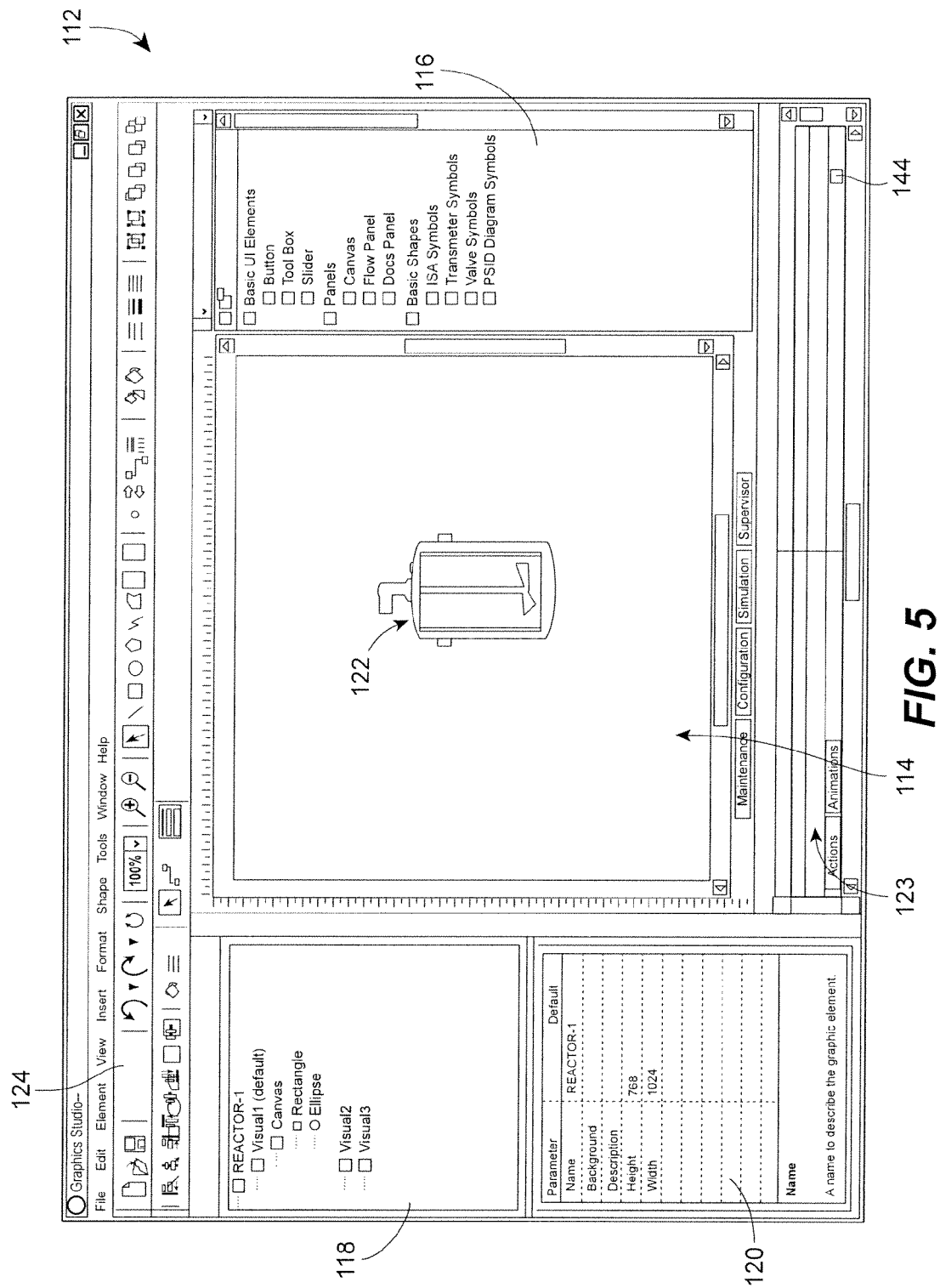
FIG. 5 is a further display screen produced by a graphical editor while producing a graphic element in the form of a reactor.

FIG. 5 illustrates another example screen display 112 that may be produced by the display editor 50. Similar to the screen 100 of FIG. 4, the screen display 112 includes a main edit section 114, a pallet view 116, a hierarchy view 118 and a property view 120. A first visualization of a reactor element 122 is depicted in the main edit section 114. As shown in the hierarchy view 118, the title of the element is Reactor1 and this element includes three visualizations named Visual1 (the default visualization), Visual2 and Visual3. As indicated beneath the Visual1 heading in the hierarchy view 118, the first visualization is made up of a Canvas background which includes a rectangle element and an ellipse element. The currently defined properties, in this case a name, a height and a width of the visualization, are listed in the property view 120. When a visualization is selected in the hierarchy view 118, any of the child primitives or elements associated with the visualization are shown in the edit view 114 and the properties of the currently selected element are displayed in the property view 120.

In the screen 112, the pallet view 116 includes a number of basic elements that can be used to create a visualization. For example, the pallet view 116 includes a set of basic UI (user interface) elements, such as buttons, text boxes, sliders, knobs, etc., a set of basic panels, and a set of basic shapes. The defined panels may include a canvas panel which defines an area in which the user can explicitly position elements by coordinates relative to the canvas area, a dock panel which defines an area in which the user can arrange elements either horizontally or vertically relative to one another, and a flow panel which may be used to break, wrap and align its content within a flow panel area with a flow direction indicated. Flow directions may be, for example, any combination of top, right, left and bottom, such as left to right and top to bottom, or right to left, top to bottom, etc. Still further, the basic shapes in the pallet view 116 may include ISA (Instrument Society of America) symbols, transmitter symbols, valve symbols, PI&D diagram symbols or other control symbols, etc. or any other desired shapes, all of which can be used to build a graphic element.

Of course, other basic elements, such as basic control elements, devices, etc. may be provided as primitives in the pallet view 116 to be used to create visualizations for a graphic element being defined. The pallet view 116 may also provide a list of user defined categories or elements, which may be created to allow users to drag any other useful shapes from the pallet view 116 to the edit view 114. If desired, access to such user defined categories may be limited to the users who create them and these categories and elements may be stored in a user preference file associated with a particular user. However, built in categories and pallet items may be stored in the database and may be available globally to all users. In any event, the pallet view 116 may be used to display or provide access to libraries of primitive elements that may be used to make up a graphic element, and these libraries can be locked, versioned, limited to particular users, etc. as desired.

As noted above, any of the visualizations for a graphic element can have animations and/or actions associated therewith, and such animations or actions may be shown in a action/animation view 123 of the screen 112. When visualizations include animations or actions, these animations or actions can also be indicated in the hierarchy with special symbols such as stars, etc. When selected in the hierarchy view 118, any actions or animations defined for a visualization or a sub-element of a visualization will be shown in the action/animation view 123. Actions or animations may be created and assigned by defining such actions or animations in the view 123 or by adding such actions or animations to the hierarchy view 118. When a user wishes to create or edit an action or animation, the editor 50 may provide a dialog or edit box to allow this feature to be fully specified or defined. Of course, actions or animations may be defined using scripts, visual triggers or other programs.

During use of the screen 112, a user or designer may create a visualization of an element by dragging and dropping or otherwise selecting different items in the palette view 116, and arranging these items in the edit view 114 to create the desired visualization. One or more toolbars 124 can be used to provide any standard editing functions such as adding new visualizations or animations, deleting, removing, editing animations, arranging primitives or elements from for example backward to forward, providing for connection elements to show or enables connections to be made to the visualization being created, grouping different primitives together so that they hold their position relative to one another, adding static elements like lines and text, etc.

Figure 6:
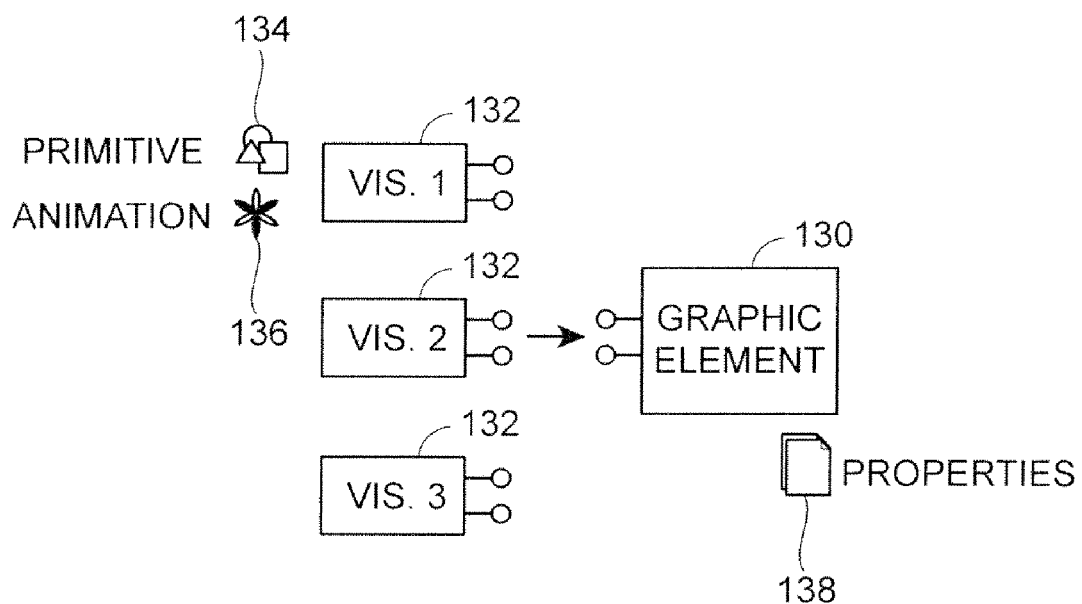
FIG. 6 is a block diagram illustrating one manner in which various visualizations may be tied to or associated with a graphic element.

As illustrated in FIG. 6, a graphic element 130 may have multiple visualizations 132 or visual representations associated therewith, it being understood that the different visualizations 132 may be used at different times or in different displays in which the graphic element 130 is used. As explained above, any of the visualizations 132 may be made up of any number of primitives 134 as well as animations and actions 136. Still further, the graphic element 130 may include any number of properties or parameters 138, which may be tied into or used by the actions and animations 136 to perform changes to the visualizations 132 and to operate visual triggers associated with the visualizations 132. Still further, the visualizations 132 or individual primitives making up a visualization 132 may have actions defined for pre-defined events, for example, mouse over events, mouse click events, etc. These actions (which are also referred to as routines) enable event handlers to be set or defined to further customize the behavior of the graphic element 130 and to allow a user to interact with the visualization 132 to, for example, cause a change within the runtime environment. In particular, the user may interact with the visualization 132 by entering values or other numbers or information therein, moving an element on the visualization, such as a slider bar, or by taking some other action to change, for example, a property within the visualization. This visualization property change may be tied, via a script or directly, to a process input, such as a process runtime variable to cause that variable to change. In particular, the visualization property may be connected to a property defined for the graphic element which, in turn, may be bound to a process input. In this manner, a user may interact with the visualization via an action or animation routine to cause a change or to provide an input to the process or other runtime environment, such as a simulation environment.

If desired, a visualization 132 may be connected to the graphic element 130 either by being specified by a user or by being specified programmatically. In particular, the graphic element 130 may expose an enumeration property that allows the visualization to be programmatically changed based on, for example, the manufacturer of the element being represented by the graphic element, or other parameters associated with the graphic element 130, such as the state of the device associated with the graphic element.

Figure 7:
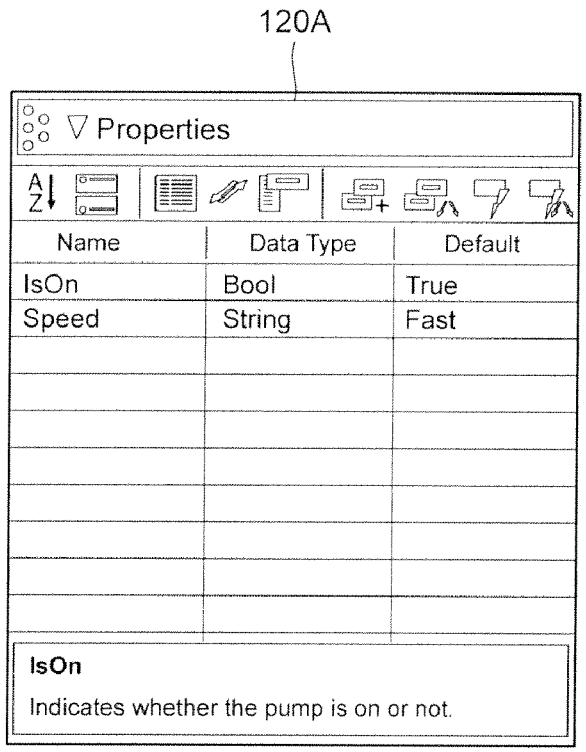
FIG. 7 depicts a section of a screen display showing a first property view associated with a graphic element.

As noted above, the properties view 120 of FIG. 5 provides or shows the properties and events defined for the selected item in the hierarchical view 118 and thus for the item depicted in the main edit view 114. A user may toggle among properties, intrinsic properties and events within the properties view 120 using, for example, toolbar buttons. FIG. 7 shows a property view 120A in which the intrinsic properties are shown, in this case including an IsOn and a Speed property. In this case, the properties view 120A shows the data type of these variables and any default settings for these variables. As noted above, the user can add to, delete from or edit this property list to define properties with any desired data type, including enumerations, table structures, etc. If desired, the properties view 120 may also show any runtime bindings defined for these properties and these runtime bindings may be fixed variables or tags or may be tags using aliases that are filled out at runtime or downloading, of the graphic element to a runtime machine.

The values of the properties defined for a graphic element can be used as triggering conditions for animations, actions, etc. and these behaviors may be defined by one or more scripts associated with the graphic element. For example, if a motor has an On property that is true, then an animation of the motor operating can be triggered in the graphic display. Still further, a primitive property, for example, a rectangle fill property of a primitive in the form of a rectangle, can be bound to a graphic element property so that changes in the graphic element property effect the primitive property. Likewise, changes to a visualization may be tied to a property, so that changes to the visualization may cause changes to the property value.

If desired, the editor 50 may enable a user to specify one or more transformer functions to provide more desirable bonding between graphic element properties and animations or actions. For example, a user may wish to bind a graphic element property of TankLevel (defining a level of fluid within a tank) to a primitive property rectangle fill, to thereby graphically illustrate the tank level with a fill color for a primitive defined as part of the visualization. However, in this case, the user may define a transformer function that transforms the property (the TankLevel) into an enumerated set or condition, so that if the tank level is between a first and second level, the rectangle fill is set to green, if the tank level is between the second and a third level, the rectangle fill is set to yellow, and if the tank level is greater than the third level, the rectangle fill is set to red. This transformer function may be defined as a script or as any other program that executes with the graphic element and may be used to cause any desired property transformation, such changing a property value to a length, a font name, a localized string, a duration, a rotation, a color gradient, an opacity, a brush pattern, etc. Likewise, transform routines may transform inputs from a user via the visualization to any desired property values.

As another example, graphic element properties or parameters may be bound to external references using transformer functions. Here, the editor 50 may allow a user to specify one or more transformer functions that will be automatically applied when the graphic element is used in a runtime environment to convert source values (runtime variables) to destination values (graphical variables) or vice-versa. For example, a speed destination variable, which might be bound to a data source that provides a speed as a numerical value, could be converted to a string type variable, such as a string indicating one of "slow," "moderate" and "fast," based on the value of the source variable. Such transform functions may also be used to convert units, or provide other transformations. In any event, these transform functions may be implemented as scripts or other programs and can be used for any purposes to provide actions or animations or to otherwise affect display properties for a graphic element.

Of course, any desired properties may be defined for different types of graphic elements created for different physical elements within a process control. For example, a pump element may include a pump state (e.g., on or off) a pressure-in property, a pressure-out property, a flow-in property and a flow-out property. Likewise, a regulating valve used with an actuator may include, for example, a name property, a density-in property, a density-out property, a flow-in property, a flow-out property, a pressure-in property, a pressure-out property, a temperature-in property, temperature-out property, a valve position property, a valve-open and valve-closed property (which may define if the valve is all the way open or closed), a set-point, a process value, a valve type, such as linear, quick opening, equal percentage, etc. This list is not, of course, intended to be comprehensive. Still further any of these properties can be connected to animations or actions for graphic element.

Figure 8:
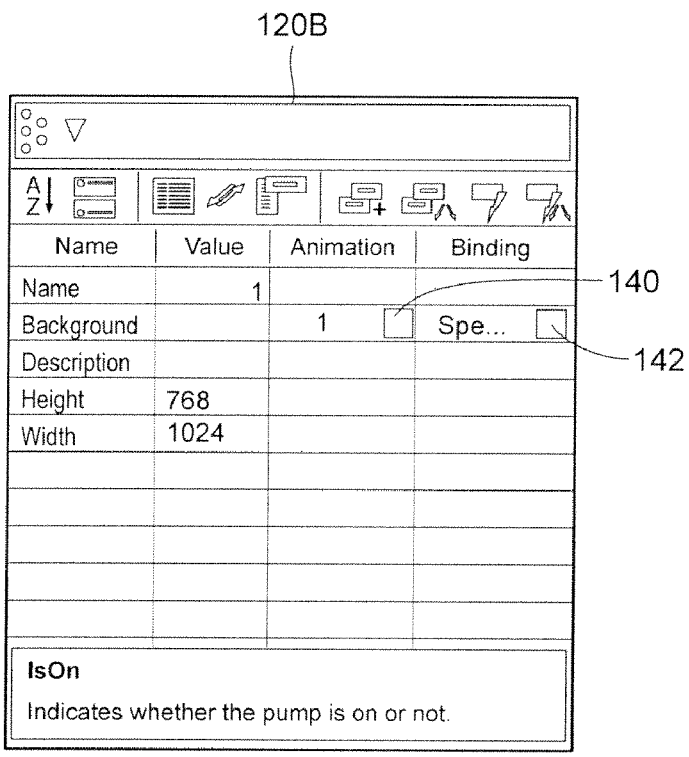
FIG. 8 depicts a section of a screen display showing a second property view associated with a graphic element.

FIG. 8 depicts a second property view 120B which may be used to view the animations and bindings associated with graphic element properties for a selected element in this case the Reactor1 element generally) within the hierarchical view 115 (FIG. 5). The properties view 120B of FIG. 8 illustrates the manner in which the IsOn property relates to various components of the visual for the graphic element. In particular, as indicated by the table entry 140, there is one animation that is related to the background oldie visualization and that operates based on the value of the IsOn property. A table entry 142 shows the bindings between the IsOn property and may be used to access animations, scripts and transforms that relate the IsOn property to the background element or primitive within the visualization. In this case, the user may obtain additional information by selecting the buttons in the table entry boxes 140 an 142. For example, by selecting the button in the table entry 140, the user may access an animation that causes die background of the visualization to change color based on the value of the IsOn parameter. Clicking on such an animation button may also cause the editor 50 to open a property animation dialog box which allows for management and configuration of the animations. Still further, binding can be performed and managed by clicking on a binding button in the box 142, which causes the editor 50 to open a dialog box to enable creation, viewing and editing of bindings. Of course similar screens could be provided for other properties of the graphic element and the list of properties that are shown in the property screen 120B will be dependent the currently selected item in the hierarchy view 118.

Referring again to FIG. 5, when a visualization is selected in the hierarchy view 118, the properties view 120 will display the visualization properties, such as a name, an I.D. which provides a unique identifier for the visualization, a description and whether this visualization is set as the default visualization for the graphic element. The hierarchy view 118 or the property view 120 may also indicate whether the visualization is locked, i.e., whether it can be modified.

Additionally, when a connector element is selected from the hierarchy section 118, the properties view 120 will show the properties of that connector element, which may include an indication of the connector type (e.g., a fluid line, an electrical line, a gas line, a circular or square duct, a conveyor belt, etc.), whether the connection is into or out of the device (i.e., the direction of flow of material with respect to the entity being represented by the graphic element), the minimal and maximum number of connections required or allowed, the width and height of the connection, the position of the connection with respect to the graphic element, such as on top, the left, etc.

When a primitive is selected in the hierarchy view 118, the properties view 120 will display the properties or that primitive, which may include for example, an I.D., a category description, whether the primitive is selectable and/or visible, a size and length or other definition of the shape or nature of the primitive, a background color and the fill space for the primitive, etc. Of course, any other selected item within the hierarchy view 118 will cause the properties of that item to be displayed in the properties view 120, and the type and nature of the properties will be dependent on the nature the selected item.

If desired, an event sheet may be provided to show the events associated with each or all of the selected hierarchy items within the hierarchy view 118. Such an event sheet could include events that occur when a user performs an action with respect to a graphic elements, such as an "on-click" event and an "on-mouse-over event" which define what happens when a user clicks on a visualization for the graphic element or a portion thereof, or what happens when the user positions the mouse cursor over the visualization of the graphic element, or a portion thereof. As part of this event sheet, a user may be provided access to a script editor to define or access a script that will be run upon the occurrence of the event (which is defined herein as a routine).

Additionally, if desired, graphic elements can have custom events associated therewith. Custom events are generally events that are defined as a result of some outside or exterior event, or are events that require communication with an exterior application or data source as a result of an action taken by a user of the graphic element. Essentially, a graphic event is a message that is sent by the graphic element to signal the occurrence of an action with respect to the visualization of the graphic element. The containing or runtime application implementing the graphic element can catch these events using, for example, a C# syntax or by registering to event notification in any known manner. In one example, the containing application may register to a pump over-heat custom event and provide a my-handler function that will run a script or other routine to enable a user to handle the event, when it is triggered. These custom events are particularly useful when the graphic element is implemented as part of a control operator screen. In this case, the graphic element itself may determine an event condition, such as by comparing a pump heat property (which is bound to an external measurement) to a set-point or other limit, and may trigger an event response by notifying the user of the event and implementing an application, script, dialog, etc. to enable the user to handle or deal with the event, in this case, an overheating pump. To enable this event handling process, the element editor 50 will allow a user to define event arguments, i.e., what is recognized as an event and what results from the occurrence of an event.

Of course, if desired, graphic elements can provide standard events inherited from an Avalon control class. As is known, the Avalon objects or controls are Microsoft defined graphics for the Avalon user interface architecture for the Microsoft Longhorn operating system, which support the rendering of vector graphics on a user interface. These standard events may include, for example, tying the viewing of a faceplate display or a device detail display to a click or a double click (mouse) event. For example, a click or double click event, which is an event reporting a mouse click or double click within the bounds of the visualization of the graphic element, can trigger the display of a faceplate or detail display for the device or entity being represented by the visualization and provides the user with more complete or thorough information about the state, design, manufacture, etc. of the entity being represented. Of course, other events, including standard events, may be defined for a key down/up event, which is an event reporting that a key was pressed, mouse events, which include mouse enter, mouse hover, mouse move, mouse wheel, etc. actions, or any other user initiated events.

Thus, if desired, graphic element events may be triggered within the script of an event handler, such as in the event handler for a primitive event, or within a transformer function, upon changes within a property of the graphic element. Still further, primitives of a graphic element may expose events which can be triggered by user interactions with them, for example, through the mouse and keyboard. These events provide options for the user to interact with the graphic element at the shapes and primitive levels. Developers can handle the events internally within the graphic element by specifying event handlers using C# methods, for example.

Figure 9:
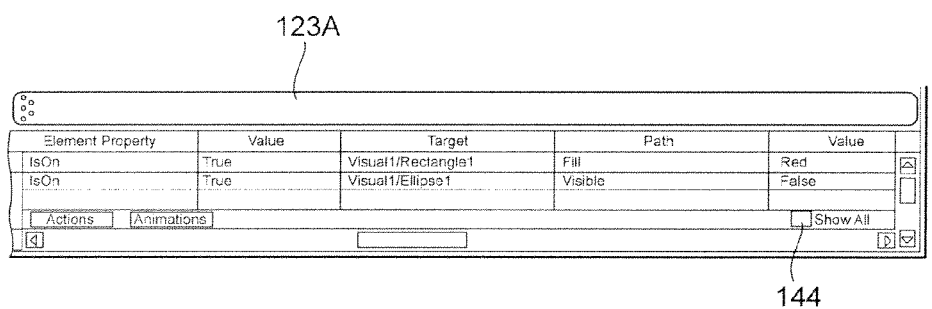
FIG. 9 depicts an actions/animations section of a display screen showing actions associated with properties of a graphic element.

Referring again to FIG. 5 the actions/animation view 123 may provide or show a list of transform animations and property animations defined for the visualization currently being displayed in the edit view 114. A user may, for example, double click on a row within the view 123 to cause the editor 50 to present a dialog box, which might be a transformer animation dialog box or a property animation dialog box, which allows the user to edit the selected animation. Typically, only the animations of the currently selected visualization will be shown, but selecting a Show-All box 144 could show animations and actions for all of the visualizations. Assuming that animations are provided with meaningful names or descriptions, for example, "animate lever," "rotate motor," etc., the action/animation view 123 provides for easy viewing and access to animation behaviors defined for a visualization. FIG. 9 illustrates an example actions/animations view 123A which illustrates the actions defined for the IsOn property. In this case, when the IsOn property is "True", the primitive called Rectangle1 of the visualization called Visual1 implements a fill action with the fill value of "red." Likewise, when, the IsOn property is "True", the primitive called Ellipse1 of the visualization called Visual1 implements a visible action with the value of false (e.g., becomes invisible). Of course, actions and animations may be defined separately for separate primitives of a visualization, but these actions and animations may operate simultaneously upon the same event, trigger or property change to present a more complicated but pleasing animation. Still further, actions and animations may include performing single operations, such as increasing size, filling color, etc., or repetitive operations that occur continuously until turned off.

Figure 10:
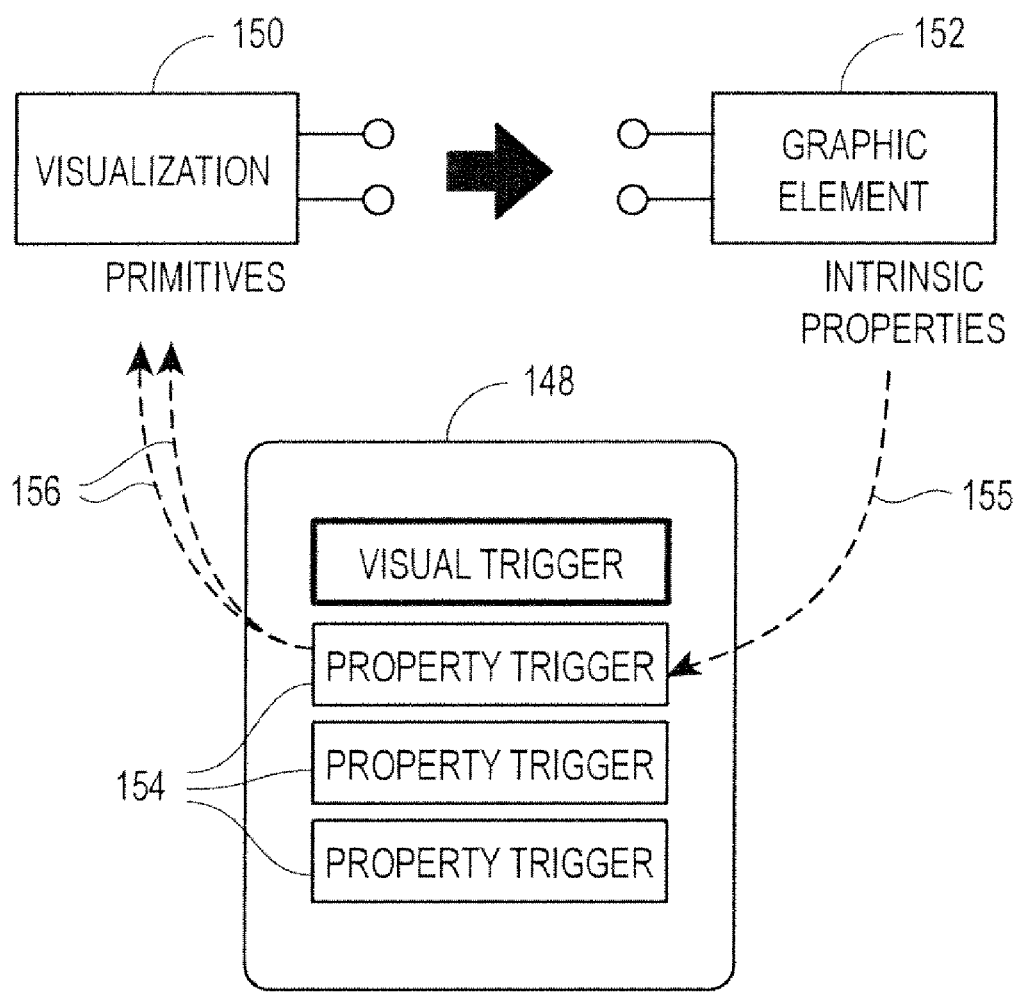
FIG. 10 is a block diagram illustrating a manner in which visual triggers may be integrated with properties and visualizations of a graphic element.

FIG. 10 illustrates a manner in which a visual trigger 148 can be implemented on a visualization 150 of a graphic element 152 based on the properties, such as intrinsic properties, of the graphic element 152. In particular, one or more of the intrinsic properties of the graphic element 152 are monitored by one or more property triggers 154 (three of which are shown in FIG. 10) defined for the visual trigger 148. Each property trigger, which may be implemented using a script, can monitor for certain graphic element property values as shown by the dotted line 155. Thereafter, each property trigger can set one or more primitive property values of the visualization 150, as illustrated by the dotted lines 156, when the monitored graphic element property value is satisfied or meets a specified condition. Thus, for example, one of the property triggers 154 may monitor one or more graphic element properties to determine when a value of one or more of these properties falls within a particular range. When this condition is met, the one of the property triggers 154 may cause an animation or other visual script to be run on, for example, a primitive or other element of the visualization 150 to provide the visual trigger 148. Of course, multiple ones of the property triggers 154 may operate together to provide multiple simultaneous changes or animations as part of the visual trigger 148, or different ones of the property triggers 154 may operate independently on, for example, different intrinsic properties or based on different values of the same intrinsic property, to provide different operations of the visual trigger 148 at different times or in response to different process conditions. In this manner, color changes, animations etc. can be provided in the visualization 150 based on the values of the intrinsic properties of the graphic element 152.

If desired, the editor 50 may provide or display a visual trigger panel listing all the property triggers for a currently selected visualization. Such a panel is illustrated in FIG. 9, in which the element property column lists the graphic element property name, the first value column indicates the graphic element property value being watched, the target column provides a visualization or a primitive identification which will be changed, the path column is the primitive property being changed and the second value column is the primitive property to apply when the graphic element property value being watched is satisfied. Of course, animations and other visualization changes may be provided using this structure.

Figure 11:
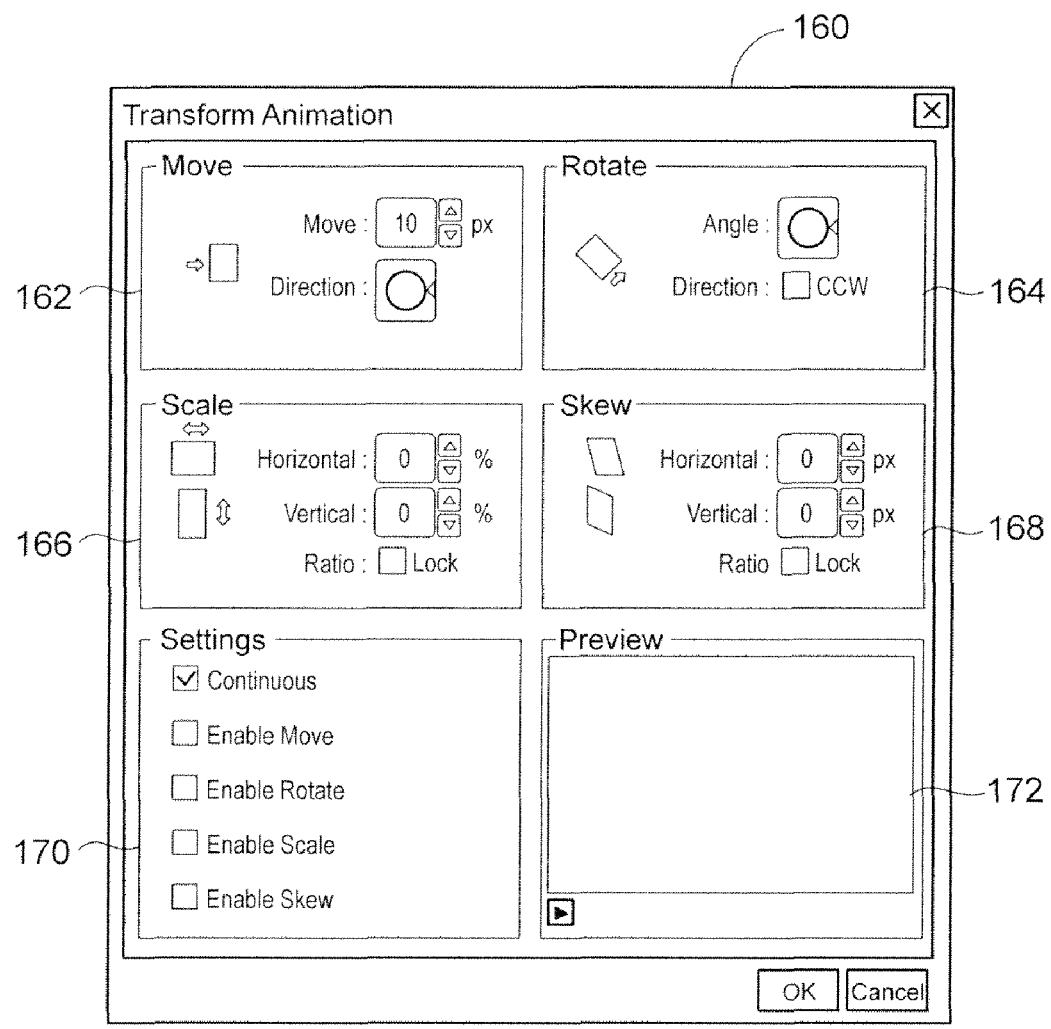
FIG. 11 depicts a dialog box that may be use to provide or define a transform animation for a visualization of a graphic element.

FIG. 11 illustrates a transform animation dialog box 160 which may be used to help or enable a user to specify a transform animation. As illustrated, the transform animation dialog box 160 includes a move section 162 which allows the user to specify a direction and a distance in terms of pixels defining a movement within an animation, a rotate section 164 which allows a user to specify a rotational direction and an angle for the animation and a scale section 166 which allows the user to specify a degree of scaling for an animation, both in the horizontal and vertical directions, and to specify whether the aspect ratio should be locked. The dialog box 160 also includes a skew section 168 which allows the user to specify a skew to be applied during an animation, both in the horizontal direction and the vertical direction. A settings section 170 allows a user to define if the animation is to be continuous or not, and to enable each of the other move, rotate, scale and skew actions. Still further, a preview box 172 may illustrate a preview of the animation.

As will be understood, an animation is an object that changes in value over a period of time. A property animation may be achieved by associating an animation with a primitive property. Property animations can be as subtle as causing the color of the text to change, or to cause an element like a line to blink. On the other hand, property animations may be more complex, such as animating the points of a poly line, etc. Of course, these are but a few examples of animations, and other animations may include adding or changing colors, changing the size (such as the width, length or point size) of a primitive, moving, rotating, skewing, scaling primitives, etc. Still further, other animations could be provided at any level of the visualization, such as at the primitive level or as part of the entire visualization. Of course, multiple animations can be provided or applied to any particular visualization or to any particular primitive of a visualization if so desired. Still further, multiple animations associated with a particular visualization or a primitive of a visualization may operate simultaneously or at different times based on changes in property values or based on user initiated triggering events, such as mouse events.

Figure 12:
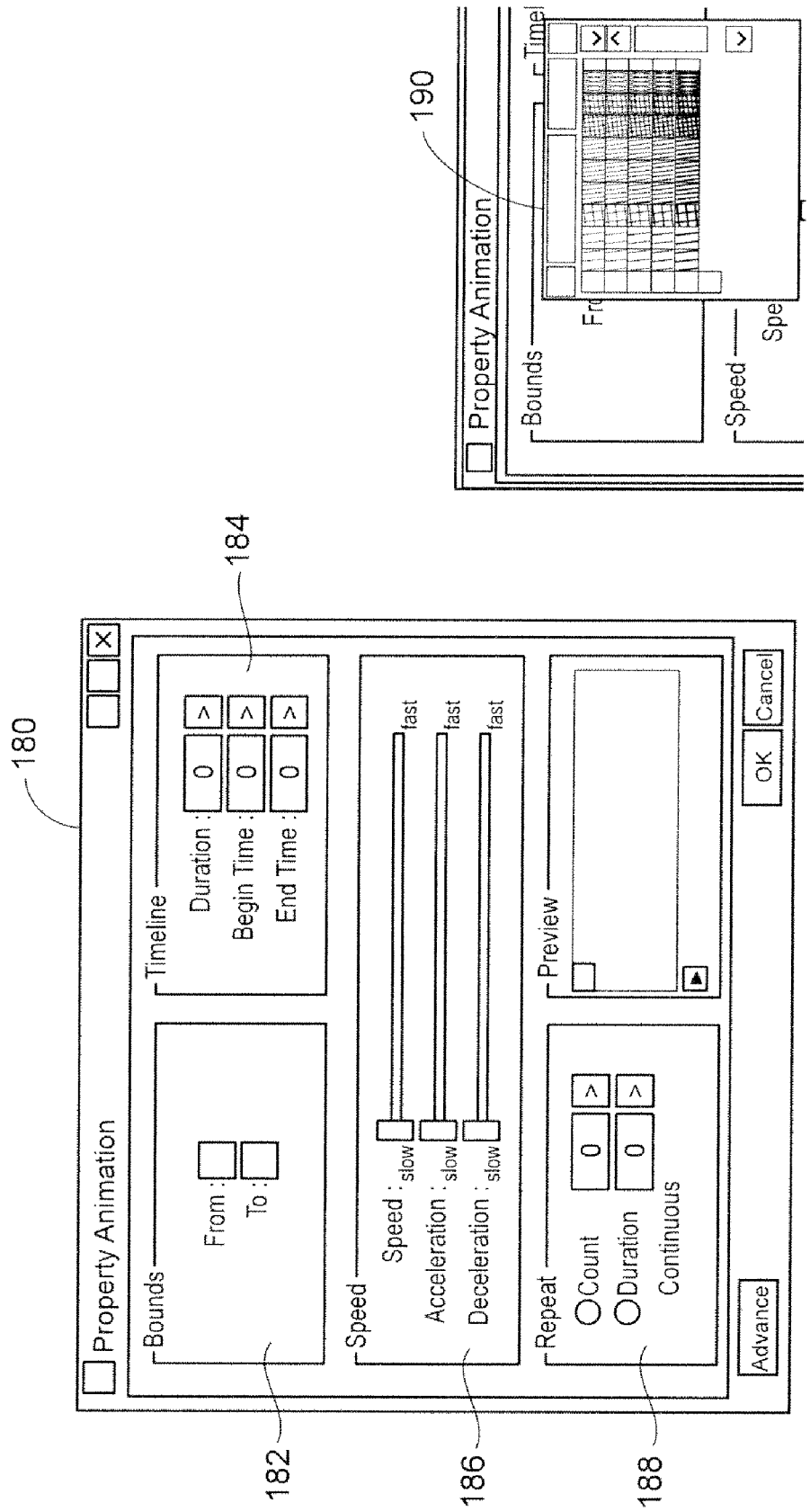
FIG. 12 depicts a dialog box that may be use to provide or define a property animation, including a color animation, for a visualization of a graphic element.

FIG. 12 illustrates a property animation dialog box 180 that may be produced by the editor 50 to enable a user to define or change a property of the animation to thereby define the animation. The dialog box 180 includes a bounds definition section 182 and a timeline definition section 184. The bounds definition section 182 provides or defines the bounds of the animation. In particular, a "from" property defines the starting value of the animation and a "to" property defines the ending value of the animation. The timeline definition section 184 defines a duration for the animation, a begin time and an end time for the animation. The duration property defines the length of time that the animation takes to complete, the begin time property defines a time offset with respect to the start time of the animation and the end time property defines the end time of the animation with respect to the start time. A speed definition section 186 allows a user to specify a speed, an acceleration, and a deceleration using, for example, slidebars. As will be evident, the speed property defines the speed of the animation, the acceleration property makes animation move faster with respect to increasing time while the deceleration property makes the animation move slower with respect to increasing time. A repeat definition section 188 allows a user to define the manner in which the animation will repeat, e.g., for a specified number of times, for a specified count or duration or continuously until turned off.

A further animation dialog box 190, which may be accessed through the dialog box 180, may be used to specify different colors to be used as bounds in the animation when using the bounds definition section 182. Similar dialog boxes may be used to enable the user to select other non-numeric values as properties of an animation. While not shown, other animation properties may be selected or specified as well using this or other dialog boxes. For example, an auto reverse property may be used to define a Boolean value that indicates whether the animation plays in reverse after it completes its forward direction and a "by" property may be used to define the total amount by which animation changes its starting value. A relative speed property may be used to define a relative speed at which time passes for the animation as compared to parent animations, i.e., animations associated with parent elements of the visualization. A value of 1, for example, may indicate that the animation progresses at the same speed as the parent animation, a value of 2 may indicate that the animation progresses twice as fast as its parent animation, and so on.

While not shown, dialog boxes can also be used to set the font properties of an animation, such as the style, the size, the font, and the color of text within the animation or changes therein. Additionally, a stroke properties dialog box can be used to set the edge or line style, thickness and color of lines, and to change those properties.

Graphic dialog boxes may also be used to edit other features of a graphic element. For example, graphic dialog boxes may be used to create new process graphics which include adding a graphic element property to a graphic element and binding a graphic element property to a runtime environment. Such a binding dialog box may provide a browser that enables a user to browse through different tags or variables defined within the control system or other runtime environment to locate desired tags, variables, names, etc. to perform binding. Likewise, other dialog boxes may be used to add visualizations, to add visual triggers, to browse through graphic elements or displays, and to add events.

Thus, as will be understood, the graphical editor 50 provides support for defining graphic element intrinsic properties, support for graphic element visualizations including creating and manipulating graphic primitives or shapes, adding dynamic behaviors, specifically transformation animations (rotation, translation, scale, and skew) and property animations (length animation, color animation, etc.) and defining conditions that trigger the execution of dynamic behaviors. Still further the graphical editor 50 provides support for storing and retrieving graphic elements in the database, including support for graphic element serialization into an xml blob, and support for categorizing graphic elements in a graphic elements library. Furthermore, the system provides for storing graphic element in a user-defined categories or sets, locking or providing security for such graphic elements, storing the graphic elements in user defined or other useful categories, versioning graphical elements, etc.

In any event, once created, a graphic element is stored in a graphic element database in a manner that is unbound to process variables or other data within the runtime environment of the process plant. This stored graphic element is not necessarily used in any displays, but is available for such use as this element is now capable of being downloaded to a runtime environment and of being bound to particular actual or simulated physical elements within the process plant or the process control system. When bound, the intrinsic properties of the graphic element, such as the process variable, the set point, the current speed, etc. are tied to and bound to data references within the runtime environment.

Figure 13:
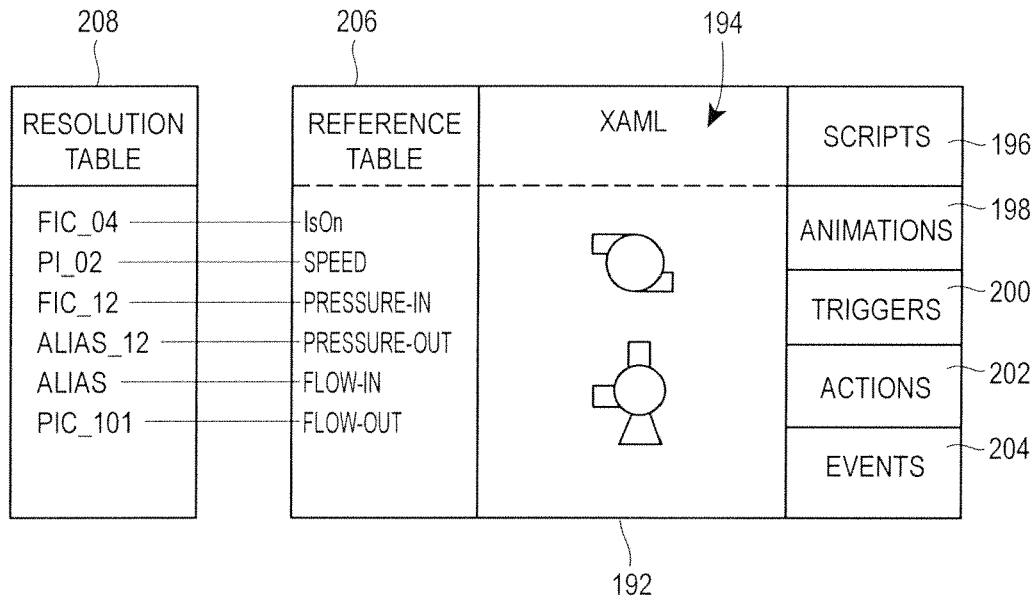
FIG. 13 is a diagram generally illustrating the manner in which graphic elements may be tied to a runtime environment through a resolution table.

FIG. 13 illustrates a manner in which graphic elements can be tied or bound to actual physical components or elements within a process plant or a process control system used in a process plant. In particular, each graphic element 192 includes an XAML 194, which essentially defines the visualizations for element, and associated scripts 196, animations 198, triggers 200, actions 202 and events 204. The graphic element 192 also includes a reference table 206 which lists or includes all the references associated with the XAML 194 that are available or open and exposed in the XAML 194. The reference table 206 is essentially made up of or includes the properties and parameters of the graphic element, as well as any other variables or references used by the scripts 190, animations 198, triggers 200, actions 202, and events 204. The variables or entities within the reference table 206 may refer to or be bound to variables, tables, table entries in other programs, or to any other types or kinds of data defined elsewhere in the process control system.

As illustrated in FIG. 13, a resolution table 208 is used to tie the references or variables within the reference table 206 to the actual process control environment or other runtime environment. Generally speaking, the resolution table 208, which may define references either directly or via aliasing, is provided or created for the graphic element 192 when the graphic element 192 is actually configured to be used in a particular display within a runtime environment and is downloaded to a runtime machine. Before or during operation of the graphic element 192 within a display, the resolution table 208 resolves the aliases and other parameters and ties these resolved data connections to the reference table 206 to provide a binding between the variables within the reference table 206 and the actual data sources within the process control system or other runtime environment.

To prevent unnecessary usage of processing power within the process control system during runtime, graphic elements and the graphic displays in which they are used need not remain bound to the runtime environment when not actually being displayed or used on any display screen. Instead, the resolution table 208 may be bound to the reference table 206 of the graphic element 192 only when the graphic element 192 is running or being displayed on a screen within the runtime environment.

Because each graphic element is tied to the process control system or runtime environment through the use of a reference table 206 and a resolution table 208, and because binding occurs after the graphic element is created at a system level and copied and loaded into a runtime environment or machine, the graphic element 192 may be bound separately to different data sources for different uses at different times. Still further, the graphic element 192 can be bound to data that is generated by or available through any number of different sources, including data sources within the different functional areas 42 of FIG. 2, such as data sources associated with control activities, maintenance activities, modeling activities, simulation activities, configuration activities, etc.

Figure 14:
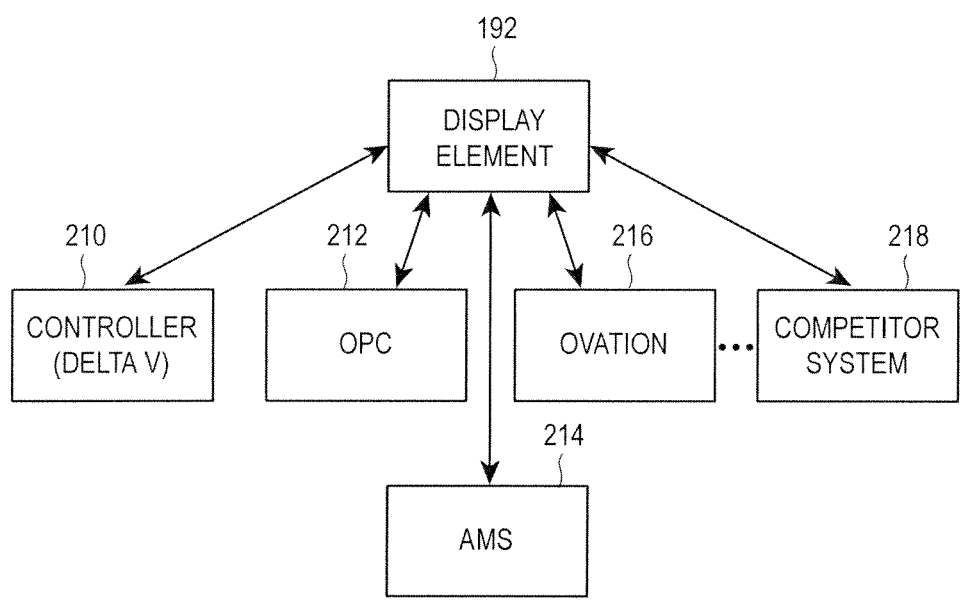
FIG. 14 is a block diagram depicting a display element bound to multiple different data sources in a process environment.

For example, as illustrated in FIG. 14, a display element 192 can be tied to, and can be used to display or process data generated in or made available from vastly different types of data sources. These data sources can include control environment data sources 210, like controller programs such as the well-known DeltaV control system, OPC data sources 212 which provide connections to other systems via the well known OPC connection interface, maintenance data sources 214 like the well known AMS system, higher level or business systems 216, like the well known Ovation system, and even data sources that use competitive systems 218, like competitive control applications. In this manner, the graphic element 192 may be used to display data or and visualizations of physical elements at any level of the system using data from any application within the system, even if the data comes from or originates in vastly different types of applications, including applications associated with competitive systems that were never intended to operate together. Thus, because the graphic elements and the graphic displays created from graphic elements are created at a system level, they can be used to provide visualizations of what is happening within the plant for any purpose, even if different types of software are accessing and running different hardware and software components within the plant.

Because of the modular nature of the graphic elements, it is possible to automatically or semi-automatically create graphic elements from device descriptions (DDs) written in the well known and well supported device description language (DDL). In particular, device manufacturers typically provide a DD for each device they make which defines, in the DDL, the parameters associated with the device, how to communicate with the device, limits for the device, etc. As a result, a graphic element creation application can read the DD for a device in the DDL to determine the type of device and the important parameters, limits, etc. associated with that device and can then define these parameters as the intrinsic properties or parameters of the graphic element for the device. The program may also select or define a basic shape-composite as a visualization for the device, and may select one or more generic scripts to use for providing basic actions and animations for the device, either based on information from the DD or based on templates stored for devices of the device type defined by the DD for the device. If desired, during this process, the program may query a user to provide information on the device or to make selections as to what animations, visualizations, primitives, etc. to use for the graphic element.

For a more complete or well-defined graphic element, the program may store various generic graphical templates for different types of devices, such as for sensors, valves, motors, tanks, etc. The program may then determine the template graphic element to use based on the device type as defined by the DD for the device. If desired, the template may provide for or have various choices or options available to be used in the graphic element and these choices may be determined based on information within the DD for the device or based on user input. Thus, for example, the template may provide for various intrinsic parameters associated with various sub-types of devices, such as sensors, and the program may determine the intrinsic parameters to define for the graphic element based on the information within the DD.

Various elementary scripts may be provided as part of the template and may be used to provide behaviors for the visualization. Again, the scripts to be used in the graphic element may be chosen automatically based on the information within the DD, such as the device type, etc. or, if desired, based on questions to the user. Additionally, the various limits or variables used in the script may be determined from information within the DD. Thus, for example, a script, such as one that provides a rotating graphic, may be chosen to be used or provided within the graphic element if the DD indicates that the device is a piece of rotating equipment, and certain aspects of the rotational graphic, such as the speed, when the graphic changes color, etc. may be based on limits associated with the device as defined within the DD. These limits may be, for example, normal or rated operating speed, the defined overspeed or underspeed conditions or limits, etc. As another example, if the device is a sensor, the high and low values of the sensor may be used to provide graphics associated with the current reading of the sensor, graphics depicting whether the sensor is broken, etc.

In this manner, a basic graphic element may be created automatically from a DD for a device when the device is attached to or recognized within a process plant by defining certain basic scripts, graphic animations, visualizations and intrinsic parameters for the graphic element based on the type of device and known characteristics of device as defined within the DD for the device. This automatic creation of a graphic element provides a user with some ability to integrate a newly added device into graphics, automatically, and without having to perform much, if any graphic editing for the device, so that devices may be automatically supported in graphic displays, at least at an elementary level, when the DD for those devices is loaded into the system. In other words, a user may automatically create a graphic element from a DD for a device by providing a DD for a device to the system and then running the program to create a graphic element for the device from the DD. Thereafter this graphic element may be used in one or more graphic displays to model or provide a visualization for the device, which provides the user with the ability to model the device or to illustrate the device within graphic displays without having to manually create a graphic element for the device.

As noted above, once a number of graphic elements 74 of FIG. 3 have been created, the graphical editor 50 may be used to create one or more graphic displays, such as the displays 76 of FIG. 3. In fact, if desired, the display editor 50 may be provided to a user or purchaser with a number of pre-configured graphic elements, which may have various visualizations associated therewith, such as visualizations for different industries, different functional uses, etc. The graphical editor 50 will then allow the user to create custom elements, as well as to create or build graphic displays 76.

Generally speaking, to create a display 76, the user will select from a library of graphic elements 74 and other visual elements and place them together to build up a display. After a graphic display is complete, the resulting data structure or object may be stored in a database, such as a configuration database, as a display class object having all of the various elements, intrinsic properties and visualizations defined as a single definitional entity. This display class object, however, will be unbound to process variables and not necessarily used in any runtime displays. If desired, this class object may be stored in the database as an XML blob, having visualizations, scripts, etc. all stored and concatenated together as an XML entity. Thereafter, individual graphic displays may be created from this class object, and these individual graphical displays may be assigned and downloaded to operator workstations or other runtime environments.

When a display is downloaded, the graphic element definitions therein will be converted into Avalon controls, compiled into assemblies and deployed on the target machine, i.e., the runtime machine. The display, which itself is an Avalon entity, will reference the compiled control assemblies and, in addition, a custom data source may be generated which acts as a data adapter connecting the Avalon controls to the backend data sources like the control or maintenance runtime applications. In this manner, the graphic displays (and if desired individual graphic elements) may be created and edited in one language, stored in another language or form (e.g. as an XML blob) and run in a third language or form (e.g., as Avalon controls tied to scripts written in any of various executable languages).

Figure 15:
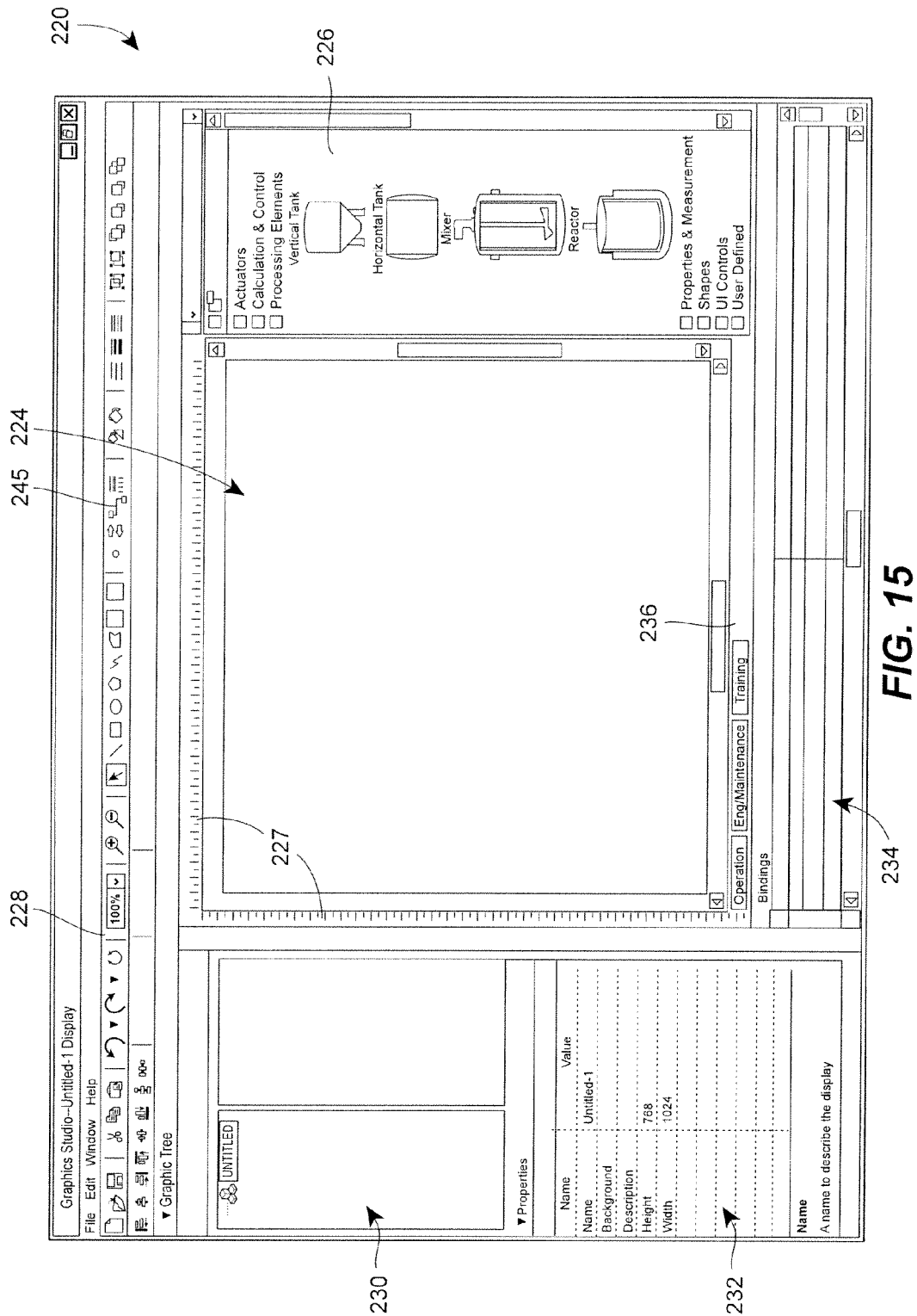
FIG. 15 is a display screen produced by a graphical editor while producing a graphic display from multiple display elements and connectors.

Referring now to FIG. 15, a screen 220 may be produced by the graphical editor 50 to enable a user to create one or more graphic displays. Generally speaking, a graphic display is composed of interconnected elements that represent physical devices within a plant, and may include or display additional information associated with those devices. Each of the graphic elements in a graphic display includes a set of intrinsic properties that equate to process variables, constants, or other external values and, as explained above, each graphic element may have several visual representations, which may include dynamic behavior, for example color changes or animation. Additionally, the graphic display may include static elements, such as text, boxes, etc, user dynamos which allow the user to interact with the graphic display in some manner, variable boxes which may display process or other information to the user, etc.

Similar to the edit screen 112 of FIG. 5 for a graphic element, the example graphic display editor screen 220 of FIG. 15 includes a main edit canvas 224 in which a graphic display is built and a palette section 226 where template graphic elements, primitives or other library elements can be displayed, and from which these various elements can be selected and dragged and dropped onto the main edit canvas 224. The main edit canvas 224 provides a diagram view in which the user interacts to create and edit graphics, either primitives or composites, and provides vector graphics editing and viewing features. The editor 50 enables a user to place graphics objects, such as graphic elements, anywhere in a boundless space which may be inside or outside the display frame currently displayed in the edit canvas 224. Thus, the main edit canvas 224 may depict only a portion of the display currently being created and a user may pan the view to display other parts of a display, zoom in and zoom out to change the magnification level of the view, and rotate the view to obtain the most convenient orientation on which to work on the display at any given time. As will be understood, however, all drawing and manipulation of graphic objects are completed in the main edit canvas 224. To aid in the drawing, the X-Y position of the view can be read from rulers 227, the magnification level may be displayed in a dropdown list on a toolbar 228 and may be changed by selecting entries on a zoom popup, etc.

The screen 220 also includes a hierarchy section 230 which depicts a hierarchical display or listing of the elements within the main edit canvas 224, a properties section 232 which lists the properties or parameters associated with the display being created in the canvas 224 or with highlighted elements within the canvas 224, and a binding section 234 which illustrates or lists the manner in which different parameters or features are bound to elements within the process control system or any other runtime environment. Additionally, the screen 220 includes a toolbar 236 listing the various views or layers associated with the graphic display being created in the main edit canvas 224. More specifically, any particular display can have various layers or views that may be used by different people in different contexts, such as an operator display, a maintenance display, a simulation display, a modeling display, an engineering display, a business display, etc. In the example screen 220 of FIG. 15, the toolbar 236 includes three views or levels, illustrated as an Operation view (currently being shown in the main edit canvas 102) which provides a typical control operator's view, an Eng/Maintenance view, which provides a typical maintenance orengineer's view and a Training view, which provides a simulation view used in simulating the process plant or a portion of the process plant depicted in the display being created. Because there are no elements selected within the main edit canvas 224 of FIG. 15, the properties section 232 displays the current name of the display being created along with features of the display, such as the width and height, a description provided by the creator, a name, a background description and any other information that a creator may want to store for the display. Similarly, because there are no actual elements placed in the main edit canvas 224 of FIG. 15, the hierarchy section 230 only shows the name of the display, and no bindings are shown in the bindings section 234.

During the creation of a display, a user may place an element such as a graphic element onto the main edit canvas 224 by accessing that element via, for example, one of a set of categories of elements defined within the pallet section 226. In the example of FIG. 15, the pallet section 226 illustrates different categories of elements that may be placed into the main edit canvas 224 and connected together to create a complete display, including actuator elements, calculation and control elements, processing elements, properties and measurements, shapes, user interface controls and user defined elements. Of course any other kinds and categories or sub-categories of predefined elements may be provided or accessed in the pallet view 226. In this example, actuators may include valves and other actuator elements, while calculation and control elements may include any control related elements, such as indications of controllers, control loops such as PID control loops or other types of control loops, function blocks, control modules, etc. Processing elements, as illustrated in FIG. 15, may include tanks, reactors, mixers or other elements which process materials in some manner, as well as any other types of devices, units, etc. Properties and measurement may include boxes or display elements that are designed to show properties or measurements or other data within the runtime environment, such as process variables, alarms, etc. Shapes may be primitives or other predefined shapes, while UI controls may include various user interface control elements, like buttons, sliders, knobs, tool boxes, etc. which the user may manipulate on a display screen to effect input to the display. Of course, user defined elements may include any predefined elements, such as any other graphic elements or higher level elements made from graphic elements. In one case, user defined elements may include process units, process plant areas, or other higher level process entities. As noted above, access to user defined elements may be limited based on the identity of the user using the editor 50 or may be globally accessible. It will, of course, be realized that any other elements, shapes. etc. can be placed within the pallet section 226 under any appropriate headings to keep these elements organized and easily accessible by a user.

When a user places an element such, as a mixing tank, into the main edit canvas 224, this element may be rendered in the canvas 224 using the default visualization for that element. In this case, the graphic hierarchy section 230 will show the element and will provide a hierarchy of sub-elements for that element, such visualizations, animations, primitives, etc. associated with that graphic element, in a manner similar to that depicted in FIG. 5. Still further, when a graphic element is shown in the canvas 224 that includes visualizations or animations that may be bound to the runtime environment, the bindings subscription section 234 will illustrate the currently defined bindings.

Figure 16:
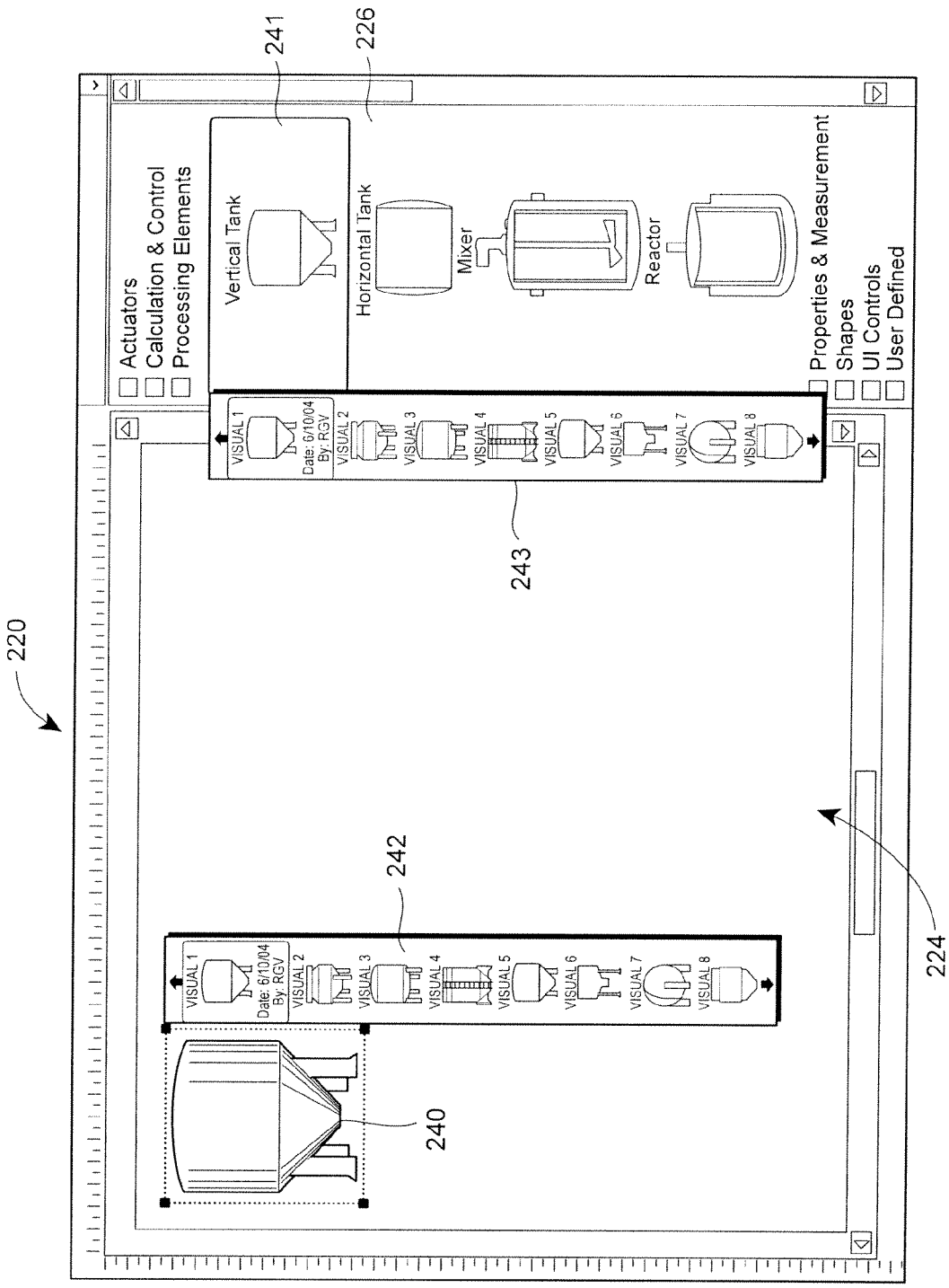
FIG. 16 is a display screen for creating a graphic display illustrating various visualizations associated with a graphic element placed within the graphic display.

If desired, the user may select or change the visualization of a graphic element in the main edit canvas 224 or in the pallet section 226 by selecting a different visualization in any desired manner. The user may perform this visualization selection function using a dropdown list or box, which may be accessed by for example right-clicking with the mouse pointer over the element, or by selecting a different visualization within the hierarchy section 230, or in any other desired manner. FIG. 16 illustrates a portion of the main edit canvas 224 and the pallet section 226 of the screen 220, in which a vertical tank element 240 is shown as being placed within the main edit canvas 224 from the pallet section 226. The vertical tank element 240 is a copy or instantiation of a template or a class vertical tank element 241 depicted in the pallet section 226. However, additional visualizations for the vertical tank 240, including visualizations 1-8 shown in a sidebar 242 accessed by a right click on the mouse when the mouse pointer is over the visualization 240, are able to be selected as the visualization to be used for the vertical tank element 240 when in the display being created in the edit canvas 224. As illustrated in the pallet section 226, a similar type of sidebar display 243 may be obtained by right-clicking on the template vertical tank element 241 in the pallet section 226 to obtain or view the possible visualizations of the template tank element 241. Selecting a different visualization in the sidebar 242 will change the visualization of the tank element 240 as used in the canvas 224, while selecting a different visualization in the sidebar 243 will change the default setting or visualization for the template tank element 241 as stored in the pallet section 226.

In addition to selecting graphic elements and other elements from the pallet section 226 to create a display, a user may also use or select items from the toolbar 228 depicted in FIG. 15 to obtain basic drawing tools, such as lines, shapes like squares, rectangles, circles, pentagons, etc., text, etc. and may use these simple drawing tools or elements to draw lines or to add text within the display. Additionally, the user may add connector elements to the display within the canvas 224 using the toolbar connector elements 245 shown in the toolbar 228. When selected, the connector element 245 may provide the user with a list of connectors to use in the display using, for example, a dropdown menu, a dialog box, etc. Possible connector elements include pipes, conveyor belts, electrical lines, fluid flow lines or other types of connectors which actually connect one hardware element, such as a tank, a mixer, a pump, etc., to another hardware element, such as a valve, a sensor, etc. Such connector elements and providing connector elements between different representations of physical devices such as valve tanks, pumps, etc. is explained in more detail in U.S. Publication No. 2004/0153804, which is expressly incorporated by reference herein. The connector elements may allow a user to interconnect different elements within the display being created and mate with the connector points defined for the different elements as explained above for graphic elements. For example, pipe connectors may be used to attach different elements which have pipe connector points, while a duct connector may be use to attach elements which have been defined with duct connector points. If desired, the editor 50 may implement connection rules that only allow a user to connect different graphic elements, such as a valve and a tank, with the proper type of connector, as defined by the connection points of the valve and the tank. Of course, the appearance of the connection elements may differ based on the connection type to provide a better look and feel to the display being created with connection elements.

Of course, the toolbar 228 may contain other vector drawing tools and standard commands or functions, such as typical File options (new, open, save, save as, close, exit, etc.), Edit options (such as undo, redo, cut, copy, paste, delete), Find options, etc. Additionally, the tool bar 228 may include menu items that provide graphic related commands, such as an Add Property function, which may be used to add a graphic element intrinsic property, an Add Event function which may be used to add a graphical event, an Add Visualization function, which may allow a user to add a visualization, an Add Visual Trigger function, which may open a dialog box to allow the user to enter information regarding the trigger to be created, etc. Still further, a menu may allow for Format functions (such as setting related Text, Line and Fill properties for text, lines and two-dimensional and three-dimensional images) and Shape functions, which may include grouping or ungrouping of objects, selecting the order of objects from front to back, alignment of objects both vertically and horizontally, etc. The toolbar menu 228 may also provide functions which enable a user to apply animation to objects, and such animations may be applied to a primitive of an element or to one more elements of an object, such as by animating an element width, color, shape, etc. to provide skewing, rotations or scaling of the shape, to rotate or to flip elements, etc. Of course, a user may obtain access to the animations and actions associated with each element within the display and may change these animations and actions using appropriate dialog boxes or other programming tools.

As will be understood, a user or designer may use the display editor 50 and in particular may interface with the screen 220 of FIG. 15 to quickly and easily create graphic displays made up of standard two-dimensional or even three-dimensional graphic elements that may dynamically show measurements, actuators and process equipment. Also, static elements and user dynamos associated with control and calculations are supported and may be provided in the displays. Additionally, the user may define layers to address the interface requirements of different users of the graphic displays by, for example, creating operator, maintenance and simulation displays using the same elements with a slightly different view or surrounding information.

Figure 17:
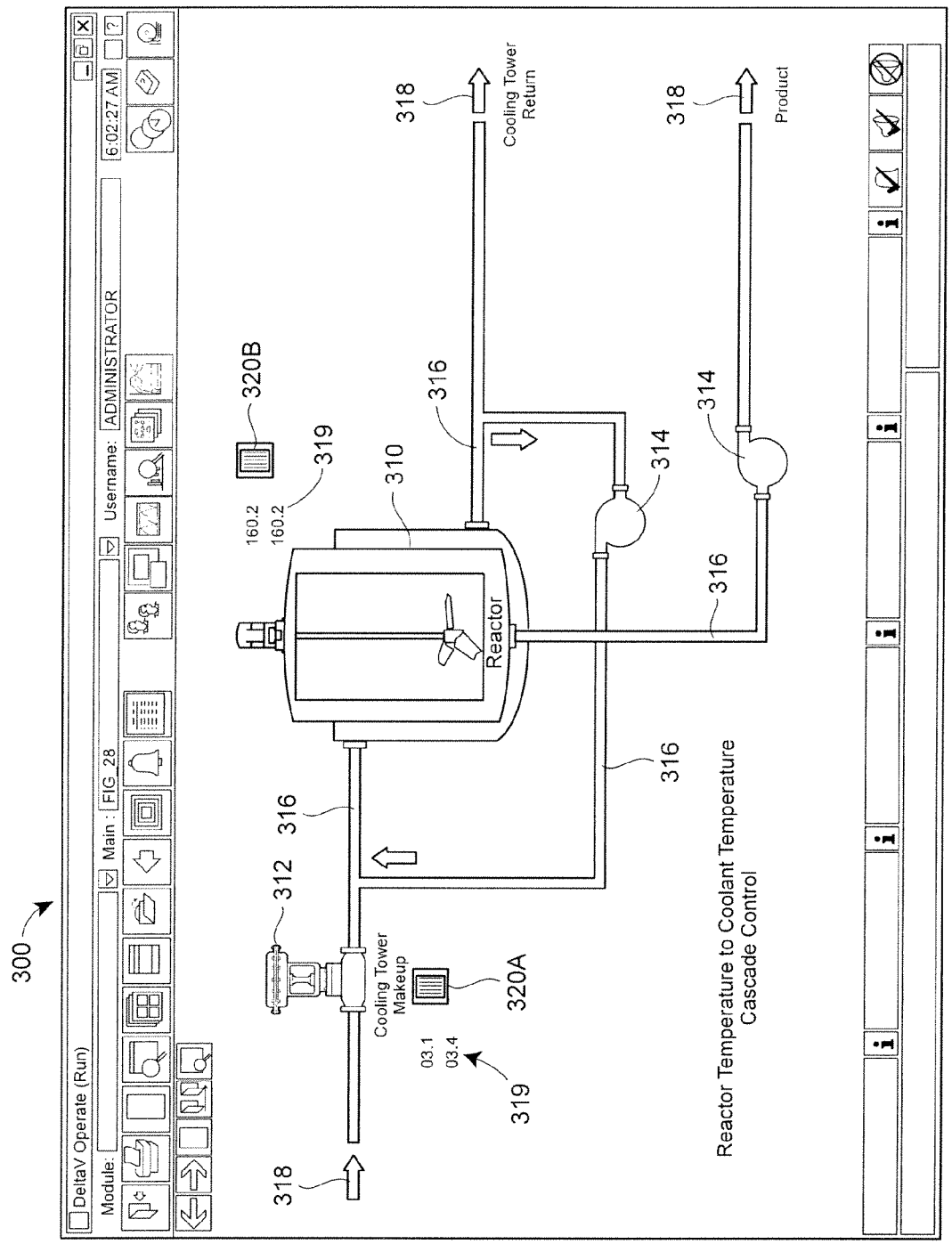
FIG. 17 is a display screen associated with a graphic display made up of various interconnected graphic elements and connectors.

FIG. 17 illustrates a display screen 300 of an example graphic display, in the form of a control operator display, that may be created using the graphical editor 50. The display screen 300 includes a reactor element 310 connected to a valve element 312 and to one or more pump elements 314 via connector elements 316, which are in this case fluid flow lines. Fluid flow or stream elements 318 provide references to the streams of materials coming in and leaving the section of the plant depicted by the screen 300. As will be understood, the graphics within the display screen 300 may be created by selecting and interconnecting various graphic elements together, and thus the display screen 300 may include high resolution graphics, animations, actions, visual triggers, etc. developed in the manner described above with respect to individual graphic elements. Of course, additional graphics, including animations, actions, visual triggers, fluid flow elements, etc. may be added at the graphic display level. In this manner, animation and user actions may be incorporated into the graphic display. For example, using this capability, static graphic components for process equipment may be modified to indicate the status of the equipment, e.g. if a motor is on or is tripped, the operating condition or position of a valve, etc. Additionally, animation may be used to represent dynamic data associated with the equipment, such as showing the level of a tank being filled (e.g., using a filling technique) or showing the status of an agitator through display changes (animations that indicate motion. Likewise, data display elements 319 may be placed in the screen 300 to show process data or other data developed outside of the display 300 but related to the operation of the components in the display 300.

If desired, the graphic display 300 may also include dynamos or user interface buttons 320A and 320B, that enable a user to interface with the display 300 in a manner that allows the user to view additional information or to take actions with respect to the runtime environment via the interaction with the display screen 300. In some cases, these interactions may be implemented with visual triggers or actions as described above with respect to graphic elements. For example, the button 320A may provide the user with a further view of information about the cooling tower makeup, while the button 320B may provide a faceplate display for the reactor 310. Thus, while the display 300 includes a set of elements that illustrates the pieces of equipment that make up a process or a part of a process using three-dimensional components, which as in the past may be based on graphics imported from a number of different sources including, for example, InTools, Auto-Cad, Windows metafiles such as Visio, vector drawings, JPEG and bitmap image formats, the screen 300 can now include animations to perform, for example, rotations, sizing, scaling, skewing, color changing, etc. at the element level to provide more interesting and realistic animations, and therefore more understandable displays.

Still further, basic user interface components such as knobs, dials, slide bars and buttons may be shown in the display 300 and may be dynamically linked to information or controls within the control system or other runtime environment. Data view elements or dynamos may also provide or illustrate key parameters associated with measurements in control functions, alarms, events, etc. For example, a dynamo may be used to display a further screen having information related to a control loop parameter, and engineering units and may be shown next to the dynamo to provide context to the value displayed by the dynamo. The status of process alarms associated with a control loop may be reflected in the dynamo through color change, for example, a change in the background color of the control parameter value. Also, to eliminate clutter in the display, the fact that a loop is not in a designed normal operative mode may be indicated through color change. Of course, such dynamos may be made to conform with any standard.

Figure 18:
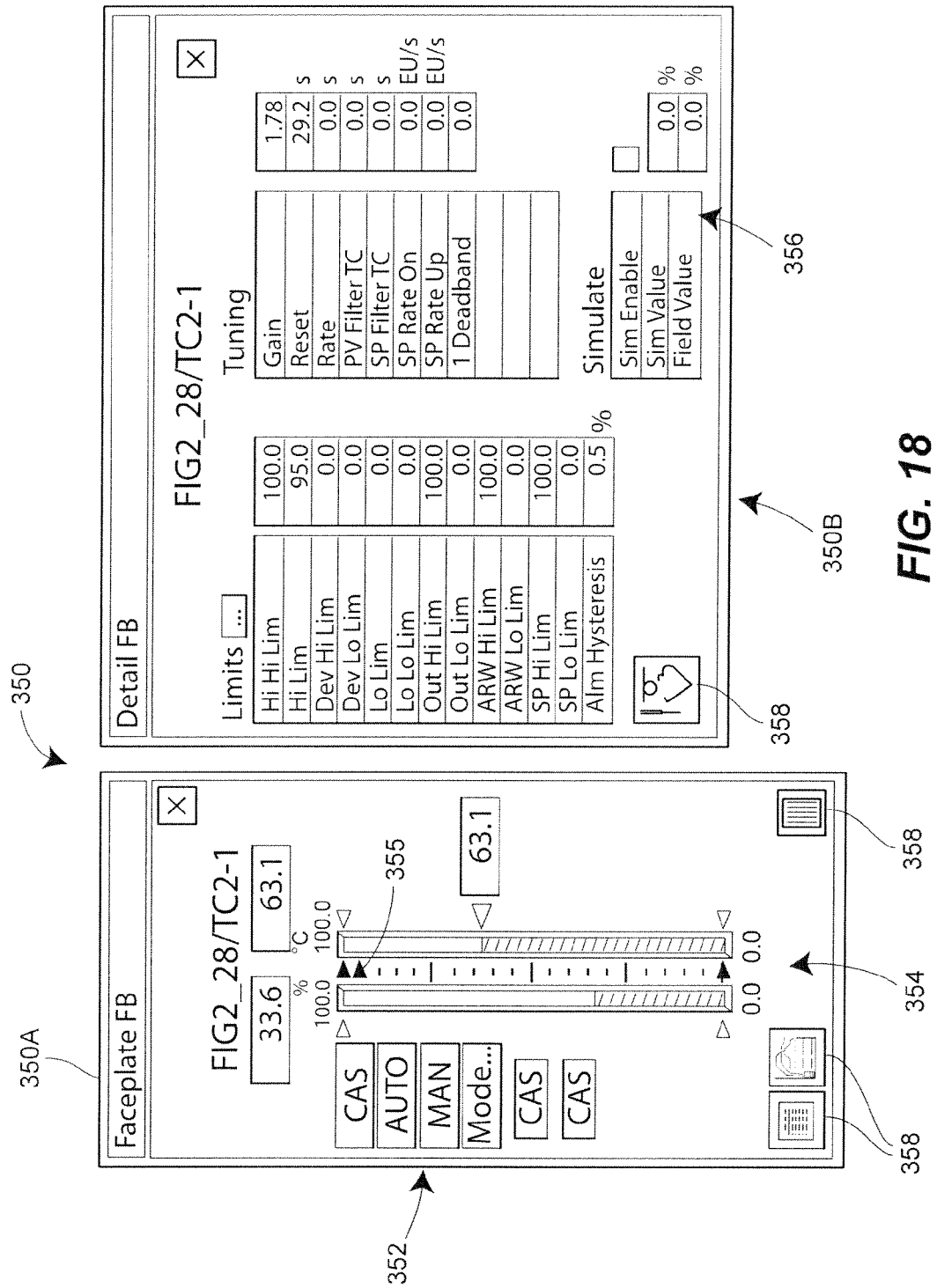
FIG. 18 is a set of graphic display screens that may be accessed via the graphic display of FIG. 17 to show a control panel and a faceplate for an element within the display of FIG. 17.

In one example, when an operator accesses a user interactive component or a dynamo, a script or other program may pull up a further screen or display, such as a faceplate display or control panel display, examples of which are illustrated in FIG. 18. For example, when a user interface button, such as the button 320B shown in the screen 300 is accessed, a faceplate for the reactor 310 may be presented to the operator, and the operator may then use this faceplate to modify or view details about the reactor 310. In the example of FIG. 18, the faceplate information 350 is associated with a control loop (named FIG2_28/T(-2-1) for the reactor 310 which the user may access via the button 320A in the screen 300. Using the portion 350A of the faceplate 350, the user may change the mode (from cascade to, for example, manual or auto) using the buttons 352 (the operation of which are defined by action routines), may view the current values of the operating parameters on the slider displays 354, may change a set-point associated with control loop using an arrow 355, etc. Additionally, the user may be provided with information on the limits and tuning parameters of the control loop in the display section 350B and may enable simulation capabilities in the section 356. If desired, the section 350B may be obtained from the view of the section 350A by selecting one of the buttons 358 on the section 350A. Likewise, the user may access still further information about the control loop, such as trend data, diagnostic data, etc. or may access and run control and diagnostic programs such as loop tuning programs via the other buttons 358. Thus, any other activities, screens, and actions may be accessed via the display 300 in response to user actions taken or allowed on the screen 300.

Where the control system supports the use of aliases in the definition of similar pieces of equipment, the dynamic display components may also be designed to support dynamic referencing based on the piece of equipment selected in the display screen 300. In such cases, pre-configured aliases and attributes may be used in place of an object tag or graphical attributes normally defined as part of a display object. This aliasing capability supports a high degree of flexibility and re-usability, because similar display objects may connect to different I/O points and represent different graphical attributes, appearances, and security. Such capability may eliminate the need to re-build similar display objects or similar displays for different pieces of replicated equipment within a plant. In this manner, the same graphic display may be used to view different hardware units that are the same in makeup and usage within a plant.

Of course, the display screen 300 of FIG. 17 may be designed to support toolbars, including both horizontal (below the display) and vertical (to the right of the display) toolbars in addition to or instead of the toolbar illustrated on the top of the screen 300. If desired, default toolbars may be provided to support the time and date display, viewing of an alarm list with direct access to the alarm display required to acknowledge the alarm or silence the alarm, navigation to an alarm summary display or menu, a main menu, or other standard menus or displays, system status displays, etc.

Figure 19:
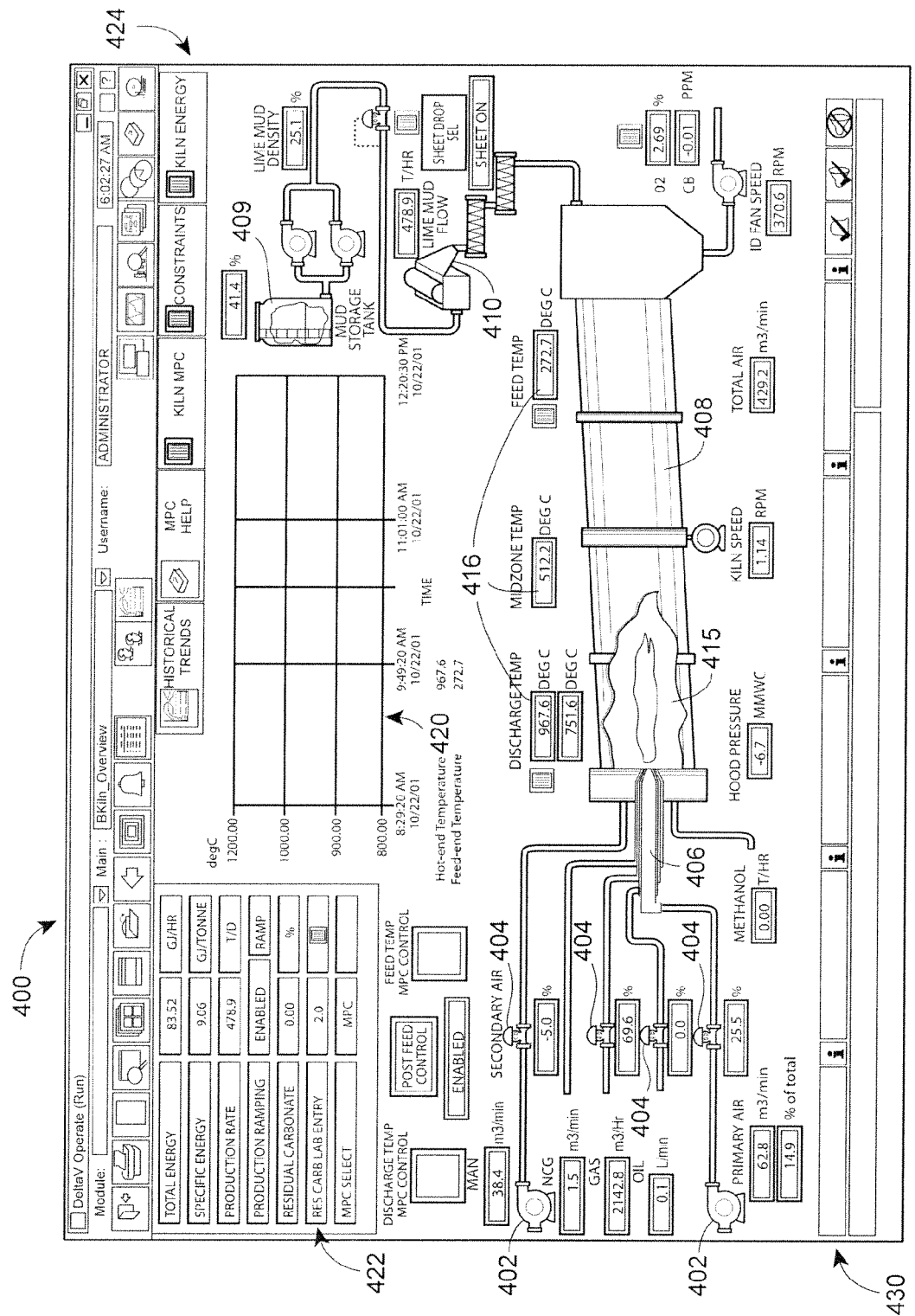
FIG. 19 is a display screen of a graphic display illustrating a lime kiln made up of various display elements, and providing data from various other applications and data sources within a process plant.

FIG. 19 illustrates a display screen 400 associated with a more advanced graphic display, i.e., one have more elements, connections, user interface actions, dynamos, and other data references. In particular, the screen 400 illustrates the operation of a lime kiln unit in which air and other combustion fuel products are pumped or fed through pumps 412, valves 404 and associated connector elements to an input 406 of a kiln barrel dryer 408. Likewise, process material in a tank 409 is fed from a sheet conveyer device 410 which transports the lime through the barrel dryer 408. Of course, each of these elements and the other devices illustrated in the screen 400 may be graphic elements which may be created individually and placed within the screen 400 as described above. The input 406 of the barrel dryer 408 may include an animated graphic element showing a fire or flame 415 as an animation when the dryer 408 is in operation, to clearly indicate the operation of the kiln unit to a viewer of the screen 400. Additionally, the temperatures at various points in the dryer 408 may be indicated with dynamos or temperature display boxes 416 and, if desired, temperatures at these various points may be indicated via the color of the fire animation, the dryer 408 or in any other manner. Likewise, other process parameters such as hood pressure, kiln speed, total air, methanol, input, primary and secondary air inputs, oil and gas inputs, etc. may be illustrated with parameter boxes, as shown in FIG. 19, with the values of the variables within the boxes being tied to and obtained from specific references within the process control system. Of course, other physical components of the lime kiln unit are illustrated in the screen 400.

However, various other information may be provided on the screen 400 that may be obtained from other data sources within the runtime environment, such as other applications which process data from the control system or from the devices within the control system. Such applications could include, for example, control applications, maintenance applications, diagnostic applications, business applications, etc. For example, a trend graph 420 showing the temperature (in degrees) of the system versus time is displayed in the upper center of the display screen 400 and is tied to a data historian or a trend application and automatically plots this data. Likewise, a chart 422 providing a summary of the operation of the kiln 412, which may be provided by a business application that tracks various business aspects, such as profit, energy use, production rate, etc. of the kiln, is displayed at the upper left-hand side of the screen 400. Still further, other information that may be useful to the user, such as historical trends, help information, kiln information, control constraints, kiln energy and other information may be accessed by selecting the user interface buttons 424 at the upper portion of the display screen 400. Still further, an alarm banner 430 or other banner may be provided at the bottom of the screen 400 and may be tied to an alarming application. Of course, all of these elements and features of the display screen 400 may be provided and programmed into the display using the features of the display editor 50 described above. Additionally, these and other features may be combined in a graphic display in any desired manner to create any desired type of display. Still further, any desired, animations and graphical actions could be provided in the screen 400 to provide more useful or understandable visual information to a user, to allow the user to view other related information more directly from the screen 400, etc.

Thus, as illustrated in FIG. 9 information from various different data sources, including process elements as accessed by the controller sub-system, applications in the form of maintenance, control, diagnostic, tuning, and business applications, historical data or tend data from databases such as a data historian, or any other data sources, may be displayed in the display screen 400. Still further, other information or displays may be accessed directly from the display screen 400 via user links to such displays. In this manner, the graphic display illustrated by the screen 400 provides more information, in a manner that may be more useful, to a user.

Because the editor 50 may be used to create any graphic displays using a common set of graphic elements, connection elements, etc. the display editor 50 may be used to easily create similar or related displays. Such displays may relate to and show the same set of plant hardware but illustrate different information for that hardware for different purposes, such as for control operator purposes, simulation purposes, maintenance purposes, etc. In this case, a common or base display may be made showing the hardware elements associated with a plant or a section of a plant and different displays may be created using that base display, but providing different information for different users or types of user.

As an example, FIGS. 20A-20E show example displays, including an operator's view, an engineer's view, a manager's view, a simulation view and a maintenance view, created for a lime kiln unit showing the same basic hardware elements in the same configuration and using the same visualizations, but having different information added for different functional purposes. Thus, each of the displays of FIGS. 20A-20E has the same look and feel because they are made with the same display editor using the same basic graphic elements, and are therefore easy to navigate between while retaining an understanding of the information being presented and how it relates to the hardware within the plant.

Figure 20A:
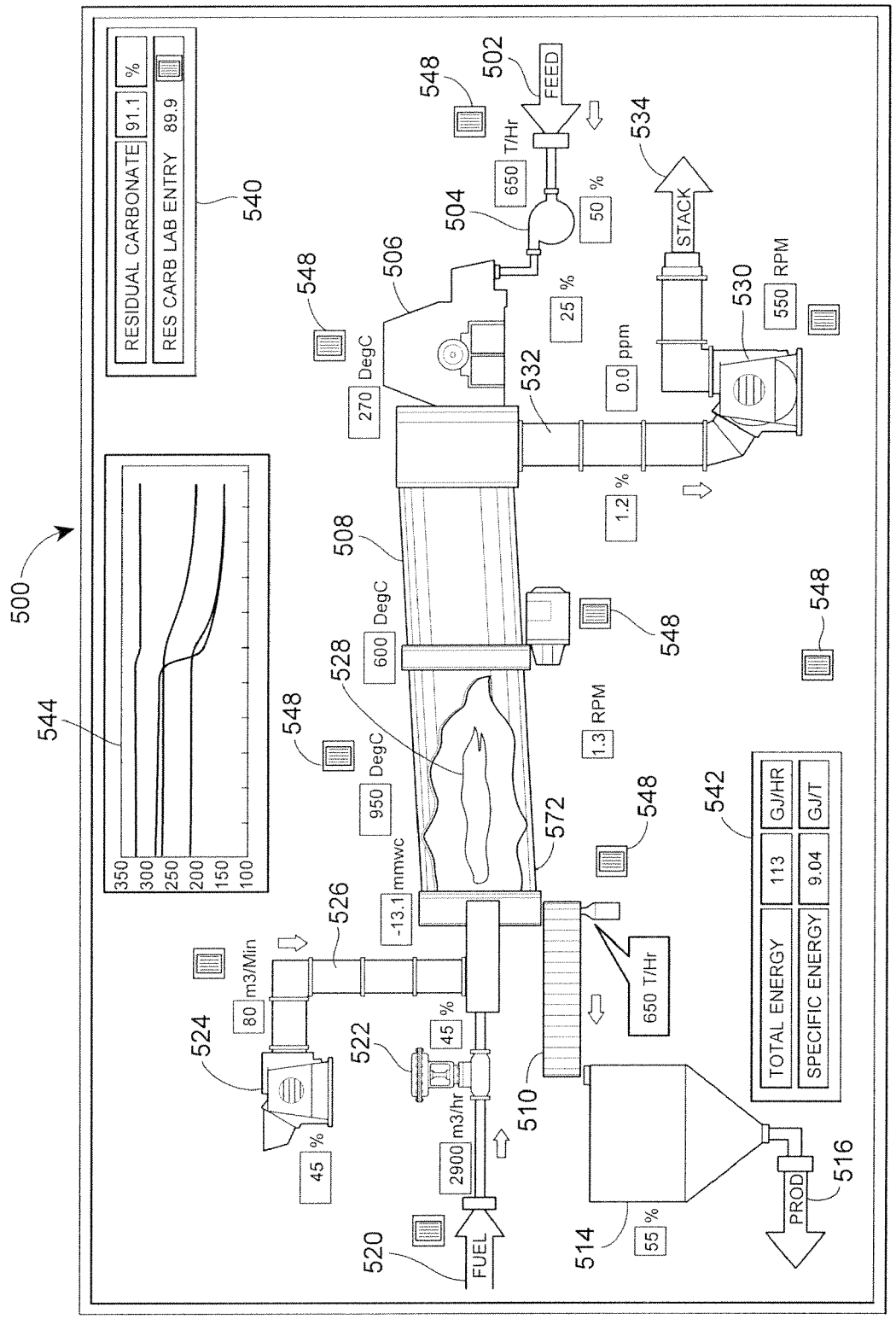
FIGS. 20A-20E are graphic display screens illustrating different views of a lime kiln having the same look and feel, including an operator view, an engineering view, a business view, a simulation view and a maintenance view.

In particular, FIG. 20A illustrates an operator's view 500 of a kiln unit have a lime and mud feed source 502 (which may be a stream element) feeding raw material through a pump 504 to a cold end 506 of a kiln dryer 508. A conveyor 510 removes the processed lime from a hot end 512 of the kiln dryer 508 and deposits the lime in a tank 514. A product line or stream element 516 indicates the amount of product (lime) exiting the tank 514. Likewise, fuel from a fuel source stream indicator 520 is provided through a valve 522, the color of which may graphically illustrate the operation of the valve, into the hot end 512 of the kiln dryer 508. A fan 524 pumps air through a duct connector element 526 to the hot end 512 of the kiln dryer 508 where it is mixed with the fuel. Animations, such as fire or flame 528 may be shown in the hot end of the kiln dryer 508 to illustrate the operational state of the kiln dryer 508. Likewise, an induction fan 530 draws air from the cold end 506 of the kiln dryer 508 through additional ductwork 532 and sends this air to a stack, as indicated by a stack stream element 534. Still further, various variable or parameter boxes are illustrated showing the values of various process parameters, such as temperatures at various parts of the system, the speed of the barrel of the kiln dryer 508, air and fuel flows, etc. As will be seen, this hardware and these variable boxes are common throughout the screens of FIGS. 20A-20E and provide the basic elements of the displays that causes these displays to have the same look and feel.

However, each of the screens of FIGS. 20A-20E includes additional information, user interface buttons and actions tailored to different functions within the plant. For example, the screen 500 of FIG. 20A is an operator's view and illustrates residual carbonate as measured, estimated and provided by a lab test in a box 540, the total energy and the specific energy of the kiln in a box 542 as well as a trend graph 544 showing the past and future trends of the temperatures provided by a model predictive control routine that are key to achieving optimum operation. Additionally, the screen 500 provides various user interface buttons or dynamos 548 that allow a user to view additional information about an associated item, such as control loop information, further operational information of an element, etc.

Figure 20B:
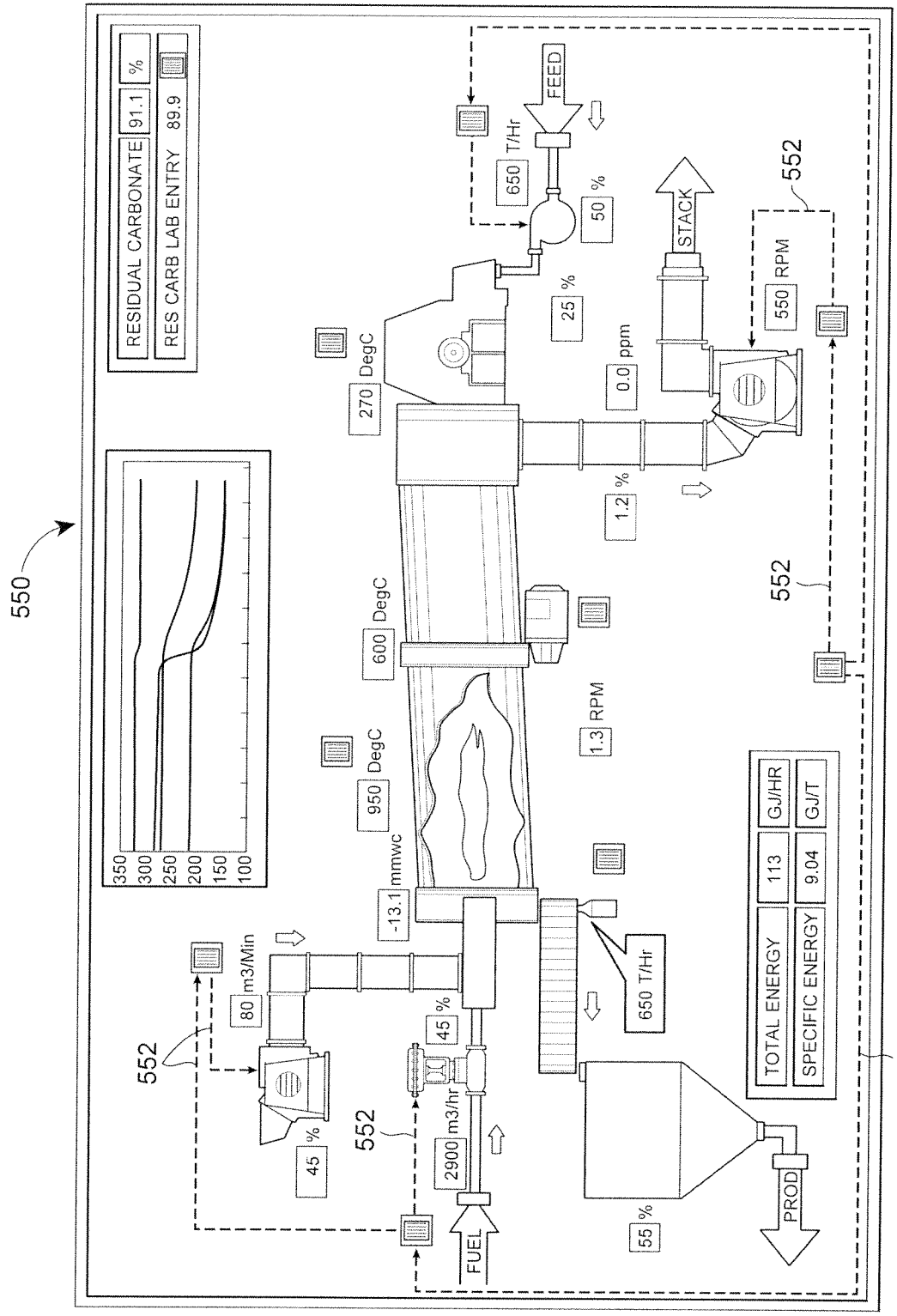
Figure 20C:
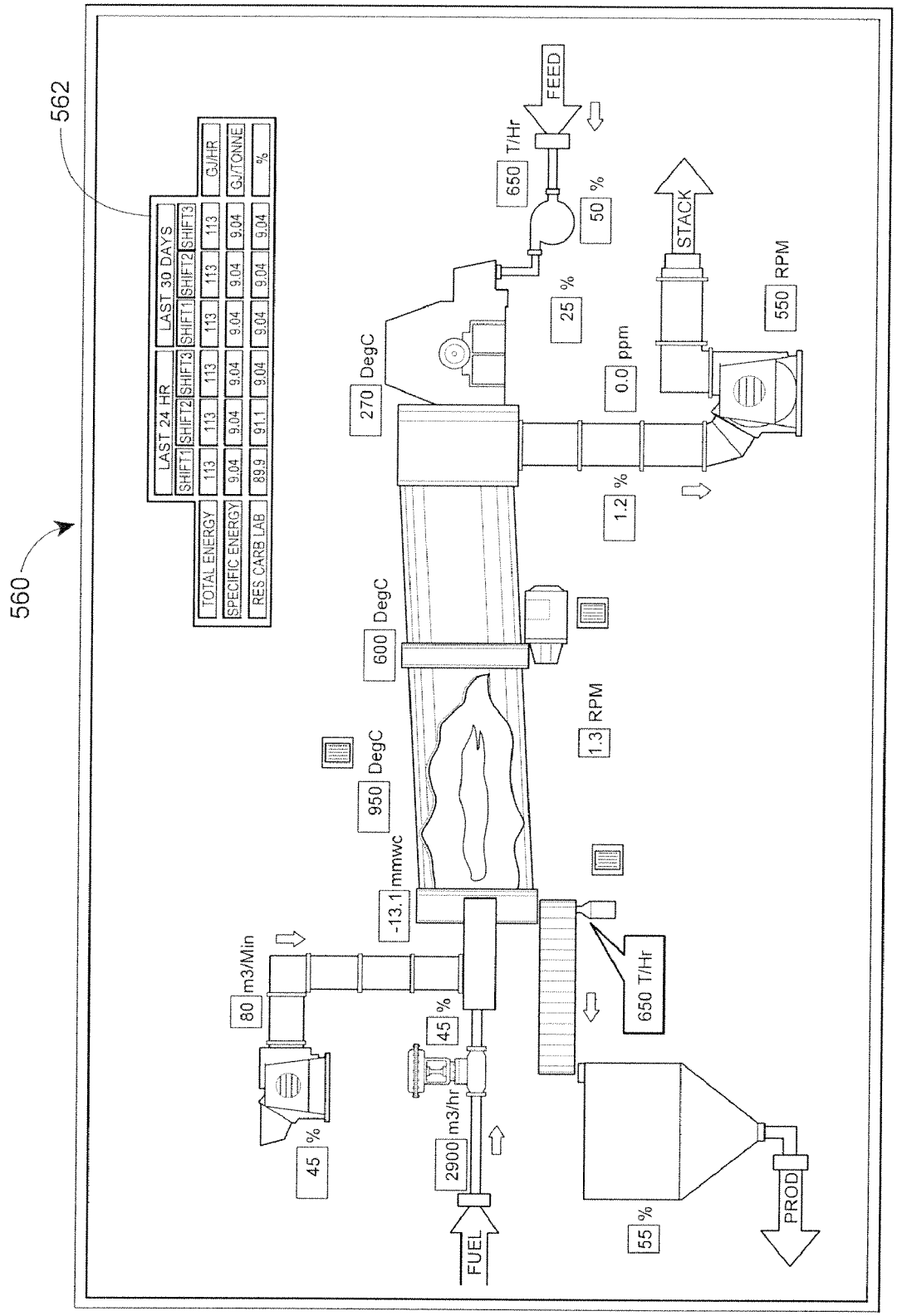

The screen 550 of FIG. 20B illustrates an engineering view, which is very similar to that of FIG. 20A, but which shows, via dotted lines 552 the measurement locations important for control and the signal paths to show how the basic control system and the model predictive control system work together to optimize operation. The screen 560 of FIG. 20C provides a management view that, while showing the basic operation of the kiln unit, does not provide user interface buttons that allow additional information to be obtained on individual components or control loops of the system. Still further the management view 560 includes a chart 562 showing the total energy, specific energy and residual carbonate (unconverted feed) from lab measurements over the past day and month. This information may be provided from a business application run in a business computer, for example.

Figure 20D:
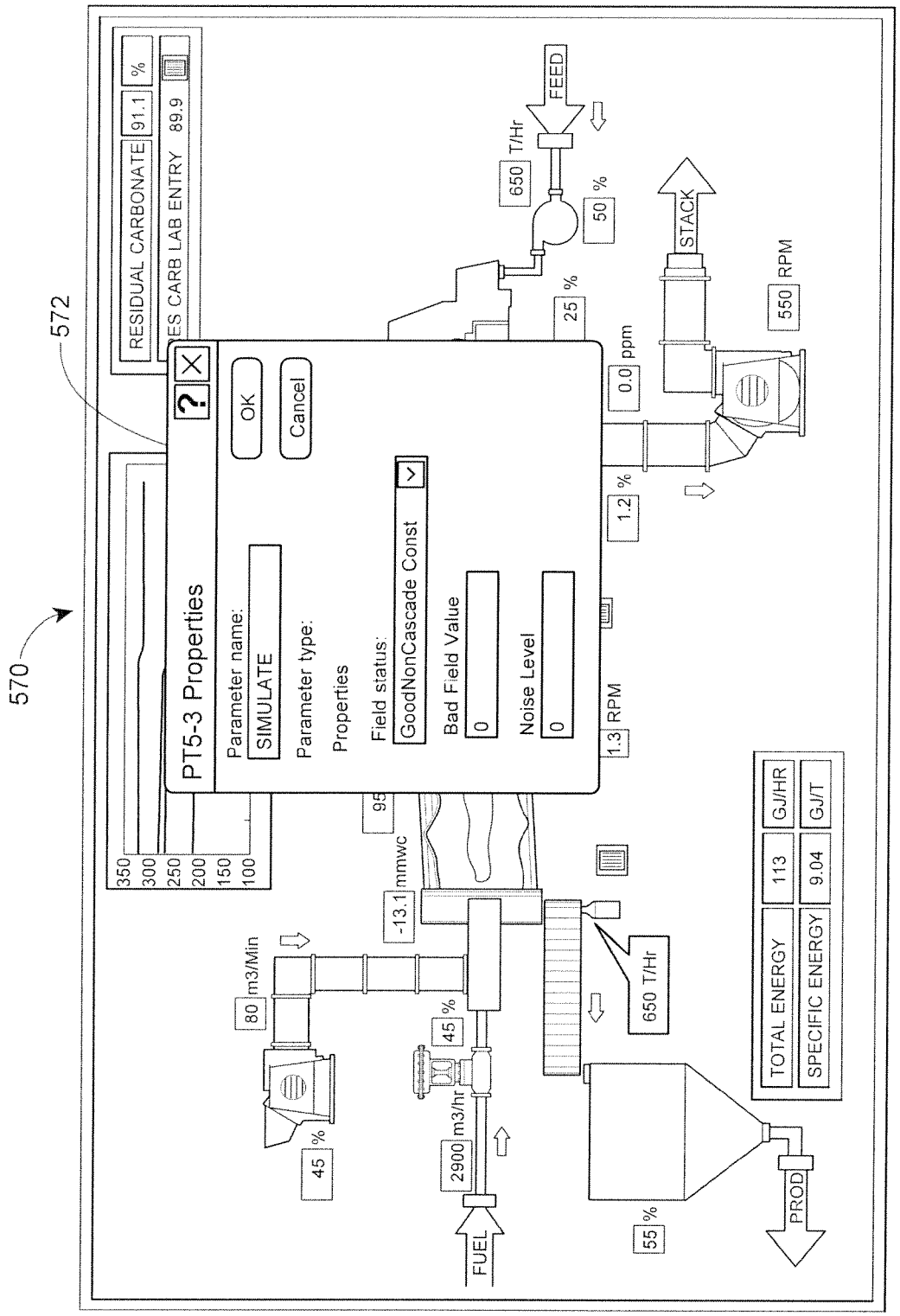

Still further, FIG. 20D provides a simulation view 570 which allows a simulator to change parameters within a simulated system and view the simulated results. The view 570 may be used, for example, to train operators, to test different future modes of operations, etc. As shown in FIG. 20D, the simulator may change parameters via one or more dialog boxes 570 provided to the simulation operator through one or more user interface buttons on the screen 570. The process simulation view 570 may be used in an off-line situation for training or in an on-line situation to provide added information that can be useful in detecting future problems. The process simulation can be generated from the graphics because the types of equipment and their connections are known as a result of using smart objects or graphic elements having simulation capabilities in the construction of the operator graphics. These smart objects are described in detail in U.S. Publication No. 2004/0153804.

Figure 20E:
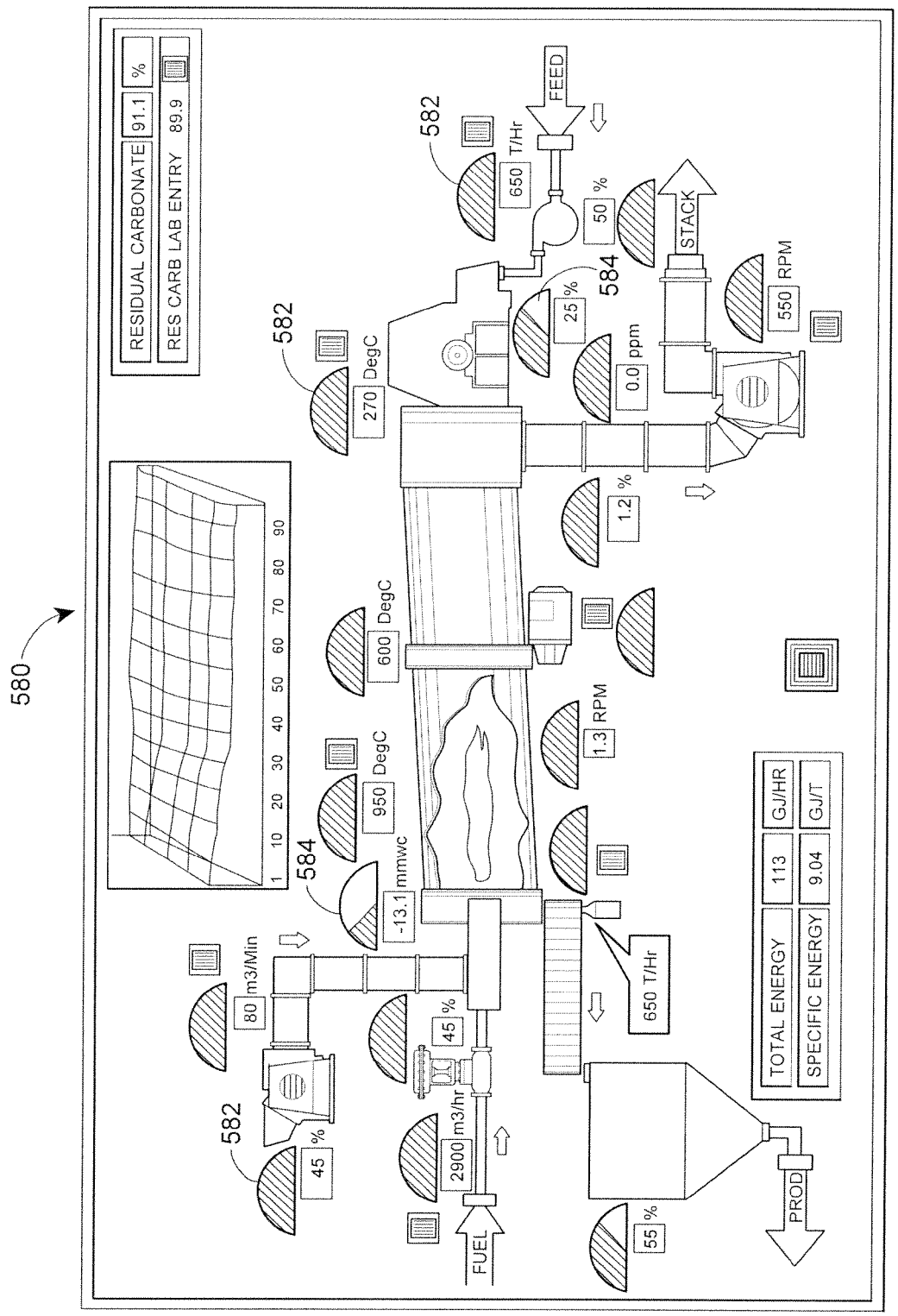

Likewise, FIG. 20E illustrates a maintenance view 580 that provides information on or into the state of the equipment within the kiln unit. In the view 580, equipment failure may be shown using indications 582 and 584 of equipment health. In this case, the indications 582 and 584 (not all of which are labeled in FIG. 20E) are half circles, with a fill color showing or specifying the current monitored health of the equipment. In the view 580, the indications 584 indicate equipment with less than optimal health. Of course, these indications 582 and 584 may be provided from maintenance or diagnostics applications. Still further, as will be understood, when a process problem is detected, a maintenance technician can use the screen 580 to drill down and find the recommended procedures to fix the problem. As an example, a plugged mud filter will need to be washed, which will require shutting off the feed and putting the kiln in an idle mode, which can then be done from the operator's view 500 of FIG. 20A. Operations will also know to check on the quality of the feed for excessive grit, which could be caused by a process problem upstream. Thus, as shown by this simple example, various interactions between the different functions, such as detecting a problem and fixing it, may be done simply and easily by switching between different views that have the same look and feel and thus are easy to navigate. Of course, the information in the various screens of FIGS. 20A-20E may be layered on the display and may be only shown based on the user of the screen, if desired. Also, the information shown for each element or smart object may change with the user or the identity of the user.

Figure 21A:
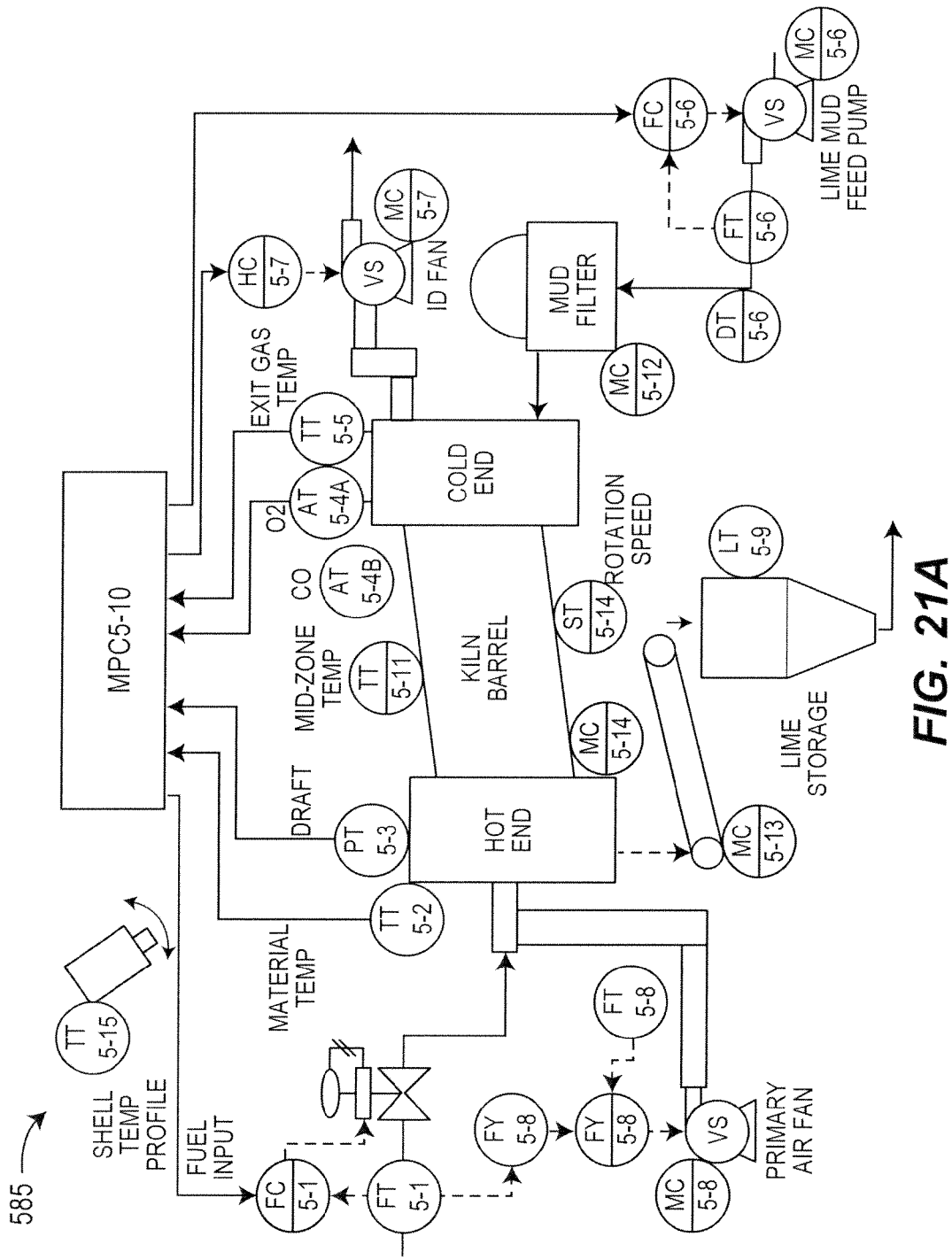
FIGS. 21A and 21B are display screens associated with a control routine used to run the lime kiln shown in FIGS. 20A-20E.
Figure 21B:
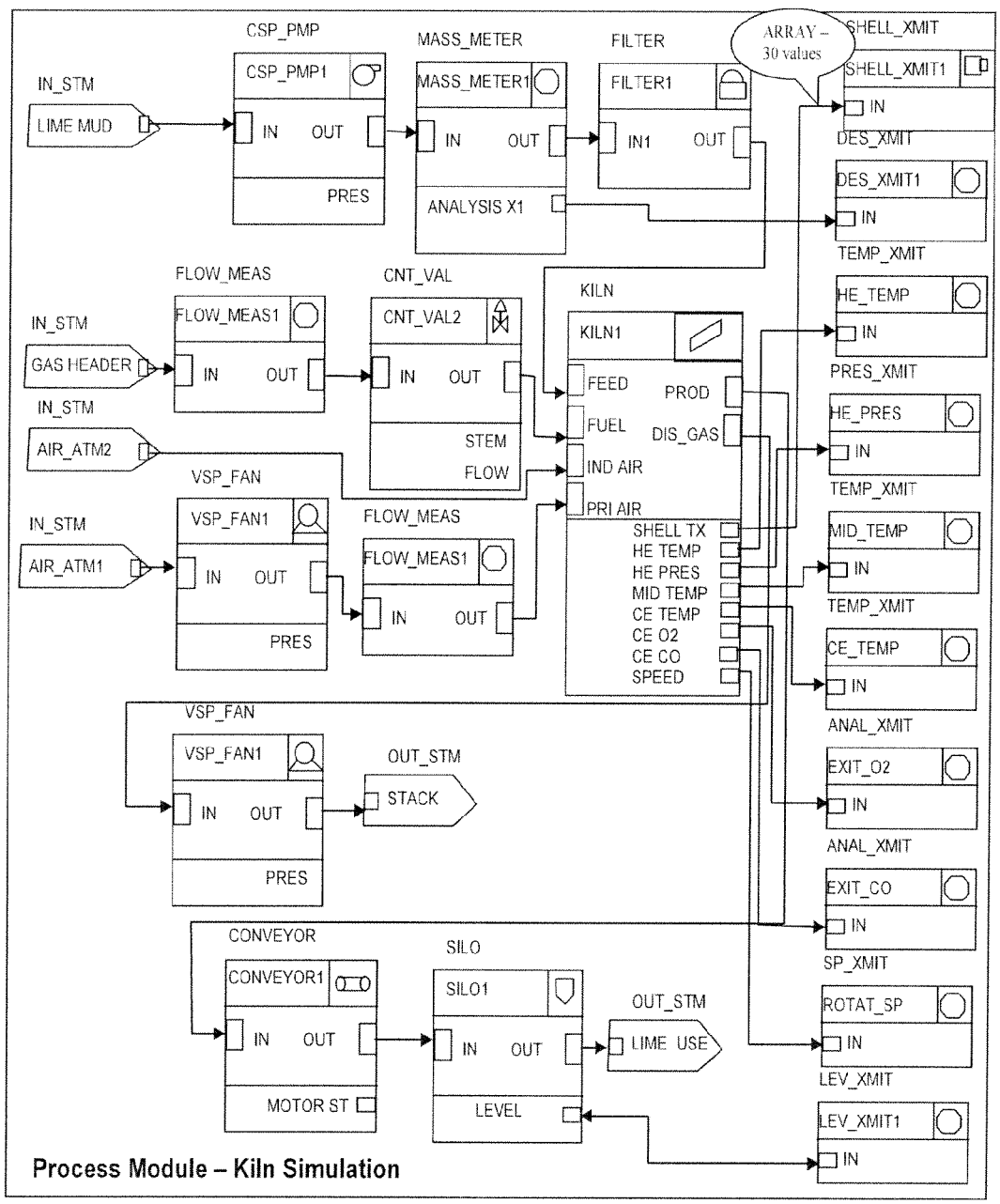

Still further, additional displays may be provided for and associated with the displays of FIGS. 20A-20E. These displays may include, for example, control configuration displays such as those of FIGS. 21A and 21B. A control display 585 of FIG. 21A illustrates the manner in which various control signals are sent to and from the various hardware elements of the kiln unit depicted in FIGS. 20A-20E to a controller, as well as the tags or variable names associated with these control elements. A control display 590 of FIG. 21B illustrates a control module, showing the control routines that implement control of the kiln unit of FIGS. 20A-20E. While not specifically shown as such, the control display 585 of FIG. 21A may be made using the same elements of the screens 20A-20E (with the same or different visualizations associated with these elements) or may use different elements. Likewise, because the displays 585 and 590 of FIGS. 21A and 21B may be made using the display editor 50, these displays may be provided with any of the graphic and animation capabilities discussed above. Still further, the control displays 585 and 590 may be accessed via, for example, the operators view 500 of FIG. 20A via one of the user interface buttons 548 provided thereon to allow an operator to easily obtain access to the current control set up from the operator's view 500.

Thus, as will be understood from the discussion provided above, various related displays may be created by the editor 50 and these displays may be layered in a number of manners. In particular, the displays may be layered as described above to provide related or similar operator, business, simulation, maintenance and engineering views and these views may be easily accessible from one another. Still further, different displays may be layered or connected together in a manner that reflects a particular hierarchical, logical or physical structure of the plant. Thus, for example, displays may be made for different physical or geographical areas of a plant. Thus, a single display may be created showing the major areas of the plant, and addition displays may be created showing the basic structure, for example on a unit by unit basis, within each area of the plant, while still further displays may be created for each unit. In manner, a user may drill down through the displays to obtain greater and greater detail associated with smaller and smaller sections of the plant. As another example, displays for different sections or portions of the plant may be concatenated or attached together via user interface buttons so that the operator can easily scroll through the different displays in a forward and reverse direction to view the different but physically connected sections of the plant or components of the plant in a logical manner.

Figure 22:
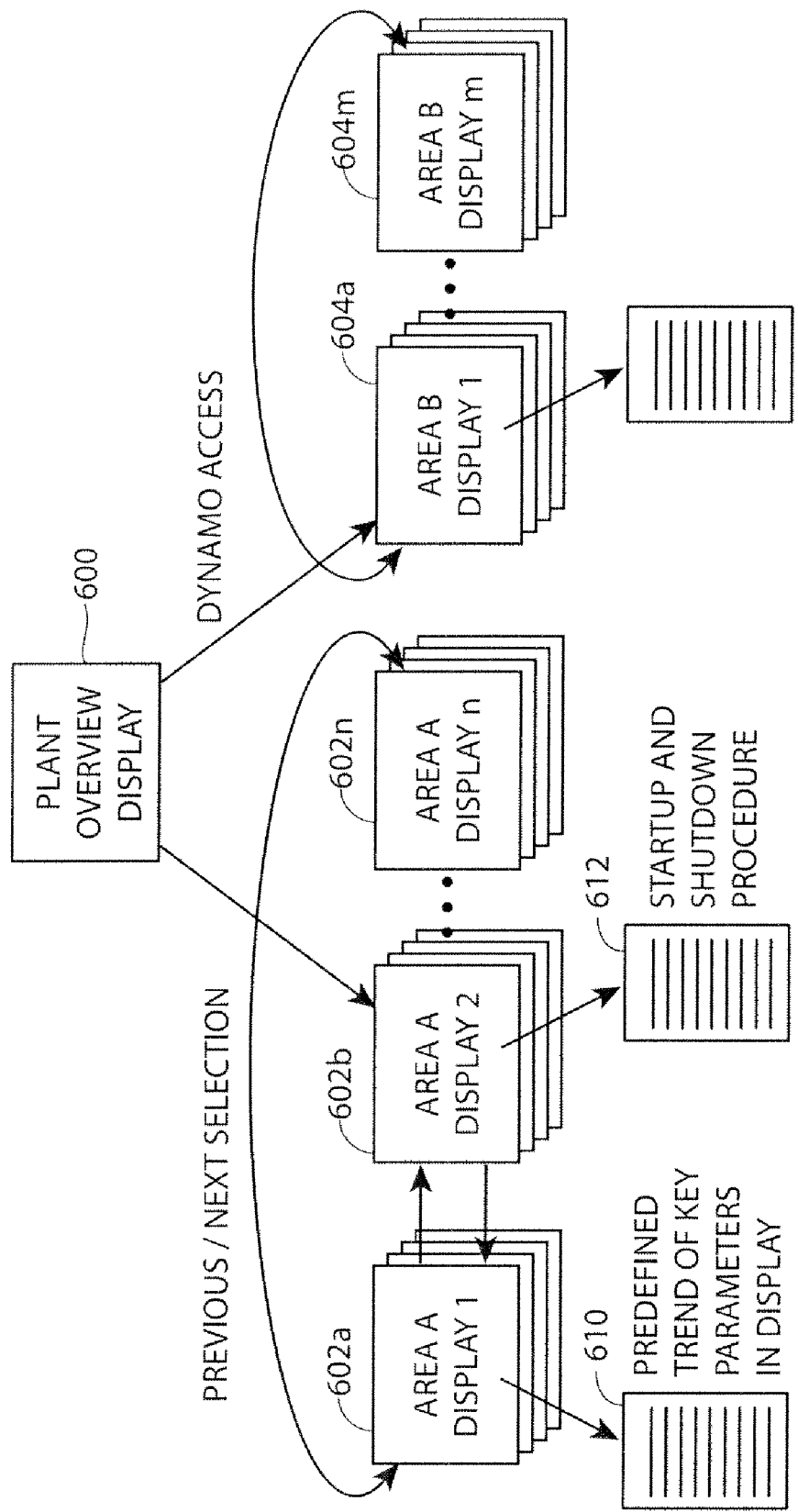
FIG. 22 is block diagram illustrating associations between various different graphic displays at various levels, including physical levels and functional levels.

These types of display layering are illustrated in more detail by the diagram of FIG. 22. In particular, a general or overall plant overview display 600 may provide a display that illustrates the basic or high level structure of the entire plant, although it may not provide much detail about any particular section or part of the plant. From the display 600, a user may be able to select (using interface buttons) or drill down to any particular section or area of the plant to pull up one or more displays 602 of area A or one or more displays 604 of area B of the plant. As indicated in FIG. 22, area A may have n separate displays associated therewith, all of which are logically connected in series with one another to reflect process flow through that area of the plant or some other logical structure associated with area A of the plant. Theo displays of area A, labeled 602a, 602b, . . . 602n may be accessed using a page forward or page back type of action in which the user can scroll from one display to the next. In this manner, a user can easily scroll through the displays form one section of area A to another section of area A in a manner that makes sense to the operator. Still further, as illustrated in FIG. 21, the operator may obtain predefined information or other display information from separate ones of the displays 602a-602n. Thus, the operator may be able, when viewing the display 602a of area A, to obtain a further display 610 depicting a predefined trend of key parameters in the display 602a. Likewise, when viewing the display 602b, the operator may be able to access a list or document 612 having start-up and shut-down procedure information. Of course, the user could scroll between the displays 602a, 602b, etc. in a forward and a reverse direction.

Likewise, when viewing area B, which is illustrated as including m displays 604a-604m, the user may scroll between displays at the same level of detail using forward and reverse (next and back) buttons within the displays so that it is possible for an operator or other user to access displays that contain information upstream or downstream of the displayed section of the process. In addition, dynamos or other user interface buttons may be provided to allow another display to be accessed, to obtain other information associated with elements within the current display. Through the use of these tools, it is possible to create a display hierarchy from which an overview display may be used to access the key display in each process area.

Additionally, as illustrated in FIGS. 20A-20E, displays may be layered so that numerous displays exist for the same section or part of a plant, but which are used for different functional purposes, such as for operator actions, maintenance actions, simulation actions, business actions, engineering actions, etc. These separate functional displays are illustrated in FIG. 22 as being layered beneath the displays 602a, 602b, etc. and may be accessed from one another, if so desired. Thus, when an operator or user is viewing the display 602a, the user may switch between or access the other functional displays for that section of the plant, such as the maintenance view, the simulation view, the business view, etc., if such access is permitted. Of course, the layering of the maintenance view, the operator view, the simulation view, etc. in this manner using the same basic display elements provides for easy switching between these views and a better understanding of what is happening within the plant with respect to the different functions within the plant.

To implement this an other functionality, graphic displays may be created to include an indication of the intended role (or function) for the graphic display. Such roles may include, for example, a faceplate display, a detail display, a primary control display, a schematic display, a maintenance display, a business display, a simulation display or any other user defined role. The role is part of the graphic display and may be used, when the graphic display is assigned to a control module or to a hardware device to define the use and access to that display during runtime. The indication of the role assigned to the graphic display may be used to indicate where and to what sections of the configuration system or plant a particular display may be assigned. Additionally, this role information may be used to determine which displays a particular user may access, based on the job being performed by the user. For example, control operators may not be able to view or access graphic displays defined as simulation or business displays.

The graphic display capabilities described above may also be used to create special displays to allow the status of critical equipment to be easily monitored. Some examples of these types of displays include first out indication on a process shutdown, vibration monitoring, burner management, sootblower operation, and safety system status. Of course, the associated displays can be structured to summarize the information and, in cases where moving equipment involves animation, for example a sootblower, animation may be effectively used to allow an operator to quickly access or understand the operation of the system. Additionally, the calculation capability of most control systems may be used to implement on-line calculation of operation cost, efficiency, etc. and this type of information may be easily incorporated into the operator's graphic display so that the operator can use this information to improve the process operation. Also, a variety of techniques may be used to integrate subsystem information in the control system so that standard graphics and dynamos may be used to create operator displays to allow access to subsystem information from a higher level display. In some cases 3D plotting of matrix values may be performed to show information (e.g. sheet gauging information).

Additionally, it will be noted that the graphic elements and displays may be advantageously implemented using vector graphics, such as those provided by Microsoft Avalon controls, to provide flexibility and speed. The use of vector graphics provides the ability to use scalable graphics to enable the display being created to be scaled and sized to fit a particular display machine as well as to provide animations that use scaling.

Generally speaking, and as described in greater detail in the co-pending application entitled the creation of each process graphic display, and graphic display element contained therein, is recorded in a respective textual description set forth in a first declarative format. Script commands in each description provide an efficient, non-memory intensive mechanism for defining the displays, despite the complexity of the graphics to be rendered. The declarative format and, therefore, the script commands, may be based on any one of a number of different markup languages. More particularly, a markup language based on XML may be relied upon to set forth a rendering definition (also called an XML blob) for each display and display element, and this XML blob may be used to store these displays and elements in a configuration library or database prior to being downloaded into a process runtime environment. To support advanced graphics, such as animation, the markup language may also define such graphics in accordance with a vector graphics scheme.

As indicated above, and as described more particularly in the co-pending application entitled "Markup Language-Based, Dynamic Process Graphics in a Process Plant User Interface" which has been incorporated by reference, the dynamic nature of the process graphics is designed to reflect current values of process plant parameters as on-line or simulation conditions change. To this end, the process graphics may be linked to sources for the data reflecting such changes. Each XML-based description may accordingly include one or more data source references that generally identify a data source location for each respective dynamic graphic parameter (e.g., a tank interior's changing color) to be modified in accordance with the data. The data source location may also be left open for later specification during configuration via the editors, such that the script identifies an alias or placeholder to refer to the data source or path information to be specified later. Because the data source information and other characteristics of the process graphic displays (e.g., behaviors such as event handling) are specified via the XML-based description, the XML-based language may be referred to as PGXML, or process graphics XML.

Upon finishing the configuration and design work toward defining a process graphic display and its constituent elements, the configuration engineer or other user may elect to process the PGXML description in preparation for downloading the process graphics to the operator workstations or other user display devices. Generally speaking, each PGXML description of the graphic displays and display elements is processed to generate (i) script in a vector graphics format compatible with a graphics rendering engine to be used, and (ii) code having instructions specifying the data source references and any other non-graphics functionality (e.g., behaviors) of the display. The vector graphics format of the script may also be a declarative, or XML-based language. In embodiments utilizing a Microsoft Avalon user interface architecture, the vector graphics script may be set forth in Microsoft XAML. Other embodiments may utilized the open source format, SVG (Scalable Vector Graphics). The code may be set forth in C# or any other suitable programming language.

In some embodiments, the vector graphics script and associated code are then combined and compiled into files that set forth executable commands for the operator workstation or other user display device. To this end, a respective dynamic-link library (DLL) file may be created for each process graphic display and graphic display element. In any event, such compilation of the vector graphics script and associated code may be performed prior to downloading to minimize network data transmission requirements.

Once created, graphic elements and graphic displays may be stored in a configuration database as generic or template objects and may be stored as class-based or non-class based objects or elements prior to being used in a runtime environment. Generally speaking, the graphic elements and graphic displays discussed herein may be modules, in the form of display modules, as described in U.S. Publication No. 2004/0199925, which is incorporated by reference herein. A class module (object) is one that is not bound or tied to any particular hardware or device in a process plant or a process control system, but is an object from which other objects which are bound to the process plant or the process control system may be instantiated. Generally speaking, to configure a process plant and, in particular, a runtime environment of a process plant, a configuration engine such as one of the configuration applications 33 shown in the configuration workstation 20 of FIG. 1, may be used to associate the graphic objects (including graphic elements and graphic displays) with other logical and physical entities within the process plant, including logical entities like control modules, equipment modules (e.g., unit modules), process modules, etc. or physical entities such as operator workstations or other display devices. In some cases, the graphic objects may be class objects and may be associated with other class objects, like equipment module class objects or control module class objects, or may the graphic objects may be individual objects and may be associated with instantiated objects, such as objects that have been bound to equipment within the process plant and downloaded, for example, to a controller, a workstation or other piece of equipment within the process plant.

Thus, the above-identified graphic elements and graphic displays may be configured within a process plant configuration system and downloaded to hardware within a process plant runtime environment in a manner similar to the manner in which other class objects are stored within a library and are configured within and then downloaded to various sections or subsections of the process control system, as described in U.S. Publication No 2004/0199925. In particular, the configuration engine, which operates on data within a configuration database such as the database 28 of FIG. 1, uses a configuration database hierarchy, such as that illustrated in FIGS. 23 and 24, to enable a user to view and alter the configuration of the process plant. The configuration hierarchy screen 700 of FIG. 23 shows that the configuration database for the control system 702 (labeled as the DeltaV control system), includes a Library section 704, a System Configuration section 706 and a Search Results section 708.

The Library section 704 includes class objects and other object definitions which have not been assigned or downloaded to the runtime environment, but are instead stored as templates or generic and unbound objects. As indicated in FIG. 23, the Library section 704 includes a Control Modules section 710, a Devices section 712, a Process Modules section 714 and an Operator Interface section 716 as well as a Batch section and a Safety Instrument Systems section (not indicated with a number).

While the Control Module section 710 is not expanded, this section of the configuration database generally includes the different control modules, such as control module templates and control module class objects, which have been created for the process plant to be used in various controllers and other control devices within the process plant. Still further, the devices section 712 includes indications of device objects which might include indications of actual devices and types of devices used within the process plant, such as valves, sensors, controllers, workstations, etc. as well as indications of device class objects, equipment class objects, etc. which define logical elements associated with different devices or hardware within the process plant. Still further, the process module section 714 includes the various process modules created for the process plant, including process module templates and process block definitions defined for these process modules. Such process modules are described in detail in U.S. Publication No. 2004/0199925 and so will not be described further herein.

Figure 23:
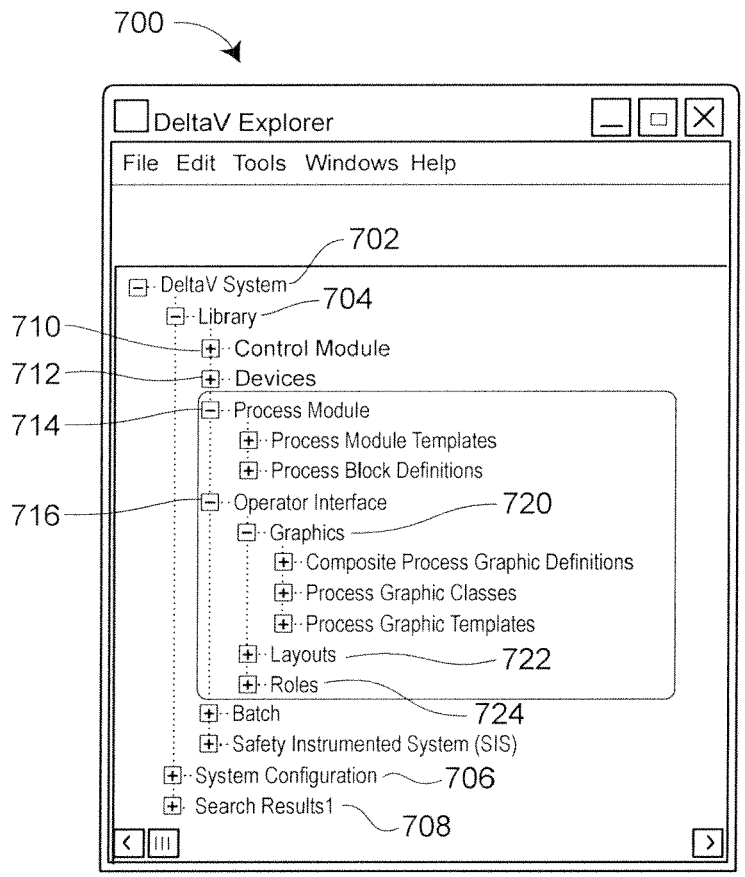
FIG. 23 depicts a first configuration screen illustrating a graphical configuration hierarchy associated with a configuration system.

However as indicated in FIG. 23, the Operator Interface section 716 of the configuration hierarchy 700 stores information associated with the graphic objects described above. In particular, a graphics section 720 includes various composite process graphic definitions, graphic class objects and graphic templates, which define the various graphic elements and graphic displays that have been created for the system. It will be noted that the composite process graphic definitions section generally includes the graphic elements created for the system, the process graphic classes section includes the graphic displays created in the manner described above as class objects, while the process graphic templates may include non-classed based graphic displays and other template objects. The graphic objects stored in this section of the configuration database are generally unbound objects that may be used to create other objects, and that may be used during a configuration process to define the manner in which graphic elements and graphic displays are to be bound to the various hardware and software within the process plant. Still further, a Layout section 722 under the Operator Interface section 716 defines various layouts for the operator interfaces, while a Roles section 724 defines various roles which may be implemented on operator interfaces, as well as roles fulfilled by various ones of the graphic displays and elements.

Thus, the configuration database as illustrated by the configuration hierarchy 700 may include a section that stores graphic objects including graphic elements and graphic displays as generic templates, as class objects or as specific or individual elements or displays which, while not being bound to specific process entities, may be used to define elements or displays which will be bound to specific process entities. Generally speaking, a configuration engineer or other user may use the hierarchy 700 to configure a process plant to include graphic display capabilities in a manner discussed in more detail below.

Figure 24:
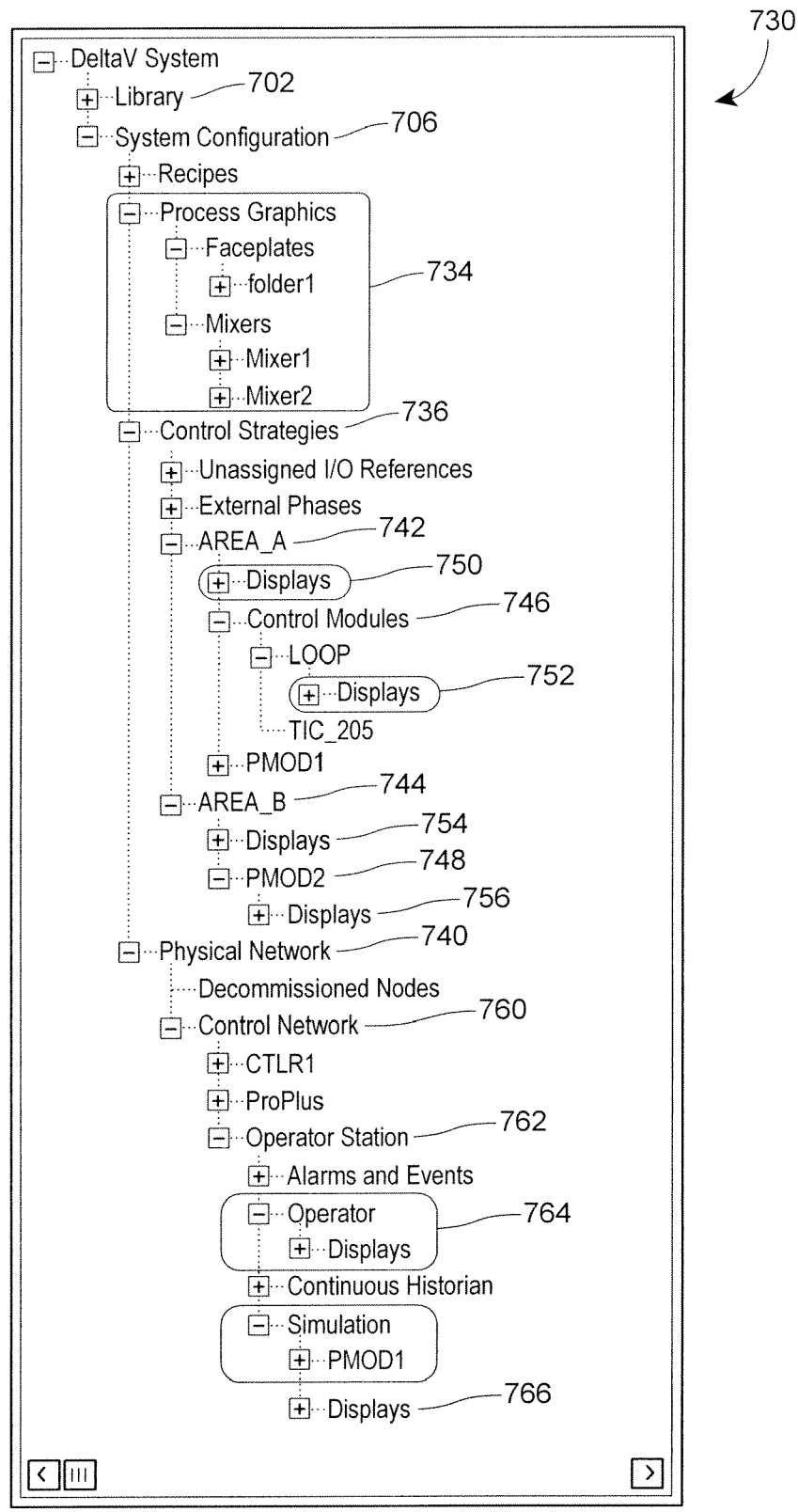
FIG. 24 depicts a second configuration screen illustrating a graphical configuration hierarchy showing one manner in which graphic elements and graphic displays may be assigned to and integrated with other elements within the configuration system.

FIG. 24 illustrates a hierarchy screen 730 in which the System Configuration section 706 has been expanded to illustrate how process graphic elements and graphic displays may be associated with various logical and physical entities of the process plant as part of a system configuration. In particular, a Process Graphics section 734 under the System Configuration section 706 defines various graphic displays that have been generally defined to be downloaded to the process plant for use in a runtime environment. Generally speaking, the graphic displays and elements within the Process Graphics section 734, which may include for example, faceplate displays, operator displays, detail displays, maintenance displays, simulation displays, etc., will be downloaded to each display unit (e.g., each workstation or other display device) within the process plant, as the Process Graphics section 734 applies to the entire system configuration. However, graphic elements and displays may instead be associated with particular sections of the system configuration including a Control Strategies section 736 and a Physical Network section 740, which may limit the display devices on which these graphic elements and displays will be available.

Generally speaking, the Control Strategies section 736 defines the various control routines assigned to or strategies implemented with respect to different physical and logical sections of the process plant. Various ones of the graphic displays (which again may be any types of displays such as faceplate displays, control displays, maintenances displays, etc.) may be assigned to specific subdivisions or subcategories of the Control Strategies section 736 including, for example, to areas (such as to the areas named Area_A 742 and Area_B 744), to control modules associated with areas, such as to a Control Module section 746 and to process modules assigned to areas, such as to a process module 748. Thus, as illustrated in FIG. 24, a display section 750 is associated with the Area_A section 742, which defines all the displays which are used for and in Area_A of the plant. While not broken out, the displays under the folder 750 could include various displays associated with different sets of hardware in Area_A such as the different displays 602*a*-602*n* of FIG. 22, as well as various sub-displays accessible from these displays, such as displays 610 and 612 of FIG. 22. The roles defined for the displays may indicate the manner in which these displays are accessible from one another or to an operator using a display device. Thus, as described with respect to FIG. 22, a user may scroll through the displays in the section 750 to view different parts of the Area_A of the plant or to view more detail with respect to any, particular area, including, more detailed displays of particular portions of a higher level display not shown in as much detail in the higher level display.

Still further, displays can be assigned to specific control modules within the Area_A section 742 as indicated by the Displays icon 752 under the Control Module section 746. In this case, the displays 752 are associated with a control module loop (named LOOP) and may specifically be control operator displays associated with that particular control loop. Again a role defined for a display may indicate its role within an operator station as part of a control display. Still further, as illustrated with respect to the Area_B section 744, displays 754 may be generally associated with the area while displays 756 may be associated with particular process modules assigned to an area. In this case, a Display icon 756 is associated with a process module named PMOD2, which is a process module associated with the equipment in Area_B. The PMOD2 may be, for example, a unit module or an equipment module or any other type of process module.

Thus, as generally indicated under the Control Strategy sections 736, displays may be associated with particular control strategies or control definitions, as those control definitions are created within the configuration system. As shown in the example of FIG. 24, displays may be associated with control definitions defined on an area-by-area basis, such as for the area sections 742 and 744, as well as on a control module-by-control module basis, such as for control modules 750 and on a process module-by-process module basis as indicated by the display section 756. Additionally, if desired, equipment items may be associated with roles, which allows the displays associated with those roles to be accessed dynamically from equipment elements. Such equipments roles and displays may be stored in the process graphics section 734.

Additionally, displays may be also assigned or associated with actual hardware elements within the process plant, including operator workstations or other display devices. Thus, as indicated under the Physical Network section 740, specific displays may be assigned to specific operator workstations or other runtime machines having displays. In the particular example of FIG. 24, the Physical Network section 740 includes a Control Network 760 which has associated hardware, such as a controller named CTLR1, a ProPlus station, which may be a configuration station, and an operator workstation named OperatorStation 762. The OperatorStation 762, which defines or is associated with a particular workstation or user interface within the plant, include alarms and events functions, operator activities, a continuous historian function and simulation activities associated therewith, although other activities or functions such as maintenance activities, business activities, etc. could be associated with and performed on any particular user interface. In this manner, particular user interfaces may be assigned to roles within the process plant and have the displays for those roles stored in or downloaded to the display device.

As indicated in FIG. 24, displays 764 and 766 are assigned to the operator function or activities as well as to the simulation function or activities performed by the workstation 762. While not shown in FIG. 24, displays may be assigned to other display devices, e.g., those associated with other nodes within the process plant, to be implemented on these display devices. Still further, the assignment of displays to specific functions within the operator workstations or other runtime display machines may determine the roles or functions that these displays may perform within the runtime environment, such as an operator function a simulation function, a maintenance function, etc. Of course, these various functions may be performed on the same display device or on different display devices, in a manner set by the configuration system. Also, while the configuration hierarchy 730 illustrates displays being assigned to an operator workstation, displays can be assigned to other types of display devices, including handheld computer display devices, like PDAs, telephone devices, business workstations or any other desired types of display devices.

The configuration engine enables a user, such as a configuration engineer, to use the configuration hierarchy to define and manage the manner in which the process graphic displays are bound to and downloaded within the process plant. Generally speaking, a user such as a configuration engineer, can create, delete, rename, assign and download display objects within the configuration system in the same manner that the user can do so with respect to other objects. More particularly, the configuration engine enables graphic displays to be integrated into the configuration of the process plant by defining where (to what devices) to assign these displays for execution and the process entities (logical and physical) to which these displays should be bound during runtime. If desired, a configuration hierarchy screen, such as those of FIGS. 23 and 24, may be used to indicate downloads that are needed and to implement version control on the displays.

Configuration can occur at multiple levels within the configuration system. In the first place, a configuration engineer may first associate a display class object with a module class object in the Library section 704, which binds a particular display class object to a particular module class object, such as an equipment module class object, an area module class object, etc. Thereafter, when the module class object is instantiated and assigned (or other configured) to a particular part of the process plant, the display objects (e.g., graphic displays) associated with the instantiated module object are hound to the same hardware along with the module object, and thus no additional effort need be performed to assign a graphic display to the appropriate hardware within the plant or to download this graphic display object to the appropriate hardware. Instead, in this case, the graphic display object follows the configuration of the module object to which it is bound. Still further, when a display class object is associated with a module class object, as described above, changes made to the module class object may automatically cause these changes to propagate to those same elements within the associated display class objects, and these changes may then be propagated down to actual instantiated versions of graphic displays. In one example, if a graphic display includes a mixer (equipment class object) which contains a control module called Loop, and this control module is selected and renamed, the configuration system may automatically change the references to the Loop within the graphic display to the new name, to thereby assure that the graphic display bindings are updated with the new name. However, the actual newly changed displays may still need to be downloaded to the runtime machine for the changes to take place in the runtime system. If desired, indications that a download is required may be placed next to the displays as stored within the configuration hierarchy, such as by placing a blue triangle next to the appropriate ones of the graphic displays icon.

On the other hand, graphic displays may be assigned separately or directly to different components within the process plant or configuration system. In particular, as illustrated in FIG. 24, individual graphic displays may be placed in the Process Graphics section 734 under the System Configuration section 734. These displays may be placed in this section by, for example, being selected in the Library section 702 and being dragged and dropped onto the section 734. Of course, other manners of moving graphic displays to particular sections of the hierarchy 730 may be used as well. In any event, the graphic displays in the section 734 might include, for example, faceplate displays or other class based or non-class based displays and are generally eligible to be downloaded to all workstations within the plant or the section of the plant covered by the System Configuration section 706.

However, a user can move displays out of the Process Graphics section 734 and into specific subsections in order to control the identity of the workstations (or other display devices) within the process control system that will have access to these displays and, therefore, to control the identity of the devices on which these displays can be used. To assign a specific display to a logical or physical plant section, the user may, for example, select a graphic display, drag and drop the graphic display onto the specific section of the configuration hierarchy 730 to thereby define the association between that graphic display and the logical or physical entities to which that display is to be associated. The resolution table for a display may be automatically filled out at the time that this configuration step occurs, based on the section of the configuration into which a display is dropped or associated.

For example, graphic displays may be dragged from the Library section 702 to the Process Graphics section 706 to associate the display with the runtime environment. Also, graphic displays in, for example, the Process Graphics section 734 may be moved into other sections, such as into the Area_A Displays section 750 (making this display specific to the Area_A entity and functionality but generally available on any Area_A display device), the Area_B Displays section 754, etc. Likewise, graphic displays may be associated with sub-sections of logical entities, such as being associated with the control module named LOOP (as indicated by the displays folder 752), which makes these displays specific to this logical entity and available only on machines that perform or that are defined as being associated with this control loop function. Additionally, displays may be assigned to specific display devices or functional subsections of display devices, such as that defined by the operator function within the OperatorStation 762 or the simulation function 770 within the OperatorStation 762. While not specifically shown in detail, the user can also assign graphic displays to an area, a cell, a unit, an equipment module, as well as to different control sections to define the manner in which the graphic displays are associated with and to be used within the process plant.

When a graphic display is assigned to a logical entity, such as to a control strategy, like that defined by an area designation, like Area_A or Area_B, the graphic display is assigned to the physical interfaces (e.g., workstations) to which these logical entities are assigned. Similarly, when a display is assigned to a unit, a cell or an equipment module, the display is assigned to the workstation or other interface devices to which that unit, cell or equipment is assigned.

When a module includes multiple graphic displays, the module may define the roles for those displays or define roles that each display fulfills, as defined by a role indications assigned to the graphic displays when the displays were created. Access to those graphic displays within any display device may then be associated with or limited by the role defined for the display. Still further, if a graphic display is assigned to an area or to a module, a reference to this graphic display may show up as a graphic display in the Displays folder of the area or module to which it belongs. Once a graphic display is assigned to an area or module, the display references owned by this area or module, and hence this display, will follow the area or module during any assignment or movement of the area or module. On the other hand, when an area or module is assigned to a workstation, the display that belongs to that area or module will be automatically assigned to the operator subsystem or function of that workstation as defined by the role of the display. Of course, individual graphic displays may be assigned directly to the operator subsystem of a display device by being placed directly within or under the particular interface device or subsystem of the interface device within the Physical Network section 740 of the configuration hierarchy.

Thus, as will be understood, graphic displays may be assigned to individual nodes, to control areas, to control modules, to process modules or to other logical control entities, as well as to individual display devices and subsystems thereof by being dragged to and dropped in each of these entities within the configuration screen 730. Of course, if desired, the same graphic display may be assigned to multiple stations and the status of each display (downloaded or just assigned) may be indicated by an icon provided for each display name in the various folders within the hierarchy 730. If desired, other icons can be used in the hierarchy 730 to indicate when graphic displays are locked in memory or whether they can be maintained in virtual memory on the disk.

Generally speaking, graphic displays are made up of a display content (e.g., an XAML script that defines the manner in which the display will appear visually on a display screen), local tables and references which may be references to other displays as well as references to runtime parameters such as control parameters, etc., references to display controls, runtime aliases (some of which may bind at runtime), local table references and global table references. Generally speaking, the configuration engine treats the graphic part of the graphic element (the XAML) separately from the references, making it easier to deal with and use graphic displays. In particular, the configuration system may bind a graphic display during the configuration process by filling out the references which do not use dynamic aliases based on the assignments performed in the configuration hierarchy. Thus, for example, when a user drags a graphic display from the Process Graphics section 734 or from the Library section 704 of the configuration hierarchy 730 to a particular area or control module, binding is automatically performed in the graphic to bind the references within the graphic display to the specific elements associated with that area or module. In this manner, download bindings may be performed automatically based on the configuration being performed by the user, which reduces the amount of work the user must perform manually to specify these bindings.

Still further, if there are unresolved bindings at the configuration step, the configuration engine may query the user to provide information to resolve the bindings, such as to change the bindings or the references. Still further, if desired, bulk edit tools, such as a spreadsheet program like Microsoft Excel® may be used to assist a configuration engineer in filling out or defining resolutions or binding parameters during the configuration process. In any event, these configuration steps fill in the resolution table 208 discussed with respect to FIG. 13 which enables the graphic displays to be used in a runtime environment. Thus, the user can perform bindings and downloading of graphic displays (and graphic elements) in generally the same manner that the user does so with respect to the process modules described in U.S. Publication No. 2004/0199925.

Figure 25:
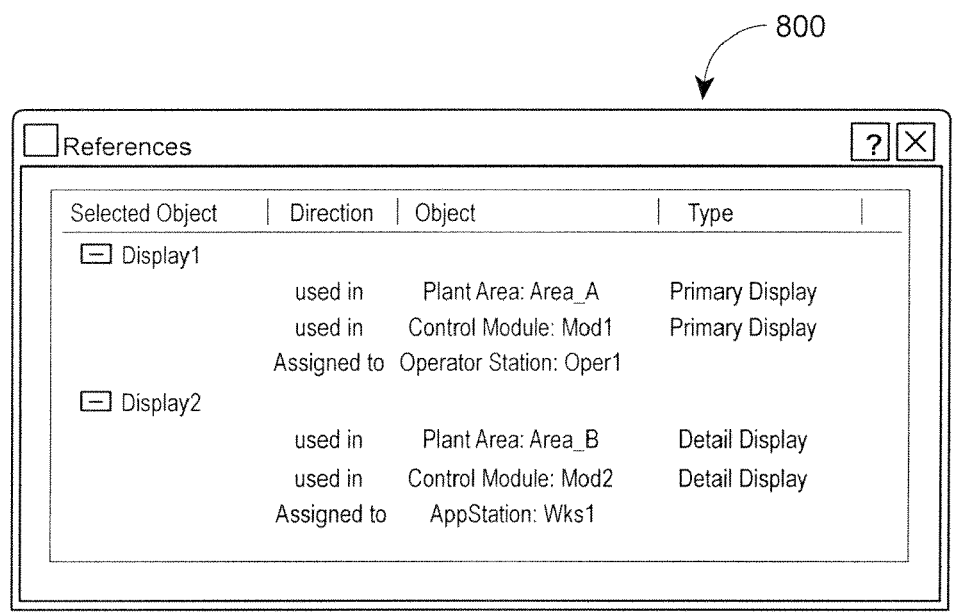
FIG. 25 depicts a dialog box that may be provided to a user to summarize the manner in which one or more graphic displays are assigned within a process plant configuration system.

Of course, the user or configuration engineer may unassign graphic displays by clicking on the graphic display and removing it from the hierarchy 730 or otherwise engaging a dialog box to cause this graphic display to be unassigned. Still further, a user may view the manner in which a particular graphic display or set of graphic displays is assigned, and such information may be provided by, for example, a dialog box 800 shown in FIG. 25. The dialo box 800 of FIG. 25 indicates the manner in which each of two displays, Display1 and Display2 is configured within the process plant. In particular, the dialog box 800 indicates where each of the displays are used Display1 is used in a plant area called Area_A and in the control module called Mod1), the physical station to which it is assigned (e.g., Display1 is assigned to an operator station called Oper1) and the role that the display fulfills (e.g., Display1 is a primary display in each of its uses).

It will be understood that the display roles can also be changed in any desired manner, and that the roles may be used to indicate a portion of the configuration system to which the graphic display can be assigned or who ca use the graphic display, i.e., for what function. Graphic displays may be used to fulfill multiple roles if so desired. Of course, as noted above, when a user assigns an area, or a module of some kind to a workstation or other display device, any displays associated with that area or module are also assigned to the workstation to assure that the graphical support for that area or other module is provided on the workstation. Also, when a graphic display is assigned to a workstation or other display device, the graphic display may be assigned to a subsystem of the workstation based on the role of that graphic display, such as whether the graphic display is a simulation display, an operator display, etc. Additionally, the user may drag and drop graphic displays onto particular subsystems of a workstation or other display device, and if the role is incorrectly assigned, the configuration system may present a dialog box to indicate to the user that an incorrect assignment is being made or to allow the user to change the roles of the graphic display.

After performing appropriate or desired assignments using the configuration engine and the configuration hierarchy 730 of FIGS. 23 and 24, the user operator may perform an actual download of the graphic displays, which causes the graphic displays to be actually downloaded to the appropriate operator workstations as defined in the configuration hierarchy 730 for the purposes and roles defined in the configuration system. During this downloading, the bindings within the displays are resolved based on the assignments to the areas, loops, control modules, process modules, etc., as well as to the operator workstations or other display devices.

If desired, the Search Results section 708 of the configuration hierarchy (shown in FIG. 23) may enable a user to perform searches for any individual graphic displays or graphic elements used in graphic displays throughout the process plant or configuration system. In particular, the configuration engine may include a search engine which, when engaged by the user, may perform searches for specific graphic displays or graphic elements, and may store the results of such searches in the Search Results section 708 to provide the user with a complete listing of the uses of any particular graphic element or graphic display. Such searches are useful to enable users, who are making changes, to view which graphic displays need to be changed or what downloads might need to occur in order to implement those changes.

When implemented, any of the software described herein may be stored in any computer readable memory such as on a magnetic disk, a laser disk, or other storage medium, in a RAM or ROM of a computer or processor, etc. Likewise, this software may be delivered to a user, a process plant or an operator workstation using any known or desired delivery method including, for example, on a computer readable disk or other transportable computer storage mechanism or over a communication channel such as a telephone line, the Internet, the World Wide Web, any other local area network or wide area network, etc. (which delivery is viewed as being the same as or interchangeable with providing such software via a transportable storage medium). Furthermore, this software may be provided directly without modulation or encryption or may be modulated and/or encrypted using any suitable modulation carrier wave and/or encryption technique before being transmitted over a communication channel.

While the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. A configuration system for use in a process plant having a plurality of physical and logical process entities which operate together to perform a process and a process controller communicatively connected to the plurality of physical and logical process entities to implement a control routine to control the operation of the process plant, the configuration system comprising:

an executable graphic display that includes one or more visual depictions to be displayed on a display device when the graphic display is executed, a parameter memory adapted to store a value of a parameter and a binding memory adapted to store a reference for communicatively connecting the parameter memory to a data source within the process plant;

a configuration database that stores an indication of the physical and logical process entities and an indication of the executable graphic display; and a configuration engine that enables a user to configure the operation of the graphic display by associating the graphic display within the configuration database with one of the indications of the physical and logical process entities within the configuration database to bind the visual depictions of the executable graphic display to particular physical or logical process entities in the process plant;

wherein the configuration database manages the visual depictions of the executable graphic display separately from bindings between executable graphic display and the physical and logical process entities.

2. The configuration system of claim 1, wherein the configuration engine determines a reference to be stored in the binding memory based on the identity of the one of the physical and logical process entities to which the graphic display is associated.

3. The configuration system of claim 1, wherein the configuration database stores the executable graphic display according a role defined for the executable graphic display.

4. The configuration system of claim 1, wherein the indications of the physical and logical process entities include an indication of a control routine and the configuration engine enables the executable graphic display to be associated with the control routine.

5. The configuration system of claim 1, wherein the indications of the physical and logical process entities include an indication of a plant area and the configuration engine enables the executable graphic display to be associated with the plant area.

6. The configuration system of claim 1, wherein the indications of the physical and logical process entities include an indication of an equipment entity and the configuration engine enables the executable graphic display to be associated with the equipment entity.

7. The configuration system of claim 1, wherein the indications of the physical and logical process entities include an indication of a display device and the configuration engine enables the executable graphic display to be associated with the display device.

8. The configuration system of claim 7, wherein the display device includes a functional subsystem and wherein the configuration engine enables the executable graphic display to be associated with the functional subsystem of the display device.

9. The configuration system of claim 8, wherein the executable graphic display includes an indication of a role associated with the executable graphic display and wherein the configuration engine associates the executable graphic display with the functional subsystem of the display device according to the role associated with the graphic display.

10. The configuration system of claim 8, wherein the functional subsystem of the display device is an operator subsystem or a maintenance subsystem or a simulation subsystem.

11. The configuration system of claim 1, wherein the indications of the physical and logical process entities include an indication of a first logical entity and the configuration engine assigns the executable graphic display to a display device associated with the first logical entity when the configuration engine associates the executable graphic display with the first logical entity.

12. The configuration system of claim 11, wherein the first logical entity is a control area or a control module.

13. The configuration system of claim 1, wherein the executable graphic display includes an indication of a role associated with the executable graphic display and wherein the configuration engine enables the executable graphic display to be used according to the role when associated with the one of the physical and logical process entities.

14. A configuration system for use in a process plant having a plurality of physical and logical process entities which operate together to perform a process and a process controller communicatively connected to the plurality of physical and logical process entities to implement a control routine to control the operation of the process plant, the configuration system comprising:

an executable graphic display that includes one or more visual depictions to be displayed on a display device when the graphic display is executed, a parameter memory adapted to store a value of a parameter and a binding memory adapted to store a reference for communicatively connecting the parameter memory to a data source within the process plant;

a configuration database that stores an indication of the physical and logical process entities and an indication of the executable graphic display; and a configuration engine that enables a user to configure the operation of the graphic display by associating the graphic display within the configuration database with one of the indications of the physical and logical process entities within the configuration database;

wherein the configuration database stores one or more unassigned executable graphic displays in one section of the configuration database and stores one or more assigned executable graphic displays in another section of the configuration database.

15. A configuration system for use in a process plant having a plurality of physical and logical process entities which operate together to perform a process and a process controller communicatively connected to the plurality of physical and logical process entities to implement a control routine to control the operation of the process plant, the configuration system comprising:

an executable graphic display that includes one or more visual depictions to be displayed on a display device when the graphic display is executed, a parameter memory adapted to store a value of a parameter and a binding memory adapted to store a reference for communicatively connecting the parameter memory to a data source within the process plant;

a configuration database that stores an indication of the physical and logical process entities and an indication of the executable graphic display; and a configuration engine that enables a user to configure the operation of the graphic display by associating the graphic display within the configuration database with one of the indications of the physical and logical process entities within the configuration database;

wherein the configuration database stores the indication of the executable graphic display in a library section indicating that the executable graphic display is not bound to the data source within the process plant and wherein the configuration database stores the indications of the physical and logical process entities in a manner that indicates the manner in which these physical and logical process entities are configured in the process plant.

* * * * *

UNITED STATES PATENT AND TRADEMARK OFFICE
CERTIFICATE OF CORRECTION

PATENT NO. : 8,060,834 B2  
APPLICATION NO. : 12/721322  
DATED : November 15, 2011  
INVENTOR(S) : Mark J. Nixon et al.

Page 1 of 1

It is certified that error appears in the above-identified patent and that said Letters Patent is hereby corrected as shown below:

In the Specification:

At Column 6, line 47, "at" should be -- as --.

At Column 13, line 9, "includes" should be -- include --.

At Column 16, line 22, "more simple" should be -- simpler --.

At Column 20, line 53, "in a" should be -- in an --.

At Column 23, line 26, "an" should be -- and --.

At Column 32, line 4, "orengineer's" should be -- or engineer's --.

At Column 32, line 56, "shapes. etc" should be -- shapes, etc. --.

At Column 41, line 7, "an other" should be -- and other --.

At Column 42, line 41, "utilized" should be -- utilize --.

At Column 46, line 7, "operator function" should be -- operator function, --.

At Column 49, line 11, "dialo" should be -- dialog --.

At Column 49, line 23, "ca" should be -- can --.

Signed and Sealed this  
Ninth Day of July, 2013

Teresa Stanek Rea  
*Acting Director of the United States Patent and Trademark Office*